(12) United States Patent
Veres et al.

(10) Patent No.: US 8,255,286 B2
(45) Date of Patent: *Aug. 28, 2012

(54) PUBLISHING USER SUBMISSIONS AT A NETWORK-BASED FACILITY

(75) Inventors: Robert Dean Veres, Evanston, IL (US); Ching-Jye Liang, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/080,426

(22) Filed: Apr. 5, 2011

(65) Prior Publication Data

US 2011/0231530 A1    Sep. 22, 2011

Related U.S. Application Data

(63) Continuation of application No. 10/252,126, filed on Sep. 20, 2002, now Pat. No. 7,941,348.

(60) Provisional application No. 60/387,638, filed on Jun. 10, 2002.

(51) Int. Cl.
*G06Q 30/00* (2006.01)
(52) U.S. Cl. ............... 705/26.3; 705/26.1; 705/26.41
(58) Field of Classification Search ......... 705/26.1–27.2
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |
| 4,864,516 A | 9/1989 | Gaither et al. | |
| 4,903,201 A | 2/1990 | Wagner | |
| 5,063,507 A | 11/1991 | Lindsey et al. | |
| 5,063,523 A | 11/1991 | Vrenjak | |
| 5,077,665 A | 12/1991 | Silverman et al. | |
| 5,101,353 A | 3/1992 | Lupien et al. | |
| 5,136,501 A | 8/1992 | Silverman et al. | |

(Continued)

FOREIGN PATENT DOCUMENTS

CA        2253543 A1    3/1997

(Continued)

OTHER PUBLICATIONS

"U.S. Appl. No. 09/602,110, Advisory Action mailed Feb. 22, 2010", 3 pgs.

(Continued)

*Primary Examiner* — Will Allen
(74) *Attorney, Agent, or Firm* — Schwegman, Lundberg & Woessner, P.A.

(57) ABSTRACT

According to the present invention, there is provided a method to facilitate propagating a plurality of transaction listings to a network-based transaction facility. An input interface is presented at a seller application to receive from a user, a plurality of transaction listings, each transaction listing including an associated start time. Also, a data file is composed at the seller application to include the plurality of transaction listings. Moreover, the data file is propagated, using the seller application, from the client computer to the network-based transaction facility.

22 Claims, 33 Drawing Sheets

U.S. PATENT DOCUMENTS

| | | |
|---|---|---|
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,384,701 A | 1/1995 | Stentiford et al. |
| 5,394,324 A | 2/1995 | Clearwater |
| 5,418,949 A | 5/1995 | Suzuki |
| 5,426,281 A | 6/1995 | Abecassis |
| 5,434,978 A | 7/1995 | Dockter et al. |
| 5,442,546 A | 8/1995 | Kaji et al. |
| 5,442,782 A | 8/1995 | Malatesta et al. |
| 5,485,510 A | 1/1996 | Colbert |
| 5,497,319 A | 3/1996 | Chong et al. |
| 5,535,403 A | 7/1996 | Li et al. |
| 5,544,051 A | 8/1996 | Senn et al. |
| 5,553,145 A | 9/1996 | Micali |
| 5,557,728 A | 9/1996 | Garrett et al. |
| 5,592,668 A | 1/1997 | Harding et al. |
| 5,596,994 A | 1/1997 | Bro |
| 5,598,557 A | 1/1997 | Doner et al. |
| 5,600,833 A | 2/1997 | Senn et al. |
| 5,640,569 A | 6/1997 | Miller et al. |
| 5,652,896 A | 7/1997 | Yamauchi et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,696,909 A | 12/1997 | Wallner |
| 5,706,457 A | 1/1998 | Dwyer et al. |
| 5,710,886 A | 1/1998 | Christensen et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,724,524 A | 3/1998 | Hunt et al. |
| 5,724,593 A | 3/1998 | Hargrave, III et al. |
| 5,727,165 A | 3/1998 | Ordish et al. |
| 5,758,126 A | 5/1998 | Daniels et al. |
| 5,771,291 A | 6/1998 | Newton et al. |
| 5,771,380 A | 6/1998 | Tanaka et al. |
| 5,778,213 A | 7/1998 | Shakib et al. |
| 5,778,356 A | 7/1998 | Heiny |
| 5,787,386 A | 7/1998 | Kaplan et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,835,911 A | 11/1998 | Nakagawa et al. |
| 5,845,143 A | 12/1998 | Yamauchi et al. |
| 5,845,265 A | 12/1998 | Woolston |
| 5,845,266 A | 12/1998 | Lupien et al. |
| 5,846,265 A | 12/1998 | McGregor et al. |
| 5,850,442 A | 12/1998 | Muftic |
| 5,857,188 A | 1/1999 | Douglas |
| 5,857,201 A | 1/1999 | Wright et al. |
| 5,857,203 A | 1/1999 | Kauffman et al. |
| 5,870,722 A | 2/1999 | Albert et al. |
| 5,872,848 A | 2/1999 | Romney et al. |
| 5,873,069 A | 2/1999 | Reuhl et al. |
| 5,874,412 A | 2/1999 | Priebe et al. |
| 5,884,056 A | 3/1999 | Steele |
| 5,884,246 A | 3/1999 | Boucher et al. |
| 5,884,247 A | 3/1999 | Christy |
| 5,890,138 A | 3/1999 | Godin et al. |
| 5,905,974 A | 5/1999 | Fraser et al. |
| 5,905,975 A | 5/1999 | Ausubel |
| 5,909,544 A | 6/1999 | Anderson et al. |
| 5,917,484 A | 6/1999 | Mullaney |
| 5,920,725 A | 7/1999 | Ma et al. |
| 5,922,074 A | 7/1999 | Richard et al. |
| 5,923,885 A | 7/1999 | Johnson et al. |
| 5,924,072 A | 7/1999 | Havens |
| 5,926,794 A | 7/1999 | Fethe |
| 5,944,790 A | 8/1999 | Levy |
| 5,960,382 A | 9/1999 | Steiner |
| 5,966,685 A | 10/1999 | Flanagan et al. |
| 5,974,412 A | 10/1999 | Hazlehurst et al. |
| 5,991,739 A | 11/1999 | Cupps et al. |
| 6,006,221 A | 12/1999 | Liddy et al. |
| 6,018,742 A | 1/2000 | Herbert, III |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A | 5/2000 | Hess et al. |
| 6,061,448 A | 5/2000 | Smith et al. |
| 6,073,117 A | 6/2000 | Oyanagi et al. |
| 6,077,085 A | 6/2000 | Parry et al. |
| 6,085,169 A | 7/2000 | Walker et al. |
| 6,085,176 A | 7/2000 | Woolston |
| 6,092,035 A | 7/2000 | Kurachi et al. |
| 6,092,037 A | 7/2000 | Stone et al. |
| 6,104,815 A | 8/2000 | Alcorn et al. |
| 6,119,137 A | 9/2000 | Smith et al. |
| 6,119,229 A | 9/2000 | Martinez et al. |
| 6,122,606 A | 9/2000 | Johnson |
| 6,134,533 A | 10/2000 | Shell |
| 6,144,984 A | 11/2000 | DeBenedictis et al. |
| 6,151,589 A | 11/2000 | Aggarwal et al. |
| 6,161,082 A | 12/2000 | Goldberg et al. |
| 6,167,567 A | 12/2000 | Chiles et al. |
| 6,178,408 B1 | 1/2001 | Copple et al. |
| 6,192,407 B1 | 2/2001 | Smith et al. |
| 6,202,051 B1 | 3/2001 | Woolston |
| 6,205,418 B1 | 3/2001 | Li et al. |
| 6,226,412 B1 | 5/2001 | Schwab |
| 6,243,691 B1 | 6/2001 | Fisher et al. |
| 6,266,651 B1 | 7/2001 | Woolston |
| 6,266,652 B1 | 7/2001 | Godin et al. |
| 6,272,675 B1 | 8/2001 | Schrab et al. |
| 6,275,789 B1 | 8/2001 | Moser et al. |
| 6,278,969 B1 | 8/2001 | King et al. |
| 6,278,980 B1 | 8/2001 | Wendkos |
| 6,282,507 B1 | 8/2001 | Horiguchi et al. |
| 6,292,769 B1 | 9/2001 | Flanagan et al. |
| 6,301,554 B1 | 10/2001 | Christy |
| 6,308,172 B1 | 10/2001 | Agrawal et al. |
| 6,317,727 B1 | 11/2001 | May |
| 6,326,985 B1 | 12/2001 | Tazoe et al. |
| 6,336,105 B1 | 1/2002 | Conklin et al. |
| 6,339,755 B1 | 1/2002 | Hetherington et al. |
| 6,341,958 B1 | 1/2002 | Zilberman |
| 6,349,275 B1 | 2/2002 | Schumacher et al. |
| 6,356,865 B1 | 3/2002 | Franz et al. |
| 6,363,337 B1 | 3/2002 | Amith |
| 6,389,427 B1 | 5/2002 | Faulkner |
| 6,396,515 B1 | 5/2002 | Hetherington et al. |
| 6,415,270 B1 | 7/2002 | Rackson et al. |
| 6,421,653 B1 | 7/2002 | May |
| 6,438,524 B1 | 8/2002 | Shi |
| 6,446,048 B1 | 9/2002 | Wells et al. |
| 6,460,015 B1 | 10/2002 | Hetherington et al. |
| 6,463,404 B1 | 10/2002 | Appleby |
| 6,473,729 B1 | 10/2002 | Gastaldo et al. |
| 6,493,661 B1 | 12/2002 | White, III et al. |
| 6,496,793 B1 | 12/2002 | Veditz et al. |
| 6,507,813 B2 | 1/2003 | Veditz et al. |
| 6,523,000 B1 | 2/2003 | Ando et al. |
| 6,526,426 B1 | 2/2003 | Lakritz |
| 6,532,444 B1 | 3/2003 | Weber |
| 6,567,821 B1 | 5/2003 | Polk |
| 6,570,591 B1 | 5/2003 | Crovetto et al. |
| 6,571,241 B1 | 5/2003 | Nosohara |
| 6,574,239 B1 | 6/2003 | Dowling et al. |

| | | |
|---|---|---|
| 6,598,026 B1 | 7/2003 | Ojha et al. |
| 6,604,107 B1 | 8/2003 | Wang |
| 6,616,703 B1 | 9/2003 | Nakagawa |
| 6,623,529 B1 | 9/2003 | Lakritz |
| 6,647,364 B1 | 11/2003 | Yumura et al. |
| 6,647,373 B1 | 11/2003 | Carlton-Foss |
| 6,665,676 B2 | 12/2003 | Twig et al. |
| 6,721,715 B2 | 4/2004 | Nemzow |
| 6,732,161 B1 | 5/2004 | Hess et al. |
| 6,771,291 B1 | 8/2004 | DiStenfano |
| 6,799,165 B1 | 9/2004 | Boesjes |
| 6,857,022 B1 | 2/2005 | Scanlan |
| 6,901,408 B2 | 5/2005 | Fachat et al. |
| 6,912,539 B1 | 6/2005 | Kapitanski et al. |
| 6,965,882 B1 | 11/2005 | Lapstun et al. |
| 6,999,932 B1 | 2/2006 | Zhou |
| 7,007,026 B2 | 2/2006 | Wilkinson et al. |
| 7,013,289 B2 | 3/2006 | Horn et al. |
| 7,031,985 B1 | 4/2006 | Pecheny |
| 7,072,826 B1 | 7/2006 | Wakita |
| 7,076,453 B2 | 7/2006 | Jammes et al. |
| 7,133,835 B1 | 11/2006 | Fusz et al. |
| 7,136,863 B2 | 11/2006 | Wang |
| 7,165,041 B1 | 1/2007 | Guheen et al. |
| 7,191,393 B1 | 3/2007 | Chin et al. |
| 7,194,403 B2 | 3/2007 | Okura et al. |
| 7,234,110 B2 | 6/2007 | Sumitomo |
| 7,251,612 B1 | 7/2007 | Parker et al. |
| 7,315,826 B1 | 1/2008 | Guheen et al. |
| 7,340,389 B2 | 3/2008 | Vargas |
| 7,418,390 B1 | 8/2008 | Jokipii |
| 7,660,740 B2* | 2/2010 | Boone et al. ................ 705/27.1 |
| 7,752,034 B2 | 7/2010 | Brockett et al. |
| 7,752,266 B2* | 7/2010 | Grove ........................... 709/206 |
| 7,895,082 B2* | 2/2011 | Veres et al. ................... 705/26.8 |
| 7,908,132 B2 | 3/2011 | Brockett et al. |
| 7,941,348 B2* | 5/2011 | Veres et al. ................... 705/26.3 |
| 8,050,957 B2 | 11/2011 | Woehler |
| 8,078,505 B2 | 12/2011 | Veres et al. |
| 2001/0011241 A1 | 8/2001 | Nemzow |
| 2001/0027472 A1 | 10/2001 | Guan |
| 2001/0029442 A1 | 10/2001 | Shiotsu et al. |
| 2001/0029455 A1 | 10/2001 | Chin et al. |
| 2001/0039531 A1 | 11/2001 | Aoki |
| 2001/0049707 A1 | 12/2001 | Tran |
| 2002/0029182 A1 | 3/2002 | Nakagawa |
| 2002/0035466 A1 | 3/2002 | Kodama |
| 2002/0042835 A1 | 4/2002 | Pepin et al. |
| 2002/0046137 A1 | 4/2002 | Odom et al. |
| 2002/0069049 A1 | 6/2002 | Turner |
| 2002/0073111 A1 | 6/2002 | Heyliger |
| 2002/0082953 A1 | 6/2002 | Batham et al. |
| 2002/0082977 A1 | 6/2002 | Hammond et al. |
| 2002/0099562 A1 | 7/2002 | Bruce et al. |
| 2002/0123959 A1 | 9/2002 | Mozley et al. |
| 2002/0147784 A1 | 10/2002 | Gold et al. |
| 2002/0184610 A1 | 12/2002 | Chong et al. |
| 2002/0193986 A1 | 12/2002 | Schirris |
| 2002/0198713 A1 | 12/2002 | Franz et al. |
| 2003/0005159 A1 | 1/2003 | Kumhyr |
| 2003/0018885 A1 | 1/2003 | Landsman et al. |
| 2003/0033137 A1 | 2/2003 | Holubar et al. |
| 2003/0055747 A1 | 3/2003 | Carr et al. |
| 2003/0074462 A1 | 4/2003 | Grove |
| 2003/0083952 A1 | 5/2003 | Simpson et al. |
| 2003/0084051 A1 | 5/2003 | Depura et al. |
| 2003/0093326 A1 | 5/2003 | Poon et al. |
| 2003/0110047 A1 | 6/2003 | Santosuosso et al. |
| 2003/0115484 A1 | 6/2003 | Moriconi et al. |
| 2003/0139975 A1 | 7/2003 | Perkowski |
| 2003/0154134 A1 | 8/2003 | Wang |
| 2003/0167213 A1 | 9/2003 | Jammes et al. |
| 2003/0229545 A1* | 12/2003 | Veres et al. ................... 705/26 |
| 2003/0229554 A1* | 12/2003 | Veres et al. ................... 705/35 |
| 2004/0073507 A1 | 4/2004 | Scott et al. |
| 2004/0078297 A1* | 4/2004 | Veres et al. ................... 705/27 |
| 2005/0102151 A1 | 5/2005 | Fuwa et al. |
| 2005/0240392 A1* | 10/2005 | Munro et al. ................... 704/8 |
| 2006/0074792 A1 | 4/2006 | Wagoner et al. |
| 2006/0200353 A1 | 9/2006 | Bennett |
| 2007/0016893 A1 | 1/2007 | Branda et al. |
| 2007/0112643 A1 | 5/2007 | Veres et al. |
| 2008/0052367 A1* | 2/2008 | Liu et al. ....................... 709/208 |
| 2010/0131510 A1 | 5/2010 | Boone et al. |
| 2010/0228536 A1 | 9/2010 | Grove |
| 2012/0047029 A1 | 2/2012 | Veres et al. |

FOREIGN PATENT DOCUMENTS

| | | |
|---|---|---|
| CN | 102129642 A | 7/2011 |
| FR | 2658635 | 8/1991 |
| JP | 2000322490 A | 11/2000 |
| JP | 2001000469 A | 1/2001 |
| JP | 2002207898 A | 7/2002 |
| JP | 2004094643 A | 3/2004 |
| KR | 20000018041 A | 4/2000 |
| KR | 20000024372 A | 5/2000 |
| KR | 20000049744 A | 8/2000 |
| KR | 20020059971 A | 7/2002 |
| KR | 20000037395 A | 4/2008 |
| NL | 9300266 | 2/1993 |
| WO | WO-9215174 A1 | 9/1992 |
| WO | WO-9517711 A1 | 6/1995 |
| WO | WO-9634356 A1 | 10/1996 |
| WO | WO-9737315 A1 | 10/1997 |
| WO | WO-9963461 A1 | 12/1999 |
| WO | WO-0058862 A2 | 10/2000 |
| WO | WO-0102926 A2 | 1/2001 |
| WO | WO-0182115 A1 | 11/2001 |
| WO | WO-03038560 A2 | 5/2003 |
| WO | WO-03104931 A3 | 12/2003 |

OTHER PUBLICATIONS

"U.S. Appl. No. 09/602,110, Advisory Action mailed May 26, 2006", 3 pgs.

"U.S. Appl. No. 09/602,110, Amendment filed Apr. 28, 2008", 17 pgs.

"U.S. Appl. No. 09/602,110, Appeal Brief filed Apr. 26, 2010", 37 pgs.

"U.S. Appl. No. 09/602,110, Appeal Brief filed Dec. 15, 2006", 34 pgs.

"U.S. Appl. No. 09/602,110, Appeal Decision mailed Feb. 28, 2008", 13 pgs.

"U.S. Appl. No. 09/602,110, Decision on Pre-Appeal Brief mailed Aug. 15, 2006", 2 pgs.

"U.S. Appl. No. 09/602,110, Examiner's Answer to Appeal Brief mailed Jun. 11, 2010", 20 pgs.

"U.S. Appl. No. 09/602,110, Final Office Action mailed Mar. 8, 2006", 11 pgs.

"U.S. Appl. No. 09/602,110, Final Office Action mailed Sep. 2, 2004", 13 pgs.

"U.S. Appl. No. 09/602,110, Final Office Action mailed Nov. 17, 2008", 12 pgs.

"U.S. Appl. No. 09/602,110, Final Office Action mailed Nov. 21, 2005", 11 pgs.

"U.S. Appl. No. 09/602,110, Final Office Action mailed Nov. 25, 2009", 17 pgs.

"U.S. Appl. No. 09/602,110, Non Final Office Action mailed Jan. 21, 2004", 13 pgs.

"U.S. Appl. No. 09/602,110, Non Final Office Action mailed Apr. 5, 2005", 11 pgs.

"U.S. Appl. No. 09/602,110, Non-Final Office Action mailed Mar. 18, 2009", 19 pgs.

"U.S. Appl. No. 09/602,110, Non-Final Office Action mailed Jul. 21, 2008", 12 pgs.

"U.S. Appl. No. 09/602,110, Pre-Appeal Brief Request filed Jun. 27, 2006", 4 pgs.

"U.S. Appl. No. 09/602,110, Reply Brief filed May 7, 2007", 11 pgs.

"U.S. Appl. No. 09/602,110, Reply Brief filed Aug. 11, 2010", 6 pgs.

"U.S. Appl. No. 09/602,110, Response filed Jan. 3, 2005 to Final Office Action mailed Sep. 2, 2004", 16 pgs.

"U.S. Appl. No. 09/602,110, Response filed Jan. 23, 2006 to Final Office Action mailed Nov. 21, 2005", 15 pgs.

"U.S. Appl. No. 09/602,110, Response filed Jan. 25, 2010 to Final Office Action mailed Nov. 25, 2009", 22 pgs.

"U.S. Appl. No. 09/602,110, Response filed Feb. 17, 2009 to Final Office Action mailed Nov. 17, 2008", 21 pgs.

"U.S. Appl. No. 09/602,110, Response filed May 8, 2006 to Final Office Action mailed Mar. 8, 2006", 17 pgs.

"U.S. Appl. No. 09/602,110, Response filed May 21, 2004 to Non-Final Office Action mailed Jan. 21, 2004", 18 pgs.

"U.S. Appl. No. 09/602,110, Response filed Jul. 20, 2009 to Non Final Office Action mailed Mar. 18, 2009", 21 pgs.

"U.S. Appl. No. 09/602,110, Response filed Aug. 4, 2005 to Non Final Office Action mailed Apr. 5, 2005", 19 pgs.

"U.S. Appl. No. 09/602,110, Response filed Oct. 21, 2008 to Non-Final Office Action mailed Jul. 21, 2008", 19 pgs.

"U.S. Appl. No. 09/905,525, Advisory Action mailed May 2, 2008", 5 pgs.

"U.S. Appl. No. 09/905,525, Final Office Action mailed Jan. 10, 2008", 15 pgs.

"U.S. Appl. No. 09/905,525, Non-Final Office Action mailed Mar. 5, 2009", 25 pgs.

"U.S. Appl. No. 09/905,525, Non-Final Office Action mailed Aug. 22, 2008", 17 pgs.

"U.S. Appl. No. 09/905,525, Notice of Allowance mailed Sep. 18, 2009", 11 pgs.

"U.S. Appl. No. 09/905,525, Response filed Mar. 27, 2008 to Non Final Office Action mailed Jan. 10, 2008", 17 pgs.

"U.S. Appl. No. 09/905,525, Response filed Jun. 5, 2009 to Non Final Office Action mailed Mar. 5, 2009", 19 pgs.

"U.S. Appl. No. 09/905,525, Response filed Jun. 10, 2008 to Advisory Action mailed May 2, 2008", 20 pgs.

"U.S. Appl. No. 09/905,525, Response filed Sep. 25, 2007 to Non Final Office Action mailed Jun. 25, 2007", 17 pgs.

"U.S. Appl. No. 09/905,525, Response filed Nov. 24, 2008 to Non Final Office Action mailed Aug. 22, 2008", 17 pgs.

"U.S. Appl. No. 09/976,301, 312 Amendment filed Jan. 10, 2010", 4 pgs.

"U.S. Appl. No. 09/976,301, Advisory Action mailed Jun. 9, 2008", 5 pgs.

"U.S. Appl. No. 09/976,301, Advisory Action mailed Aug. 13, 2009", 3 pgs.

"U.S. Appl. No. 09/976,301, Decision on Pre-Appeal Brief mailed Jul. 29, 2008", 2 pgs.

"U.S. Appl. No. 09/976,301, Examiner Interview Summary mailed Sep. 9, 2009", 4 pgs.

"U.S. Appl. No. 09/976,301, Final Office Action mailed Mar. 17, 2008", 14 pgs.

"U.S. Appl. No. 09/976,301, Final Office Action mailed Jun. 4, 2009", 15 pgs.

"U.S. Appl. No. 09/976,301, Non Final Office Action mailed Sep. 13, 2007", 12 pgs.

"U.S. Appl. No. 09/976,301, Non-Final Office Action mailed Dec. 23, 2008", 23 pgs.

"U.S. Appl. No. 09/976,301, Notice of Allowance mailed Dec. 2, 2009", 13 pgs.

"U.S. Appl. No. 09/976,301, Pre-Appeal Brief Request filed Jun. 16, 2008", 5 pgs.

"U.S. Appl. No. 09/976,301, PTO Response to 312 Amendment mailed Feb. 3, 2010", 2 pgs.

"U.S. Appl. No. 09/976,301, Response filed Mar. 23, 2009 to Non Final Office Action mailed Dec. 23, 2008", 19 pgs.

"U.S. Appl. No. 09/976,301, Response filed May 19, 2008 to Final Office Action mailed Mar. 17, 2008", 19 pgs.

"U.S. Appl. No. 09/976,301, Response filed Aug. 4, 2009 to Final Office Action mailed Jun. 4, 2009", 15 pgs.

"U.S. Appl. No. 09/976,301, Response filed Sep. 29, 2008 to Final Office Action mailed Mar. 17, 2008", 19 pgs.

"U.S. Appl. No. 09/976,301, Response filed Sep. 4, 2009 to Final Office Action mailed Jun. 4, 2009", 20 pgs.

"U.S. Appl. No. 10/252,126, Appeal Brief filed Feb. 4, 2009", 22 pgs.

"U.S. Appl. No. 10/252,126, Examiner's Answer to Appeal Brief mailed Apr. 29, 2009", 12 pgs.

"U.S. Appl. No. 10/252,126, Final Office Action mailed Feb. 26, 2008", 12 pgs.

"U.S. Appl. No. 10/252,126, Final Office Action mailed Jun. 27, 2006", 11 pgs.

"U.S. Appl. No. 10/252,126, Final Office Action mailed Sep. 4, 2008", 13 pgs.

"U.S. Appl. No. 10/252,126, Non Final Office Action mailed Jan. 30, 2007", 9 pgs.

"U.S. Appl. No. 10/252,126, Non Final Office Action mailed Feb. 30, 2006", 8 pgs.

"U.S. Appl. No. 10/252,126, Non Final Office Action mailed Aug. 20, 2007", 8 pgs.

"U.S. Appl. No. 10/252,126, Notice of Allowance mailed Dec. 30, 2010", 13 pgs.

"U.S. Appl. No. 10/252,126, Response filed May 3, 2006 to Non Final Office Action mailed Feb. 3, 2006", 7 pgs.

"U.S. Appl. No. 10/252,126, Response filed Jun. 25, 2007 to Non Final Office Action mailed Jan. 30, 2007", 11 pgs.

"U.S. Appl. No. 10/252,126, Response filed Jul. 28, 2008 to Final Office Action mailed Feb. 26, 2008", 7 pgs.

"U.S. Appl. No. 10/252,126, Response filed Oct. 27, 2006 to Final Office Action mailed Jun. 27, 2006", 8 pgs.

"U.S. Appl. No. 10/252,126, Response filed Dec. 20, 2007 to Non-Final Office Action mailed Aug. 20, 2007", 8 pgs.

"U.S. Appl. No. 10/252,126, Response filed Dec. 29, 2005 to Restriction Requirement mailed Oct. 31, 2005", 5 pgs.

"U.S. Appl. No. 10/252,126, Restriction Requirement mailed Oct. 31, 2005", 7 pgs.

"U.S. Appl. No. 10/252,127, Advisory Action mailed Mar. 29, 2010", 3 pgs.

"U.S. Appl. No. 10/252,127, Advisory Action mailed May 1, 2008", 3 pgs.

"U.S. Appl. No. 10/252,127, Advisory Action mailed Dec. 12, 2008", 3 pgs.

"U.S. Appl. No. 10/252,127, Appeal Brief filed Mar. 11, 2009", 27 pgs.

"U.S. Appl. No. 10/252,127, Decision on Pre-Appeal Brief mailed Feb. 11, 2009", 2 pgs.

"U.S. Appl. No. 10/252,127, Decision on Pre-Appeal Brief mailed May 12, 2008", 3 pgs.

"U.S. Appl. No. 10/252,127, Final Office Action mailed Jan. 7, 2010", 11 pgs.

"U.S. Appl. No. 10/252,127, Final Office Action mailed Jan. 11, 2008", 11 pgs.

"U.S. Appl. No. 10/252,127, Final Office Action mailed Sep. 4, 2008", 12 pgs.

"U.S. Appl. No. 10/252,127, Interview Summary filed Apr. 15, 2011", 2 pgs.

"U.S. Appl. No. 10/252,127, Non-Final Office Action mailed Jun. 26, 2009", 14 pgs.

"U.S. Appl. No. 10/252,127, Non-Final Office Action mailed Sep. 10, 2010", 11 pgs.

"U.S. Appl. No. 10/252,127, Notice of Allowance mailed Mar. 18, 2011", 16 pgs.

"U.S. Appl. No. 10/252,127, Notice of Allowance mailed Jul. 28, 2011", 6 pgs.

"U.S. Appl. No. 10/252,127, Pre-Appeal Brief Request filed Jan. 5, 2009", 5 pgs.

"U.S. Appl. No. 10/252,127, Pre-Appeal Brief Request filed Apr. 7, 2010", 5 pgs.

"U.S. Appl. No. 10/252,127, Pre-Appeal Brief Request filed Apr. 10, 2008", 5 pgs.

"U.S. Appl. No. 10/252,127, Response filed Mar. 8, 2010 to Final Office Action mailed Jan. 7, 2010", 17 pgs.

"U.S. Appl. No. 10/252,127, Response filed Mar. 27, 2008 to Final Office Action mailed Jan. 11, 2008", 16 pgs.

"U.S. Appl. No. 10/252,127, Response filed Jun. 12, 2008 to Advisory Action mailed May 1, 2008", 16 pgs.

"U.S. Appl. No. 10/252,127, Response filed Jun. 12, 2008 to Final Office Action mailed Jan. 11, 2008", 16 pgs.

"U.S. Appl. No. 10/252,127, Response filed Sep. 28, 2009 to Non Final Office Action mailed Jun. 26, 2009", 16 pgs.

"U.S. Appl. No. 10/252,127, Response filed Jan. 14, 2011 to Non Final Office Action mailed Sep. 10, 2011", 18 pgs.

"U.S. Appl. No. 10/252,127, Response filed Nov. 4, 2008 to Final Office Action mailed Sep. 4, 2008", 22 pgs.

"U.S. Appl. No. 10/252,128, Appeal Brief filed Dec. 15, 2009", 23 pgs.

"U.S. Appl. No. 10/252,128, Decision on Pre-Appeal Brief Request mailed Oct. 15, 2009", 2 pgs.

"U.S. Appl. No. 10/252,128, Examiner's Answer to Appeal Brief mailed Mar. 31, 2010", 11 pgs.

"U.S. Appl. No. 10/252,128, Final Office Action mailed Apr. 3, 2009", 27 pgs.

"U.S. Appl. No. 10/252,128, Non-Final Office Action mailed Mar. 21, 2008", 12 pgs.

"U.S. Appl. No. 10/252,128, Pre-Appeal Brief Request filed Aug. 3, 2009", 4 pgs.

"U.S. Appl. No. 10/252,128, Response filed Jul. 21, 2008 to Non-Final Office Action mailed Mar. 21, 2008", 11 pgs.

"U.S. Appl. No. 10/252,128, Response filed Dec. 23, 2008 to Restriction Requirement mailed Nov. 24, 2008", 10 pgs.

"U.S. Appl. No. 10/252,128, Restriction Requirement mailed Nov. 24, 2008", 8 pgs.

"U.S. Appl. No. 10/252,129, Advisory Action mailed Mar. 13, 2007", 3 pgs.

"U.S. Appl. No. 10/252,129, Advisory Action mailed Sep. 2, 2009", 2 pgs.

"U.S. Appl. No. 10/252,129, Advisory Action mailed Oct. 4, 2010", 3 pgs.

"U.S. Appl. No. 10/252,129, Advisory Action mailed Oct. 6, 2009", 3 pgs.

"U.S. Appl. No. 10/252,129, Appeal Brief filed Jan. 24, 2011", 21 pgs.

"U.S. Appl. No. 10/252,129, Appeal Brief filed Apr. 25, 2011", 32 pgs.

"U.S. Appl. No. 10/252,129, Examiner Interview Summary mailed Mar. 19, 2008", 2 pgs.

"U.S. Appl. No. 10/252,129, Examiner Interview Summary mailed Mar. 31, 2009", 2 pgs.

"U.S. Appl. No. 10/252,129, Examiner Interview Summary mailed Jul. 11, 2008", 2 pgs.

"U.S. Appl. No. 10/252,129, Examiner's Answer to Appeal Brief mailed May 13, 2011", 19 pgs.

"U.S. Appl. No. 10/252,129, Final Office Action mailed Apr. 23, 2010", 18 pgs.

"U.S. Appl. No. 10/252,129, Final Office Action mailed May 29, 2008", 9 pgs.

"U.S. Appl. No. 10/252,129, Final Office Action mailed Jun. 18, 2009", 12 pgs.

"U.S. Appl. No. 10/252,129, Final Office Action mailed Sep. 15, 2008", 11 pgs.

"U.S. Appl. No. 10/252,129, Final Office Action mailed Oct. 5, 2007", 10 pgs.

"U.S. Appl. No. 10/252,129, Non Final Office Action mailed Aug. 18, 2006", 10 pgs.

"U.S. Appl. No. 10/252,129, Non-Final Office Action mailed Feb. 10, 2009", 11 pgs.

"U.S. Appl. No. 10/252,129, Non-Final Office Action mailed Nov. 12, 2009", 19 pgs.

"U.S. Appl. No. 10/252,129, Response filed Feb. 12, 2010 to Non Final Office Action mailed Nov. 12, 2009", 20 pgs.

"U.S. Appl. No. 10/252,129, Response filed Feb. 22, 2007 to Final Office Action mailed Dec. 27, 2006", 14 pgs.

"U.S. Appl. No. 10/252,129, Response filed Apr. 14, 2008 to Non-Final Office Action mailed Jan. 14, 2008", 14 pgs.

"U.S. Appl. No. 10/252,129, Response filed May 11, 2009 to Non Final Office Action mailed Feb. 10, 2009", 15 pgs.

"U.S. Appl. No. 10/252,129, Response filed Jul. 31, 2008 to Final Office Action mailed May 29, 2008", 13 pgs.

"U.S. Appl. No. 10/252,129, Response filed Aug. 18, 2009 to Final Office Action mailed Jun. 18, 2009", 19 pgs.

"U.S. Appl. No. 10/252,129, Response filed Sep. 18, 2009 to Advisory Action mailed Sep. 2, 2009", 19 pgs.

"U.S. Appl. No. 10/252,129, Response filed Sep. 23, 2010 to Final Office Action mailed Apr. 23, 2010", 16 pgs.

"U.S. Appl. No. 10/252,129, Response filed Oct. 19, 2009 to Advisory Action mailed Oct. 6, 2009", 17 pgs.

"U.S. Appl. No. 10/252,129, Response filed Nov. 11, 2008 to Final Office Action mailed Sep. 15, 2008", 14 pgs.

"U.S. Appl. No. 10/252,129, Response filed Dec. 2, 2008 to Final Office Action mailed Sep. 15, 2008", 14 pgs.

"U.S. Appl. No. 10/831,421, Final Office Action mailed Jun. 13, 2008", 18 pgs.

"U.S. Appl. No. 10/831,421, Final Office Action mailed Jul. 9, 2009", 18 pgs.

"U.S. Appl. No. 10/831,421, Final Office Action mailed Aug. 31, 2011", 25 pgs.

"U.S. Appl. No. 10/831,421, Final Office Action mailed Sep. 7, 2010", 20 pgs.

"U.S. Appl. No. 10/831,421, Non Final Office Action mailed Mar. 14, 2011", 21 pgs.

"U.S. Appl. No. 10/831,421, Non-Final Office Action mailed Jan. 12, 2009", 16 pgs.

"U.S. Appl. No. 10/831,421, Non-Final Office Action mailed Mar. 5, 2010", 20 pgs.

"U.S. Appl. No. 10/831,421, Response filed Jan. 11, 2010 to Final Office Action mailed Jul. 9, 2009", 6 pgs.

"U.S. Appl. No. 10/831,421, Response filed Feb. 28, 2008 to Non-Final Office Action mailed Nov. 28, 2007", 23 pgs.

"U.S. Appl. No. 10/831,421, Response filed Apr. 13, 2009 to Non Final Office Action mailed Jan. 12, 2009", 18 pgs.

"U.S. Appl. No. 10/831,421, Response filed Jul. 6, 2010 to Non Final Office Action mailed Mar. 5, 2010", 7 pgs.

"U.S. Appl. No. 10/831,421, Response filed Oct. 10, 2008 to Final Office Action mailed Jun. 13, 208", 20 pgs.

"U.S. Appl. No. 10/831,421, Response filed Nov. 29, 2010 to Final Office Action mailed Sep. 7, 2010", 8 pgs.

"U.S. Appl. No. 10/831,421, Response filed Jun. 14, 2011 to Non Final Office Action mailed Mar. 14, 2011", 7 pgs.

"U.S. Appl. No. 11/508,420, Advisory Action mailed Oct. 8, 2010", 3 pgs.

"U.S. Appl. No. 11/508,420, Advisory Action mailed Oct. 29, 2009", 2 pgs.

"U.S. Appl. No. 11/508,420, Appeal Brief filed Jan. 19, 2011", 23 pgs.

"U.S. Appl. No. 11/508,420, Decision on Pre-Appeal Brief Request mailed Dec. 21, 2010", 2 pgs.

"U.S. Appl. No. 11/508,420, Final Office Action mailed Jul. 22, 2010", 12 pgs.

"U.S. Appl. No. 11/508,420, Final Office Action mailed Jul. 31, 2009", 23 pgs.

"U.S. Appl. No. 11/508,420, Non Final Office Action mailed Apr. 27, 2011", 15 pgs.

"U.S. Appl. No. 11/508,420, Non-Final Office Action mailed Feb. 5, 2009", 18 pgs.

"U.S. Appl. No. 11/508,420, Non-Final Office Action mailed Dec. 30, 2009", 18 pgs.

"U.S. Appl. No. 11/508,420, Pre-Appeal Brief Request filed Oct. 22, 2010", 5 pgs.

"U.S. Appl. No. 11/508,420, Response filed Apr. 30, 2010 to Non Final Office Action mailed Dec. 30, 2009", 13 pgs.

"U.S. Appl. No. 11/508,420, Response filed May 5, 2009 to Non Final Office Action mailed Feb. 5, 2009", 11 pgs.

"U.S. Appl. No. 11/508,420, Response filed Jul. 15, 2011 to Non Final Office Action mailed Apr. 27, 2011", 11 pgs.

"U.S. Appl. No. 11/508,420, Response filed Sep. 21, 2010 to Final Office Action mailed Jul. 22, 2010", 13 pgs.

"U.S. Appl. No. 11/508,420, Response filed Sep. 30, 2009 to Final Office Action mailed Jul. 31, 2009", 13 pgs.

"U.S. Appl. No. 11/647,728, Examiner Interview Summary mailed Aug. 11, 2010", 3 pgs.

"U.S. Appl. No. 11/647,728, Final Office Action mailed Jul. 13, 2010", 17 pgs.

"U.S. Appl. No. 11/647,728, Non-Final Office Action mailed Mar. 8, 2010", 18 pgs.

"U.S. Appl. No. 11/647,728, Notice of Allowance mailed Oct. 19, 2010", 11 pgs.

"U.S. Appl. No. 11/647,728, Response filed Jun. 8, 2010 to Non Final Office Action mailed Mar. 8, 2010", 13 pgs.

"U.S. Appl. No. 11/647,728, Response filed Sep. 22, 2010 to Final Office Action mailed Jul. 13, 2010", 6 pgs.

"Auctionwatch", [Online]. Retrieved from the Internet: <URL: http://web.archive.org/web/20000830150100/http://www.auctionwatch.com>, (Aug. 15, 2008), 46 pgs.

"AuctionWatch.com", [Online]. Retrieved from the Internet: <URL: http://web.archive.org/web/20011217190108/wsacp.auctionwatch.com/login.html?ret=/my/acp/>, 19 pgs.

"Chinese Application Serial. No. 03813485.3, Office Action Mailed Jan. 9, 2009", 5 pgs.

"Chinese Application Serial. No. 03813485.3, Office Action Mailed Jun. 24, 2010", 5 pgs.

"Chinese Application Serial. No. 03813485.3, Office Action mailed Sep. 25, 2009", 8 pgs.

"Chinese Application Serial. No. 03813485.3, Re-examination Decision mailed Nov. 29, 2010", 10 pgs.

"Chinese Application Serial. No. 03813485.3, Response to Notification of Reexamination Filed: Aug. 9, 2010", 15 pgs.

"DHL and UPS offer country-specific services", Transportation and distribution, vol. 38, Iss. 12, (Dec. 1997), 18 pgs.

"European Application Serial. No. 01959319.3, Office Action mailed May 15, 2007", 3 pgs.

"European Application Serial. No. 03757395.3, Office Action mailed Oct. 8, 2010", 3 pgs.

"European Application Serial. No. 03757395.3, Office Action Response", 9 pgs.

"European Application Serial. No. 03757395.3, Search Report mailed Sep. 4, 2009", 2 pgs.

"Google looking at more Country Specific Domains", Europmedia, (Jan. 17, 2002), 1 pg.

"Hello direct store joins eBay network of merchants", PR Newswire, New York, NY, (May 23, 2002), 2 pgs.

"International Application Serial. No. 1921/KOLNP/2004, First Examination Report mailed Apr. 7, 2008", 11 pgs.

"International Application Serial. No. PCT/US03/17915, International Preliminary Examination Report mailed Mar. 26, 2004", 10 pgs.

"International Application Serial. No. PCT/US03/17915, International Search Report mailed Nov. 26, 2003", 6 pgs.

"Korean Application Serial. No. 2004-7020202, Office Action mailed Apr. 30, 2009", 6 pgs.

"Korean Application Serial. No. 2004-7020202, Office Action mailed Aug. 29, 2008", 17 pgs.

"Korean Application Serial. No. 2004-7020202, Office Action Received mailed Nov. 25, 2009", 6 pgs.

"Korean Application Serial. No. 2004-7020202, Preliminary Rejection mailed Nov. 30, 2007", 10 pgs.

"Korean Application Serial. No. 2009-7027103, Final Office Action mailed Sep. 28, 2010", 5 Pgs.

"Korean Application Serial. No. 2009-7027103, Office Action mailed, Mar. 26, 2010", 9 pgs.

"Korean Divisional Application Serial. No. 2009-7027103, Appeal Filed Dec. 29, 2010 to Final Office Action mailed Sep. 28, 2010", 42.

"Photodisc localizes Internet presence to better serve global markets;Adds country-specific content and languages to its Award-wining Websites", Business Wire, (May 27, 1998), 3 pgs.

Bidnbuy, "Going, going, virtually gone . . . ", Business and Finance Dialog File 20#06012646, (Jun. 17, 1999), 3 pgs.

Collete, Stacy, "Thin Clients Pull in Car Customers: Auto Auction company eyes move to Web.(Industry Trend or Event)", Computerworld recovered via dialog database on Feb. 15, 2008, (Apr. 5, 1999), p. 41(1).

Grubbs, L., "Top 5 auction utilities", PC World.com, San Francisco, CA, (Dec. 4, 2000), 2 pgs.

Hauser, R, "Anonymous Delivery of Goods in Electronic Commerce", IBM Technical Disclosure Bulletin, 39(3), (Mar. 1996), 363-366.

Hutchinson, Art, "E- Commerce: Building a Model", Art. Communications Week recovered via Dialog Database on Feb. 15, 2008., (Mar. 17 1997), p. 57.

Lassila, Ora, "Web metadata; A Matter of Semantics", IEEE Internet Computing, v2i4pg30 Proquest #1424143061, (1998), 15 pgs.

Mardesich, Jodi, "Site Offers Clearance for End-of-Life Products—Onsale Takes Auction Gavel Electronic", Computer Reseller News, (Jul. 8, 1996), 2 pps.

Merrill, K., "GE Capital to Extend Integrator Buying Spree", Computer Reseller News, (Jul. 1996), pp. 2 and 32.

Tak, Y., et al., "The SIFT Information Dissemination System", ACM Transactions on Database Systems. vol. 24, Issue 4. ACM Press, (Dec. 1999), 529-565.

Tapscott, D., "eBay endagners traditional papers auctioneer can pack far more punch in your sales pitch", National Post, Proquest# 54945579, (Oct. 9, 1999), 3 pgs.

Wilson, D., "Going . . . Going . . . Gone!Bargain-hunters and collectors can scour auctions from home via the internet", The Gazette, Proquest #4116732, (Apr. 27, 1999), 4 pgs.

"U.S. Appl. No. 09/905.525, Final Office Action mailed Jun. 29, 2006", 14 pgs.

"U.S. Appl. No. 09/905,525, Non Final Office Action mailed Jun. 25, 2007", 16 pgs.

"U.S. Appl. No. 09/905,525, Non Final Office Action mailed Dec. 12, 2005", 12 pgs.

"U.S. Appl. No. 09/905,525, Non Final Office Action mailed Dec. 14, 2004", 11 pgs.

"U.S. Appl. No. 09/905,525, Non Final Office Action mailed Dec. 18, 2006", 15 pgs.

"U.S. Appl. No. 09/905,525, Response filed Mar. 19, 2007 to Non Final Office Action mailed Dec. 18, 2006", 9 pgs.

"U.S. Appl. No. 09/905,525, Response filed Apr. 12, 2006 to Non Final Office Action mailed Dec. 12, 2005", 8 pgs.

"U.S. Appl. No. 09/905,525, Response filed Apr. 13, 2005 to Non Final Office Action mailed Dec. 14, 2004", 17 pgs.

"U.S. Appl. No. 09/905,525, Response filed Sep. 22, 2006 to Final Office Action mailed Jun. 29, 2006", 19 pgs.

"U.S. Appl. No. 09/976,301, Advisory Action mailed Sep. 30, 2005", 3 pgs.

"U.S. Appl. No. 09/976,301, Advisory Action mailed Nov. 30, 2006", 3 pgs.

"U.S. Appl. No. 09/976,301, Final Office Action mailed Jul. 13, 2005", 11 pgs.

"U.S. Appl. No. 09/976,301, Final Office Action mailed Aug. 25, 2006", 14 pgs.

"U.S. Appl. No. 09/976,301, Non Finai Office Action mailed Mar. 9, 2007", 13 pgs.

"U.S. Appl. No. 09/976,301, Non Final Office Action mailed Nov. 24, 2004", 31 pgs.

"U.S. Appl. No. 09/976,301, Non Final Office Action mailed Dec. 16, 2005", 17 pgs.

"U.S. Appl. No. 09/976,301, Response filed Apr. 6, 2005 to Non Final Office Action mailed Nov. 24, 2004", 15 pgs.

"U.S. Appl. No. 09/976,301, Response filed May 16, 2006 to Non Final Office Action mailed Dec. 16, 2005", 24 pgs.

"U.S. Appl. No. 09/976,301, Response filed Jun. 7, 2007 to Non Final Office Action mailed Mar. 9, 2007", 7 pgs.

"U.S. Appl. No. 09/976,301, Response filed Sep. 13, 2005 to Final Office Action mailed Jul. 13, 2005", 13 pgs.

"U.S. Appl. No. 09/976,301, Response filed Oct. 13, 2005 to Advisory Action mailed Sep. 30, 2005", 14 pgs.

"U.S. Appl. No. 09/976,301, Response filed Oct. 24, 2006 to Final Office Action mailed Aug. 25, 2006", 6 pgs.

"U.S. Appl. No. 09/976,301, Response filed Dec. 13, 2007 to Non-Final Office Action mailed Sep. 13, 2007", 17 pgs.

"U.S. Appl. No. 09/976,301, Response filed Dec. 20, 2006 to Advisory Action mailed Nov. 30, 2006", 16 pgs.

"U.S. Appl. No. 10/252,127, Advisory Action mailed Jan. 10, 2007", 3 pgs.

"U.S. Appl. No. 10/252,127, Final Office Action mailed Oct. 6, 2006", 10 pgs.

"U.S. Appl. No. 10/252,127, Non Final Office Action mailed Mar. 21, 2006", 9 pgs.

"U.S. Appl. No. 10/252,127, Non Final Office Action mailed Jul. 11, 2007", 9 pgs.

"U.S. Appl. No. 10/252,127, Response filed Jun. 21, 2006 to Non Final Office Action mailed Mar. 21, 2006", 8 pgs.

"U.S. Appl. No. 10/252,127, Response filed Oct. 11, 2007 to Non-Final Office Action mailed Jul. 11, 2007", 15 pgs.

"U.S. Appl. No. 10/252,127, Response filed Dec. 6, 2006 to Final Office Action mailed Oct. 6, 2006", 14 pgs.

"U.S. Appl. No. 10/252,129, Non Final Office Action mailed May 15, 2007", 10 pgs.

"U.S. Appl. No. 10/252,129, Final Office Action mailed Dec. 27, 2006", 12 pgs.

"U.S. Appl. No. 10/252,129, Response filed Aug. 13, 2007 to Non-Final Office Action mailed May 15, 2007", 16 pgs.

"U.S. Appl. No. 10/252,129, Response filed Oct. 5, 2006 to Non Final Office Action mailed Aug. 18, 2006", 15 pgs.

"U.S. Appl. No. 10/252,129, Response filed Nov. 26, 2007 to Final Office Action mailed Oct. 5, 2007", 15 pgs.

"U.S. Appl. No. 10/831,421, Non-Final Office Action mailed Nov. 28, 2007", 12 pgs.

"Auction Watch: Buyer and Seller Services", [Online]. Retrieved from the Internet: <URL: http://web.archive.org/web/20000830150100/http://www.auctionwatch.com>, (Aug. 15, 2000), 30 pgs.

"Blackthorne Products Page", [Online]. Retrieved from the Internet: <URL: http://web.archive.org/web/19990508065201/www.blackthornesw.com/Bthome/products>, (1999), 2 pgs.

"Chinese Application Serial No. 02824589, Office Action mailed Mar. 23, 2007", 16 pgs.

"Ebay—Your Personal Trading Community", [Online]. Retrieved from the Internet: <URL: http://web.archive.org/web/19991007062815/www.ebay.com>, (Oct. 1999), 23 pgs.

"Frequently Asked Questions about Mister Lister", [Online]. Retrieved from the Internet: <URL: http://pages.ebay.co.uk/help/sellerguide/mr-lister-faq.html>, (Copyright 1995-2005), 5 pgs.

"International Application Serial No. PCT/US00/17136 International Search Report mailed Nov. 16, 2000", 6 pgs.

"International Application Serial No. PCT/US00/17136, International Search Report mailed Nov. 16, 2000", 5 pgs.

"International Application Serial No. PCT/US00/32088, International Search Report mailed Apr. 4, 2001", 6 pgs.

"International Application Serial No. PCT/US01/02584, International Search Report mailed Apr. 16, 2001", 4 pgs.

"International Application Serial No. PCT/US01/04811, International Search Report mailed Jun. 28, 2001", 6 pgs.

"International Application Serial No. PCT/US01/12398 International Search Report mailed Aug. 27, 2001", 3 pgs.

"International Application Serial No. PCT/US01/13253, International Search Report mailed Jul. 31, 2001", 1 pg.

"International Application Serial No. PCT/US01/23854, International Search Report mailed Dec. 28, 2001", 6 pgs.

"International Application Serial No. PCT/US02/04692, International Search Report mailed Jun. 12, 2002", 5 pgs.

"International Application Serial No. PCT/US03/17915, International Search Report mailed Nov. 26, 2003", 6 pgs.

"International Application Serial No. PCT/US99/18510, International Search Report mailed Oct. 29, 1999", 4 pgs.

"International Application Serial No. PCT/US99/29312, International Search Report mailed Apr. 18, 2000", 6 pgs.

"New eBay-like auction software released", Business Wire, Business Editors/High-Tech Writers; Business Wire; New York, (Mar. 17, 1999), 2 pp.

"Onsale Joins Fray as Online Shopping Picks Up Speed: Internet Booms", Computer Reseller News, CMP Publications, Inc., USA, (Jun. 5, 1995), 1 pg.

"Onsale: Onsale Brings Thrill of Auctions and Bargain Hunting Online; Unique Internet retail service debuts with week-long charity auction for The Computer Museum in Boston", Business Wire, Dialog Web. 0489267 BW0022, (May 24, 1995), 3 pages.

"Thin Client", [Online]. Retrieved from the Internet: <URL:http://en.wikipedia.org/wiki/Thin_client>, (Feb. 15, 2008), 13 pgs.

"Thin Client Computing", [Online]. Retrieved from the Internet: <URL: http://web.archive.org/web/20040122033629/http://www.thinclient.net>, (Jan. 22, 2004), 24 pgs.

"Yahoo Homepage", Internet Archive Wayback Machine, http://web.archive.org/web/19991003015603/http://www.yahoo.com/index.html, (Oct. 3, 1999), 1 p.

"Yahoo!—Regional:Countries:Afghanistan", [Online], Retrieved from the Internet: <URL: http://web.archive.org/web/20060921181441/http://dir.yahoo.com/Regional/countries/afghanistan>, (Jun. 16, 1997), 1 pg.

"Yahoo!—Regional:Countries:Sweden", [Online]. Retrieved from the Internet; <URL: http://web.archive.org/web/19970616194441/www.yahoo.com/Regional/Countries/Sweden/>, (Jun. 16, 1997), 2 pgs.

"Yahoo! Auctions Celebrates One-Year Anniversary; As Online Auction Usage Continues to Grow, Yahoo! Is Quickly Becoming the World Marketplace of the New Millennium", Business Wire, (Sep. 14, 1999), 3 pages.

Akin, David, "Web retailing gains market muscle as concerns fade: Record season: Increasing number of sites catering for Canadian dollars", Financial Post, p. 04, XP002905105, (Dec. 26, 1998), 3 pages.

Alice, Michele, "eBay's 'Mister Lister' Auction Management Software", Auctionbytes-Update, No. 22, [Online]. Retrieved from the Internet: <URL: http://www.auctionbytes.com/cab/abu/y200/m09/abu0022/s05>, (Sep. 24, 2000), 3 pgs.

Andale.Com, "Andale Lister", [Online]. [Archived Oct. 25, 2002]. Retrieved from the Internet: <URL: http://web.archive.org/web/20021025121452/http://www.andale.com/corp/products/sell.jsp>, 3 pgs.

Andale.Com, "Andale Lister: Bulk List", [Online]. [Archived Oct. 5, 2002]. Retrieved from the Internet; <URL: http://web.archive.org/web/20021005074745/http://www.andale.com/corp/products/qs_sell_details_bulklist.jsp>, 1 pg.

Andale.Com, "Andale lister: Design Center", [Online]. [Archived Dec. 15, 2004]. Retrieved from the Internet: <URL: http://web.archive.org/web/20021215192044/http://www.andale.com/corp/products/qs_sell_details_designcenter.jsp>, 1 pg.

Andale.Com, "Andale Lister: In-Line Images", [Online]. [Archived Dec. 15, 2002]. Retrieved from the Internet: <URL: http://web.archive.org/web/20021215192408/http://www.andale.com/corp/products/qs_sell_details_inlineimg.jsp>, 1 pg.

Andale.Com, "Andale Lister: Inventory Dashboard", [Online]. [Archived Dec. 15, 2002]. Retrieved from the Internet: <URL: http://web.archive.org/web/20021215192408/http://www.andale.com/corp/products/qs_sell_details_invdashboard.jsp, 2 pgs.

Andale.Com, "Andale Lister: Launch Scheduler", [Online]. [Archived Dec. 15, 2002]. Retrieved from the Internet: <URL: http://web.archive.org/web/20021215192724/http://www.andale.com/corp/products/qs_sell_details_launchsched.jsp, 1 pg.

Andale.Com, "Andale Lister: Online or Offline", [Online]. [Archived Dec. 15, 2002]. Retrieved from the Internet: <URL: http://web.archive.org/web/20021215194722/http://www.andale.com/corp/products/qs_sell_details_onoffline.jsp>, 2 pgs.

Andale.Com, "Andale Lister: Overview", [Online]. [Archived Dec. 1, 2002]. Retrieved from the Internet: <URL: http://web.archive.org/web/20021201081906/http://www.andale.com/corp/products/qs_overview.jsp, 4 pgs.

Auctionwatch.Com, et al., AuctionWatch.com's Official Guide to Online Buying and Selling: Professional Tips, Tactics and Techniques at Your Fingertips., Prima Publishing, Roseville, CA. ISBN 0-7615-2999-3, (2000). 307 pgs.

Auctionwatch.Com, et al., "AuctionWatch CD", AuctionWatch.com's Official Guide to Online Buying and Selling: Professional Tips, Tactics and Techniques at Your Fingertips., Prima Publishing, Roseville, CA., (2000).

Baumann, G. W, "'Personal Optimized Decision/Transaction Program", IBM Technical Disclosure Bulletin,, (Jan. 1995), 83-84.

Business Wire, "Bay Builder Releases Major Innovation for Online Wireless Auctions.", Recovered via Dialog Database on Feb. 15, 2008, (Mar. 10, 2000). 2 pgs.

Business Wire, "Mediappraise Receives National Award for Web-based Technology That Enables Companies to Solve Thorny HR Problem", Business Wire, (Dec. 14, 1998), 1-2.

Business Wire, "Subasta.com Enters Into Strategic Partnership with From2.com" Business Wire, Obtained from Proquest, Document No. 43206061, (Jul. 16, 1999), 2 pages.

Business Wire, "Subasta.com, the Premier Online Auction Board for Latin America, Spain, and the Hispanic Sector of the U.S., Has Attracted Over 60,000 Viewers in Less Than Two Months!", Business Wire, (Jul. 16, 1999), 2 pages.

Business Wire, "Yahoo! Launches Three New European Auctions Services; Yahoo! Italy, Yahoo! Spain and Yahoo! Sweden Unveil New Local Auctions", Business Wire, Obtained from Proquest, Document No, 45061209, (Sep. 23, 1999), 3 pages.

Clemons; E, "Evaluating the prospects for alternative electronic securities", Proceedings of ICIS 91: 12th International Conference on Information Systems, (Dec. 16-18, 1991), 53-61.

Cooper, C., et al., "Playing Catch-Up: U.S. Web Firms Get Slow Start in Europe, Amid Crowded Field—Used to Being First and Best at Home, They Stumble in World's No. 2 Market—Pouncing on Amazon Delays", Wall Street Journal Europe, Obtained from Proquest, Document No. 46338867, (Nov. 15, 1999), 5 pages.

Graham, I, "The Emergence of Linked Fish Markets in Europe", Focus Theme, 1-3.

Hansell, Saul, "Meg Whitman and eBay, Net Survivors", New York Times, (May 5, 2002), 5 pgs.

Hess, C M. et al., "Computerized Loan Organization System: An Industry Case Study of the Electronic Markets Hypothesis", MIS Quarterly, vol. 18(3), (Sep. 1994), 251-274.

Klein, Stefan, "Introduction to Electronic Auctions"; Focus Theme, vol. 7, No. 4, (1997), 1-4.

Lee, H. G, "Electronic brokerage and electronic auction; the impact of IT on market structures", Proceedings of the Twenty-Ninth Hawaii International Conference on System Sciences, vol. 4, (1996), 397-406.

Lee, Ho Geun, "AUCNET: Electronic Intermediary for Used-Car Transactions", Focus Theme, Electronic Markets, vol. 7, No. 4, (1997), 24-28.

M2 PressWire, "HP completes online strategy with launch of e-commerce site", Proquest#43225990, (Jun. 29, 1999), 3 pgs.

M2 Presswire, "United Technologies: UTC's Carrier Corp. teams with FreeMarkets to create largest Asian-based B2B online auction market to date; UTC Division identifies average annual savings of more than 16 percent on electric motors through FreeMarkets B2B eMarketpla", M2 Presswire, (Mar. 22, 2000), 2 pages.

Malone, T., et al., "Electronic Markets and Electronic Hierarchies", Communications of the ACM, 14(25), (Jun. 1987), 484-497.

Massimb, Marcel, "Electronic Trading, Market Structure and Liquidity", Financial Analysts Journal, 50(1), (Jan./Feb. 1994), 39-50.

McClenahen, John, "Net Gains"; Industry Week,Proquest # 41808971,., (May 17, 1999); 8 pgs.

Meade, J., "Visual 360: A Performance Appraisal System That's 'Fun'", HR Magazine, Society for Human Resource Management., (Jul. 1999), 3 pgs.

Neo, B S, "The Implementation of an electronic market for pig trading in Singapore", Journal of Strategic Information Systems; vol. 1(5), (Dec. 1992), 278-288.

Pollick, M., "Sold! on eBay: As antique and collectible dealers see their sales increase through online auctions such as eBay, more of them are deciding that the internet is not something to be afraid of", Sarasota Herald Tribune, Obtained from Proquest, Document No. 45499060, (Oct. 11, 1999), 8 pages.

Post, D L, et al., "Application of auctions as a pricing mechanism for the interchange of electric power", IEEE Transactions on Power Systems, 10(3), (Aug. 1995), 1580-1584.

PR Newswire Europe Ltd., "Mitsubishi Venture, Wells Fargo Partner to Offer Multi-Currency E-Commerce Storefront", PR Newswire, Obtained from Proquest, Document No. 39345965, (Mar. 1, 1999), 3 pages.

Priest, Chris, et al., "Adaptive Agents in a Persistent Shout Double Auction", International Conference on Information and Computation Economies, Proceedings of the first international conference on Information and computation economies, (1999), 11-18.

Pressler, Margaret, "Sells on eBay; Housewife finds herself head of multinational software firm", Washington Post, Proquest # 44484325, (Sep. 5, 1999), 3 pgs.

Queree, Anne, "Bid it Out", Global Finance, (Jan. 2000), 36-37.

Reck, M., "Formally Specifying an Automated Trade Execution System", The Journal of Systems and Software, 1993, Elsevier Science Publishing, USA, (1993), 245-252.

Reck, Martin, "Trading-Process Characteristics of Electronic Auctions", Focus Theme, vol. 7, No. 4, (1997), 17-23.

Resnick, Paul, "Reputation systems", Communications of the ACM, 43(12), (Dec. 2000), 45-48.

Rockoff, T E, et al., "Design of an Internet-based system for remote Dutch auctions", Internet Research: Electronic Networking Applications and Policy, vol. 5(4), (Jan. 1, 1995), 10-16.

Schmid, B F, "The Development of Electronic Commerce", EM—Electronic Markets, No. 9-10, (Oct. 1993), 2 pgs.

Schneider, G. M, et al., "An Introduction to Programming and Problem Solving with Pascal", An Introduction to Programming and Problem Solving with Pascal, Second Edition, John Wiley & Sons, Inc., New York, (1982) 3 Pages.

Siegmann, Ken, "Nowhere to go but up", PC Week; vol. 12(42), Ziff-Davis Publishing Company, (Oct. 23, 1995), 1-3.

Tjostheim, Ingvar, "A case study of an on-line auction for the World Wide Web", Norwegian Computing Center (NR), 1-10.

Turban, Efraim, "Auctions and Bidding on the Internet: An Assessment", Focus Theme, EM—Electronic Markets, vol. 7, No, 4, (1997), 7-11.

Van Heck, E., et al., "Experiences with Electronic Auctions in the Dutch Flower Industry", Focus Theme, Erasmus University, The Netherlands, 6 pgs.

Warbelow, A, et al., "Aucnet: TV Auction Network System", Harvard Business School Case/Study, HBVR#-9-190-001, USA, (Jul. 1989), 1-15.

Wilson, T., "Act Globally, Think Locally", InternetWeek, Issue 789, Obtained from Proquest, Document No. 46352181, (Nov. 15, 1999), 4 p.

Zwass, V., "Electronic Commerce: Structures and Issues", International Journal of Electronic Commerce, Fall 1996, vol. 1, No. 1, (Fall 1996), 3-23.

"U.S. Appl. No. 10/831,421, Response Filed Nov. 30, 2011 to Non-Final Office Action -mailed Aug. 31, 2011", 11 pgs.

"U.S. Appl. No. 11/508,420, Non Final Office Action mailed Oct. 5, 2011", 12 pgs.

"U.S. Appl. No. 11/508,420, Non Final Office Action mailed Mar. 9, 2012", 11 pgs.

"U.S. Appl. No. 12/783,458, Non Final Office Action mailed Mar. 8, 2012", 16 pgs.

"Chinese Application Serial No. 201110049654.X, Office Action mailed Jan. 5, 2012", With English Translation, 10 pgs.

* cited by examiner

| Seller Application | | | | | | | | | | |
|---|---|---|---|---|---|---|---|---|---|---|
| File Edit View Tools Actions Help | | | | | | | | | | |
| Create New | Edit | Duplicate | Duplicate As | Delete | Hide Folder | Upload All | View Online | | | |
| Item Inventory (19) | Listings Waiting to Upload (24) | | | | | | | | | |
| Below are your scheduled listing waiting to be uploaded Click 'Upload All' to connect eBay. | | | | | | | | | | |
| Listing Title | Start Date & Time | | Format | Qty | Duration | Start Price | BIN Price | Total Fee | | |
| Compaq ipaq 3650 For Sale | 01/02/2002 | 11:00AM | Auction | 1 | 7 days | $1.00 | $0.00 | $0.30 | | |
| Compaq ipaq 3650 For Sale | 01/02/2002 | 11:05AM | Auction | 1 | 7 days | $1.00 | $0.00 | $0.30 | | |
| Compaq ipaq 3650 For Sale | 01/02/2002 | 11:10AM | Auction | 1 | 7 days | $1.00 | $0.00 | $0.30 | | |
| Compaq ipaq 3650 For Sale | 01/02/2002 | 11:15AM | Auction | 1 | 7 days | $1.00 | $0.00 | $0.30 | | |
| Compaq ipaq 3650 For Sale | 01/02/2002 | 11:20AM | Auction | 1 | 7 days | $1.00 | $0.00 | $0.30 | | |
| Compaq ipaq 3650 For Sale | 01/02/2002 | 11:25AM | Auction | 1 | 7 days | $1.00 | $0.00 | $0.30 | | |
| Compaq ipaq 3650 For Sale | 01/02/2002 | 11:30AM | Auction | 1 | 7 days | $1.00 | $0.00 | $0.30 | | |
| Compaq ipaq 3650 For Sale | 01/02/2002 | 11:35AM | Auction | 1 | 7 days | $1.00 | $0.00 | $0.30 | | |
| Compaq ipaq 3650 For Sale | 01/02/2002 | 11:40AM | Auction | 1 | 7 days | $1.00 | $0.00 | $0.30 | | |
| Compaq ipaq 3650 For Sale | 01/02/2002 | 11:45AM | Auction | 1 | 7 days | $1.00 | $0.00 | $0.30 | | |
| Compaq ipaq 3650 For Sale | 01/02/2002 | 11:50AM | Auction | 1 | 7 days | $1.00 | $0.00 | $0.30 | | |
| Compaq ipaq 3650 For Sale | 01/02/2002 | 11:55AM | Auction | 1 | 7 days | $1.00 | $0.00 | $0.30 | | |
| Compaq ipaq 3650 For Sale | 01/02/2002 | 12:00PM | Auction | 1 | 7 days | $1.00 | $0.00 | $0.30 | | |
| Compaq ipaq 3650 For Sale | 01/02/2002 | 12:05PM | Auction | 1 | 7 days | $1.00 | $0.00 | $0.30 | | |
| Compaq ipaq 3650 For Sale | 01/02/2002 | 12:10PM | Auction | 1 | 7 days | $1.00 | $0.00 | $0.30 | | |
| Compaq ipaq 3650 For Sale | 01/02/2002 | 12:15PM | Auction | 1 | 7 days | $1.00 | $0.00 | $0.30 | | |
| Compaq ipaq 3650 For Sale | 01/02/2002 | 12:20PM | Auction | 1 | 7 days | $1.00 | $0.00 | $0.30 | | |
| Compaq ipaq 3650 For Sale | 01/02/2002 | 12:25PM | Auction | 1 | 7 days | $1.00 | $0.00 | $0.30 | | |
| | | | | | Change Start Time | | | Upload All | | |

| | Title | Format | Duration | Start Time | Actions |
|---|---|---|---|---|---|
| ☐ | SoundBlaster Adigy Store Item | ⛁ Stores | 7 Days | 3/4/2002 12:00 PM | edit |
| ☐ | SoundBlaster Adigy Store Item | ⛁ Stores | 7 Days | 1/2/2002 12:55 PM | edit |
| ☐ | SoundBlaster Adigy for Sale | ⚖ Auction | 7 Days | 1/2/2002 12:50 PM | edit |
| ☐ | SoundBlaster Adigy for Sale | ⚖ Auction | 7 Days | 1/2/2002 12:45 PM | edit |
| ☐ | SoundBlaster Adigy for Sale | ⚖ Auction | 7 Days | 1/2/2002 12:40 PM | edit |
| ☐ | SoundBlaster Adigy for Sale | ⚖ Auction | 7 Days | 1/2/2002 12:35 PM | edit |
| ☐ | SoundBlaster Adigy for Sale | ⚖ Auction | 7 Days | 1/2/2002 12:30 PM | edit |
| ☐ | SoundBlaster Adigy for Sale | ⚖ Auction | 7 Days | 1/2/2002 12:25 PM | edit |
| ☐ | SoundBlaster Adigy for Sale | ⚖ Auction | 7 Days | 1/2/2002 12:20 PM | edit |
| ☐ | SoundBlaster Adigy for Sale | ⚖ Auction | 7 Days | 1/2/2002 12:15 PM | edit |

[Select All] [Reschedule] [Remove]     [Go]

1 2

[Select All] [Reschedule] [Remove]

FIG. 19A

| Title | Format | Duration | Start Time |
|---|---|---|---|
| SoundBlaster Adigy for Sale | ⚙ Auction | 7 Days | 1/2/2002 12:00:00 PM |
| SoundBlaster Adigy for Sale | ⚙ Auction | 7 Days | 1/2/2002 12:05:00 PM |
| SoundBlaster Adigy for Sale | ⚙ Auction | 7 Days | 1/2/2002 12:10:00 PM |
| SoundBlaster Adigy for Sale | ⚙ Auction | 7 Days | 1/2/2002 12:15:00 PM |
| SoundBlaster Adigy for Sale | ⚙ Auction | 7 Days | 1/2/2002 12:20:00 PM |

Reschedule to start on [Tue, Mar 05 ▽] [9:00 PM ▽] US Time (PST)

☐ Space out multiple listings at [1 mins ▽] intervals

[Reschedule] [Cancel]

PUBLISHING USER SUBMISSIONS AT A NETWORK-BASED FACILITY

This application is a continuation of U.S. patent application Ser. No. 10/252,126, filed on Sep. 20, 2002, which claims the benefit of U.S. Provisional Application No, 60/387,638, filed. Jun. 10, 2002, both of which are incorporated herein by reference in their entirety.

FIELD OF THE INVENTION

The present invention relates generally to the field of network-based commerce and, more specifically, to a method and system for scheduling transaction listings at a network-based transaction facility.

BACKGROUND OF THE INVENTION

With the wide spread acceptance of the Internet as an ubiquitous, interactive communication and interaction platform, on-line (or electronic) commerce conducted over the Internet has become commonplace in a variety of business environments. On-line commerce is traditionally categorized as business-to-business (B2B), business-to-consumer (B2C), consumer-to-consumer (C2C) and even business-to-employee (B2E) commerce. In the B2B environment, a number of online exchanges or marketplaces (e.g., vertical exchanges) have been established with a view to facilitating electronic commerce between parties, for example, within a vertical supply chain. Such B2B exchanges typically provide a number of tools for facilitating commerce, such as aggregated and near real-time inventory information, Requests for Quotation (RFQ) capabilities and auctions.

In the B2C and C2C environments, a number of marketplace exchanges and transaction facilities have proved popular. A leading electronic transaction facility (or market place) is operated by eBay, Incorporated. Electronic marketplaces are also provided by Yahoo! Incorporated and Amazon.com. Further, a number of on-line services offer on-line classifieds, such as the Yahoo! Classifieds service offered by Yahoo! Incorporated.

A number of the on-line marketplaces are utilized by merchants as an important, if not a primary, distribution channel for products. Such so-called "power users" typically list a large number of items to be sold or auctioned each day. Further, various retailers and merchants also utilize free, or low-cost, classified advertisement services offered on the Internet, such as Yahoo! Classifieds. For example, a used-car sales operation may, at any time, place a number of such classified advertisements via an on-line classified advertisement service. It would be helpful to provide merchants with a way to create and propagate multiple items to a network-based marketplace.

SUMMARY OF THE INVENTION

According to the present invention, there is provided a method to facilitate propagating a plurality of transaction listings to a network-based transaction facility. An input interface is presented at a seller application to receive from a user, a plurality of transaction listings, each transaction listing including an associated start time. Also, a data file is composed at the seller application to include the plurality of transaction listings. Moreover, the data file is propagated, using the seller application, from the client computer to the network-based transaction facility.

BRIEF DESCRIPTION OF THE DRAWINGS

The present invention is illustrated by way of example and not limitation in the figures of the accompanying drawings, in which like references indicate similar elements and in which:

FIGS. 15A-15E illustrate interfaces that may be presented to a user by a network-based transaction facility so as to allow creating, editing, and deleting collections of transaction listings and of individual transaction listings.

FIGS. 19A and 19B illustrate interfaces that may be presented to a user by a network-based transaction facility so as to allow the viewing, editing, previewing and confirmation of collections of transaction listings and of individual transaction listings.

DETAILED DESCRIPTION

Figure 1:
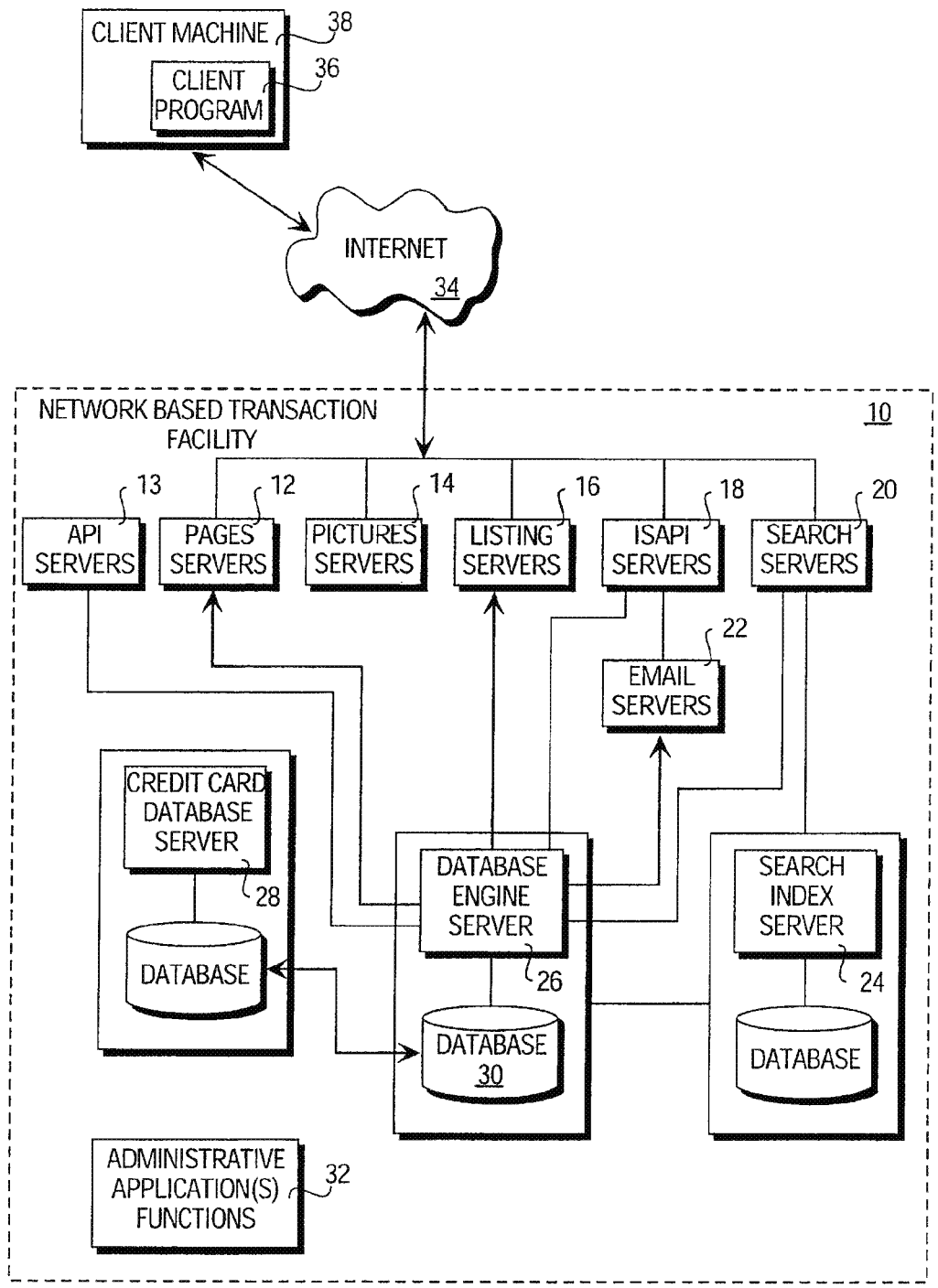
FIG. 1 is a block diagram illustrating an exemplary network-based transaction facility, according to one embodiment of the present invention.

A method and system for scheduling transaction listings at a network-based transaction facility are described. In the following description, for purposes of explanation, numerous specific details are set forth in order to provide a thorough understanding of the present invention. It will be evident, however, to one skilled in the art that the present invention may be practiced without these specific details.

Terminology

The term "user" shall be taken to refer to any entity, human or automated, that contributes to, or participates in, a transaction, communication or process.

The term "transaction" shall be taken to include any communication or exchange between two or more parties with a view to establishing a business agreement, exchange of value or a commercial relationship. Accordingly, the word "transaction" shall be deemed to cover, but not be limited to, a purchase-and-sale transaction established as a result, for example, of the placement of an advertisement or as a result of the conclusion of an auction process, the auction process being conducted on-line or otherwise.

The term "upgrade" shall be taken to include upgrades and updates. Accordingly, the word "upgrade" shall be deemed to cover, but not be limited to, modifications to existing software modules and data elements.

The term "targeted site" shall be taken to include a site (e.g., website) targeted according to geography (e.g., continent, country, region, etc.), subject matter (e.g., Beanie Babies, baseball memorabilia, antique cars, etc.), purpose (e.g., commercial, non-profit, etc.), demographics (e.g., Spanish language, English language, etc.), etc. In fact, any combination (e.g., geography, purpose, and demographics) of the above or other criteria may be used in describing a "targeted site."

The term "web site" shall be taken to mean a related collection of World Wide Web (WWW) files that include a beginning file called a home page. Thousands of companies and individuals have one or multiple websites. A company or an individual tells you how to get to their web site(s) by giving you a home page address. From the home page, you can get to all the other pages on the site. For example, the web site for eBay has the home page address of http://www.eBay.com. The home page address for eBay leads to many other pages. (But a web site can also be just a few pages A very large web site may be spread over a number of servers in different geographic locations. The web sites of certain company's consist of thousands of files spread out over many servers in world-wide locations. But a more typical example is probably a web site that resides on a commercial space provider's web server with a number of other web sites, where all of the web sites may or may not have anything to do with each other.

While an exemplary embodiment of the present invention is discussed below with reference to "items", it will be appreciated that the present invention is not so limited. Accordingly, the word "item" shall be deemed to cover, but not be limited to, a transaction listing.

The term "data file" shall be taken to mean a collection of transaction listings. Accordingly, the phrase "data file" shall be deemed to cover, but not be limited to, a collection of transaction listings, for example, which is being propagated to a network-based transaction facility.

Transaction Facility

FIG. 1 is block diagram illustrating an exemplary network-based transaction facility 10. While an exemplary embodiment of the present invention is described within the context of a network-based transaction facility 10, the invention will find application in many different types of computer-based, and network-based, facilities (commerce, transaction or otherwise).

The network-based transaction facility 10, in an exemplary embodiment, includes one or more of a number of types of front-end servers that each includes at least one Dynamic Link Library (DLL) to provide certain functionality. Page servers 12 deliver web pages (e.g., markup language documents), picture servers 14 dynamically deliver images to be displayed within Web pages, listing servers 16 facilitate category-based browsing of listings, search servers 20 that handle search requests to the network-based transaction facility 10 and facilitate keyword-based browsing of listings, and ISAPI servers 18 provide an intelligent interface to the back-end of the network-based transaction facility 10. E-mail servers 22 provide, inter alia, automated e-mail communications to users of the network-based transaction facility 10. Administrative applications(s) functions 32 facilitate monitoring, maintaining, and managing the network-based transaction facility 10. API servers 13 provide a set of functions for querying the network-based transaction facility 10. The API is a set of easy to use functions called through the HTTP transport protocol. Information is sent and received using a standard XML data format. Applications utilized to interact (e.g., upload transaction listings, review transaction listings, manage transaction listings, etc.) with the network-based transaction facility may be designed to use the API. Such applications may be an HTML form or a CGI program written in C++, Perl, Pascal, or any other programming language. The API is more fully described in U.S. patent application Ser. No. 09/999,618, herein incorporated by reference.

The page servers 12, API servers 13, picture servers 14, ISAPI servers 18, search servers 20, e-mail servers 22 and database engine server 26 may individually, or in combination, act as a communication engine to facilitate communications between, for example, the client machine 38 and the network-based transaction facility 10. In addition, the page servers 12, API servers 13, picture servers 14, ISAPI servers 18, search servers 20, e-mail servers 22 and database engine server 26 may individually, or in combination, act as a transaction engine to facilitate transactions between, for example, the client machine 38 and the network-based transaction facility 10. Furthermore, the page servers 12, API servers 13, picture servers 14, ISAPI servers 18, search servers 20, e-mail servers 22 and database engine server 26 may individually, or in combination, act as a display engine to facilitate the display of items between, for example, the client machine 38 and the network-based transaction facility 10.

The back-end servers include a database engine server 26, a search index server 24 and a credit card database server 28, each of which maintains and facilitates access to a respective database.

The network-based transaction facility 10 may be accessed by a client program, such as for example a browser 36 (e.g., the Internet Explorer distributed by Microsoft Corp. of Redmond, Wash.) that executes on a client machine 38 and accesses the network-based transaction facility 10 via a network such as, fir example, the Internet 34. Other examples of networks that a client may utilize to access the network-based transaction facility 10 include a wide area network (WAN), a local area network (LAN), a wireless network (e.g., a cellular network), or the Public Switched Telephone Network (PSTN) network.

Database Structure

Figure 2:
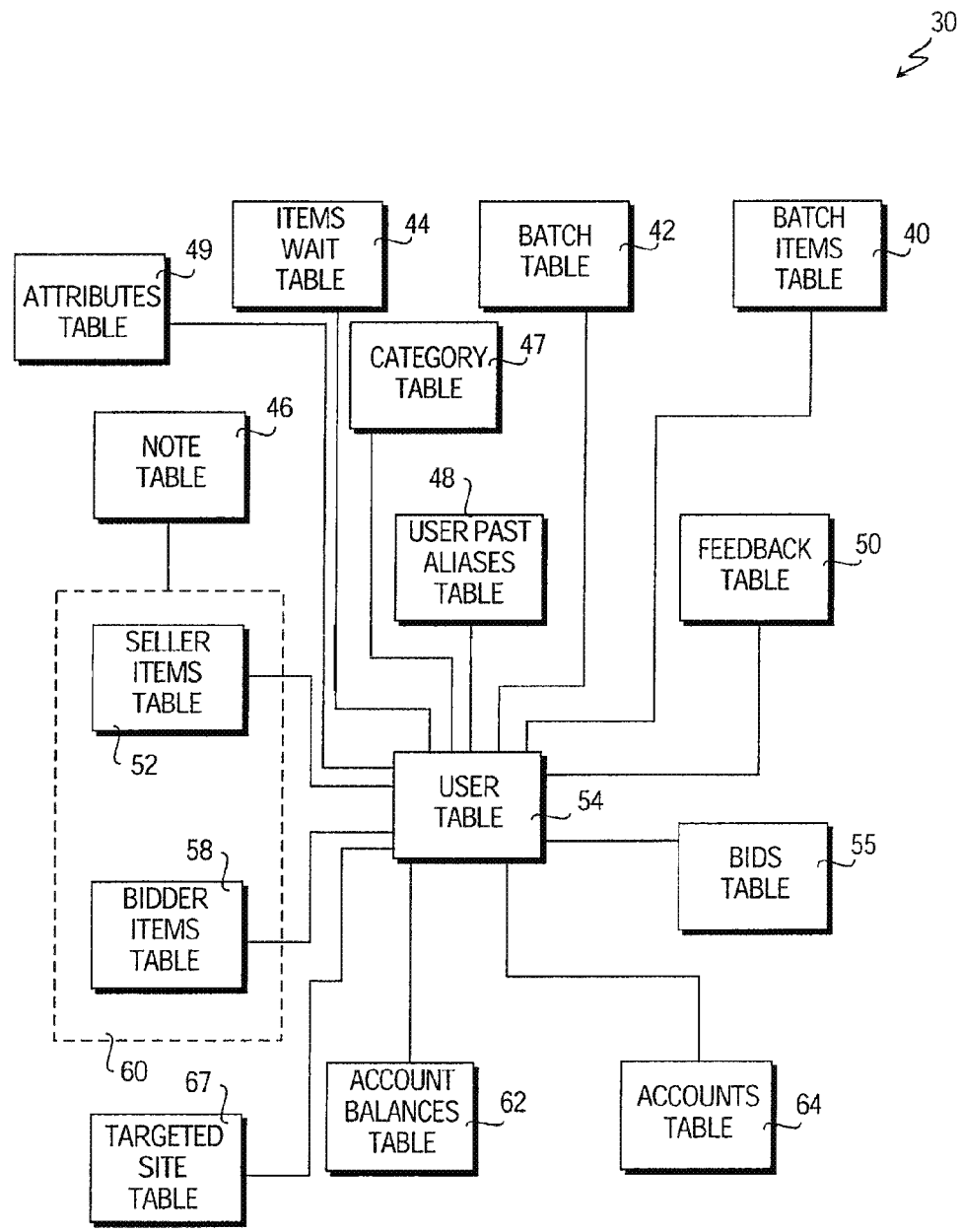
FIG. 2 is a database diagram illustrating an exemplary database maintained and accessed by a database engine server of the network-based transaction facility.

FIG. 2 is a database diagram illustrating an exemplary database 30, maintained by and accessed via the database engine server 26, which at least partially implements and supports the network-based transaction facility 10. In the exemplary embodiment, the database engine server 26 maintains two databases $30_a$ and $30_b$, a first database $30_a$ being maintained for listing (or offering) information that is not included within a virtual "store" according to the present invention, with a second database $30_b$ storing offering information for offerings that are presented via virtual "stores" supported by the network-based transaction facility 10. The structure of these databases $30_a$ and $30_b$ are substantially the same, but differ in that the tables of the "store" database $30_b$ may include a number of additional fields to facilitate the virtual stores. A general discussion of the basic structure of a database 30 is presented below, this being applicable to both databases $30_a$ and $30_b$.

The database 30 may, in one embodiment, be implemented as a relational database, and includes a number of tables having entries, or records, that are linked by indices and keys. In an alternative embodiment, the database 30 may be implemented as collection of objects in an object-oriented database.

Central to the database 30 is a user table 54, which contains a record for each user of the network-based transaction facility 10. A user may operate as a seller, buyer, or both, when utilizing the network-based transaction facility 10. The database 30 also includes items tables 60 that may be linked to the user table 54. The items tables 60 may include a seller items table 52 and a bidder items table 58. A user record in the user table 54 may be linked to multiple items that are being, or have been, listed or offered for sale via the network-based transaction facility 10. A link indicates whether the user is a seller or a bidder (or buyer) with respect to items for which records exist within the items tables 60.

The database 30 also includes one or more category tables 47. Each record within the category table 47 describes a respective category. In one embodiment, a specific category table 47 describes multiple, hierarchical category data structures, and includes multiple category records, each of which describes the context of a particular category within the one of the multiple hierarchical category structures. For example, the category table 47 may describe a number of real, or actual, categories to which item records, within the items tables 60, may be linked.

The database 30 also includes one or more attributes tables 49. Each record within an attributes table 49 describes a respective attribute. In one embodiment, a specific attributes table 49 describes multiple, hierarchical attribute data structures, and includes multiple attribute records, each of which describes the context of a particular attribute within the one of the multiple hierarchical attribute structures. For example, the attributes table 49 may describe a number of real, or actual, attributes to which item records, within the items tables 60, may be linked. Also, the attributes table 49 may describe a number of real, or actual, attributes to which categories, within the category table 47, may be linked.

The database 30 also includes a note table 46 populated with note records that may be linked to one or more item records within the items tables 60 and/or to one or more user records within the user table 54. Each note record within the note table 46 may include, inter alia, a comment, description, history or other information pertaining to an item being offered via the network-based transaction facility 10, or to a user of the network-based transaction facility 10. Also, the database 30 includes a targeted site table 67 populated with targeted site records that may be linked to one or more item records within the items tables 60 and/or to one or more user records within the user table 54.

A number of other tables are also shown to be linked to the user table 54, namely a user past aliases table 48, a feedback table 50, a feedback details table 53, a bids table 55, an accounts table 64, an account balances table 62 and a batch items table 40. To enable one embodiment of the present invention, the database 30 is also shown to include a batch table 42, a batch items table 40 and an items wait table 44. Further details regarding the database tables 40-44 are provided below.

Figure 3:
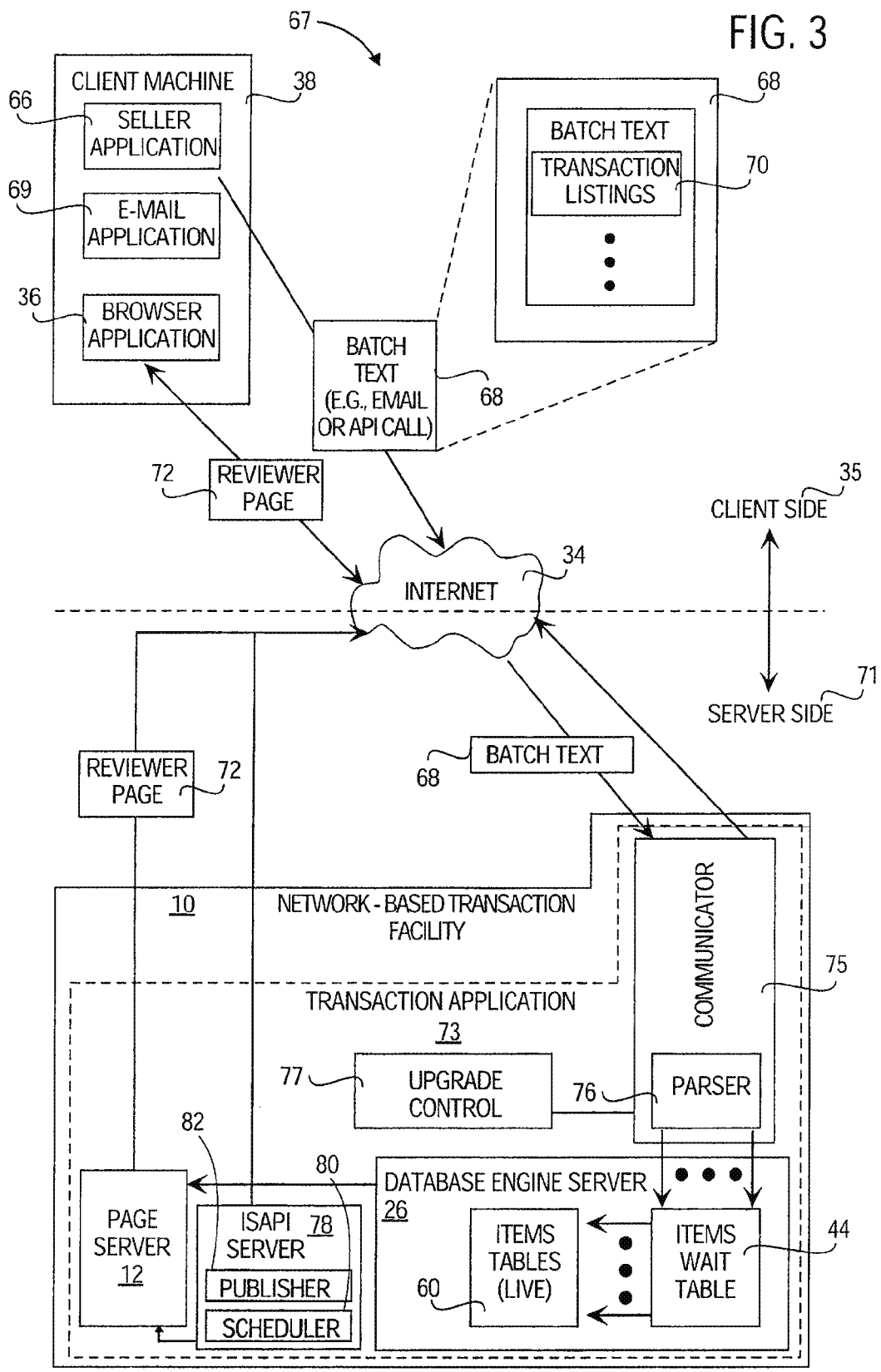
FIG. 3 is a block diagram illustrating a network-based transaction environment, according to an exemplary embodiment of the present invention including a client-side and a server-side.

The present invention relates to a method and system for scheduling transaction listings at a network-based transaction facility 10. FIG. 3 is a block diagram illustrating a network-based transaction environment 67, according to an exemplary embodiment of the present invention, including a client-side 35 and a server-side 71. The transaction listings 70 (e.g., offers for sale, auctions, fixed-price listings) are established on the network-based transaction facility 10, in one embodiment, via the seller application 66. The seller application 66 is utilized at a client machine 38 to assist in the communication of multiple transaction listings 70 to a network-based transaction facility 10. In one embodiment, the seller application 66 may be utilized offline or the seller application 66 may be utilized online (e.g., connected to the network-based transaction facility 10). In one embodiment, the seller application 66 is a stand alone application that executes on the client machine 38. In another embodiment, the communication of the multiple transaction listings 70 may be performed utilizing server-enabled applications, such as a web browser, or applet that executes within a web browser.

In one embodiment, the seller application 66 is installed and executed on a client computer with a view to assisting a user in propagating multiple transaction listings 70 and their respective start times to a network-based transaction facility 10. The seller application 66 thus operates as a client application, and provides a number of user interfaces and other functionality to assist a user in defining multiple transaction listings 70 in a convenient manner. The seller application 66 also operates to compose a data file (e.g., batch text 68) that includes the multiple transaction listings 70 and their associated start times, and to propagate such a data file as a single transmission to a network-based transaction facility 10. The propagating of such a single data file including multiple transaction listings 70 is a feature, that may reduce the number of interactions between a client machine 38 and the network-based transaction facility 10, and thereby reduce the amount of time that a client machine 38 has to be connected to a network (i.e., be "on-line").

The associated start times include a different starting time for at least a portion of the plurality of transaction listings 70 in the data file. The associated start times may include a starting date and time of a first transaction listing 70 in the data file 68. In an exemplary embodiment, the start times may be staggered by a user-selectable amount of time. For example, transaction listings 70 scheduled to start at Dec. 25, 2002 at 7:00 a.m. with a user staggered time of 5 minutes selected by a user will result in the following:

the first transaction listing starting at 7:00 a.m.;
the second transaction listing starting at 7:05 a.m.;
the third transaction listing starting at 7:10 a.m.; and
the fourth transaction listing starting at 7:15 a.m.

Thus, the starting times of the four transaction listings 70 in the example are staggered by 5 minutes. In the exemplary embodiment, the user may chose numerous values with which to stagger the starting times (e.g., 10 minutes, 1 hour, 10 hours, 1 day, etc.). In one embodiment, the seller application 66 prevents the user from specifying associated starting times for transaction listings 70 where the associated starting times exceed a maximum advanced scheduling value. Furthermore, the seller application 66 may prevent the user from specifying an associated start time less than a minimum scheduling value. The maximum advanced scheduling value and the minimum scheduling value may he defined in terms of years, months, days, hours, minutes, or seconds defined by the network-based transaction facility 10.

As the seller application 66 is, in one exemplary embodiment, executable on the client-side 35 as a stand-alone application, it provides the feature of allowing a user to compose multiple transaction listings 70 in an "off-line" manner (e.g., without necessarily establishing any network communications or session with the network-based transaction facility 10), and then to propagate such multiple transaction listings 70 to the network-based transaction facility 10 as the above-mentioned single data file transmission.

A further feature of the client-side 35 executable seller application 66 is that it is configurable to work with multiple targeted (e.g., customized) sites. Therefore, a user may use the seller application 66 to propagate the same transaction listing 70 to multiple targeted sites (e.g., geographically-targeted sites for each of the U.S., UK, DE, etc . . . ).

One embodiment of the present invention provides server-side facilitated viewing, editing and confirmation of multiple transaction listings 70 by a user, and also the committing of such multiple transaction listings 70 to an active state to initiate multiple transaction processes facilitated by the network-based transaction facility 10.

Referring back to FIG. 3, the environment includes a client-side 35 and a server-side 71. On the client-side 35, a client machine 38 (e.g., a personal computer, Personal Digital Assistant (PDA), cellular telephone, set-top box, or any other networked device) is shown to host the seller application 66, and a browser application 36. While the seller application 66 and browser application 36 are illustrated as being separate, the browser application 36 may be configured to work as the seller application 66, for example through the retrieval of HTML pages from the server-side 36 or through execution of an applet. The client machine 38 is coupled to a network in the exemplary form of the Internet 34, or any Local Area Network (LAN) or Wide Area Network (WAN).

The seller application 66, in one embodiment, presents a number of user interfaces to a user for the purposes of harvesting multiple transaction listings 70. The seller application 66 further composes batch text 68 that embodies the multiple transaction listings 70 inputted via the multiple interfaces. The seller application 66 then communicates the batch text 68 to the network-based transaction facility 10 in accordance with the network-based transaction facility API. In an alternative embodiment, the seller application 66 interacts with an email application 69 to compose an electronic mail (e-mail) message that embodies the batch text 68. The batch text 68 is communicated to the network-based transaction facility 10 by the email application 69 as an email message. Specifically, the email application 69 utilizes any one of a number of electronic e-mail or messaging protocols (e.g., Simple Mail Transport Protocol (SMTP)) to communicate the email message over the Internet 34. It will of course be appreciated, in alternative embodiments, that any one of a number of other protocols (e.g., the File Transport Protocol (FTP)) may be utilized.

Turning to the server-side 71, the network-based transaction facility 10 is shown to execute a transaction application 73 that includes a communicator module 75, a parser module 76, an upgrade control module 77, a scheduler module 80, and a publisher module 82.

The communicator module 75 including the parser module 76 is to receive a data file 68 from the seller application 66 executed at a client machine 38, the data file 68 including a plurality of transaction listings 70 and respective associated start times. The parser module 76 operates to parse received multiple transaction listings 70 from the batch text 68. The parser module 76 may also perform various format, content and verification operations. The parser module 76 then populates the items wait table 44, as maintained by the database engine server 26, with the extracted transaction listings 70. The scheduler module 80 schedules publication of the plurality of transaction listings 70 according to their respective associated start times. From the items wait table 44, the transaction listings 70 are transferred to the live items table 60 according to their scheduled listing time, in the manner described below. The publisher module 82 publishes each of the plurality of transaction listings 70 at the network-based transaction facility 10 according to their associated start times.

In one embodiment, the communicator module 75 verifies user login information supplied by the seller application 66 with a connection request. The verification occurs before receiving the batch text 68. Upon verifying the user login information, the communicator module 75 provides user information received to the upgrade control module 77. The upgrade control module 77 determines if the seller application 66 requires any updates/upgrades. Such updates/upgrades, may include but are not limited to software components (e.g., main module) or data elements (e.g., category updates, attributes updates, etc.).

The transaction application 73 further encompasses the page server 12, which in one exemplary embodiment, includes an Internet Server Application Program Interface (ISAPI) 18 where the page server 12 comprises the Internet Information Server, a web server developed by Microsoft Corporation of Redmond, Wash. In an alternative embodiment, the page server 12 may execute a Common Gateway Interface (CGI) program. The page server 12 operates dynamically to generate markup language documents (e.g., web pages) utilizing content retrieved from the database engine server 26, and to communicate such markup language documents via the Internet 34 to the seller application 66 for viewing utilizing the browser application 36. In one embodiment, the page server 12 serves up a reviewer page 72, embodying a list of multiple transaction listings 70 successfully extracted by the parser module 76 from the list of transaction listings 70 for display within the browser application 36. This is done for the purposes of allowing a user to view, edit, and confirm such transaction listings 70 before they are communicated to the live items table 60 from the items wait table 44.

Basic Architecture of the Seller Application

In the exemplary embodiment, the seller application 66 architecture includes three layers. The three layers include the GUI layer, the data objects layer, and the communication and database layer. The GUI layer's modules handle all interaction with the user and all management of resource files. The data objects layer contains data objects that contain targeted site data. The data objects layer encapsulates XML parsing of the targeted site data as well as database access, easing GUI development. The communication and database layer provide simplified interfaces to the rest of the seller application 66. An upgrade manager (e.g., upgrade module explained below) is provided for keeping the three layers of the seller application 66 up-to-date. This involves managing several types of data elements (e.g., category data) and components (e.g., modules). The upgrade manager is explained further below.

Figure 4:
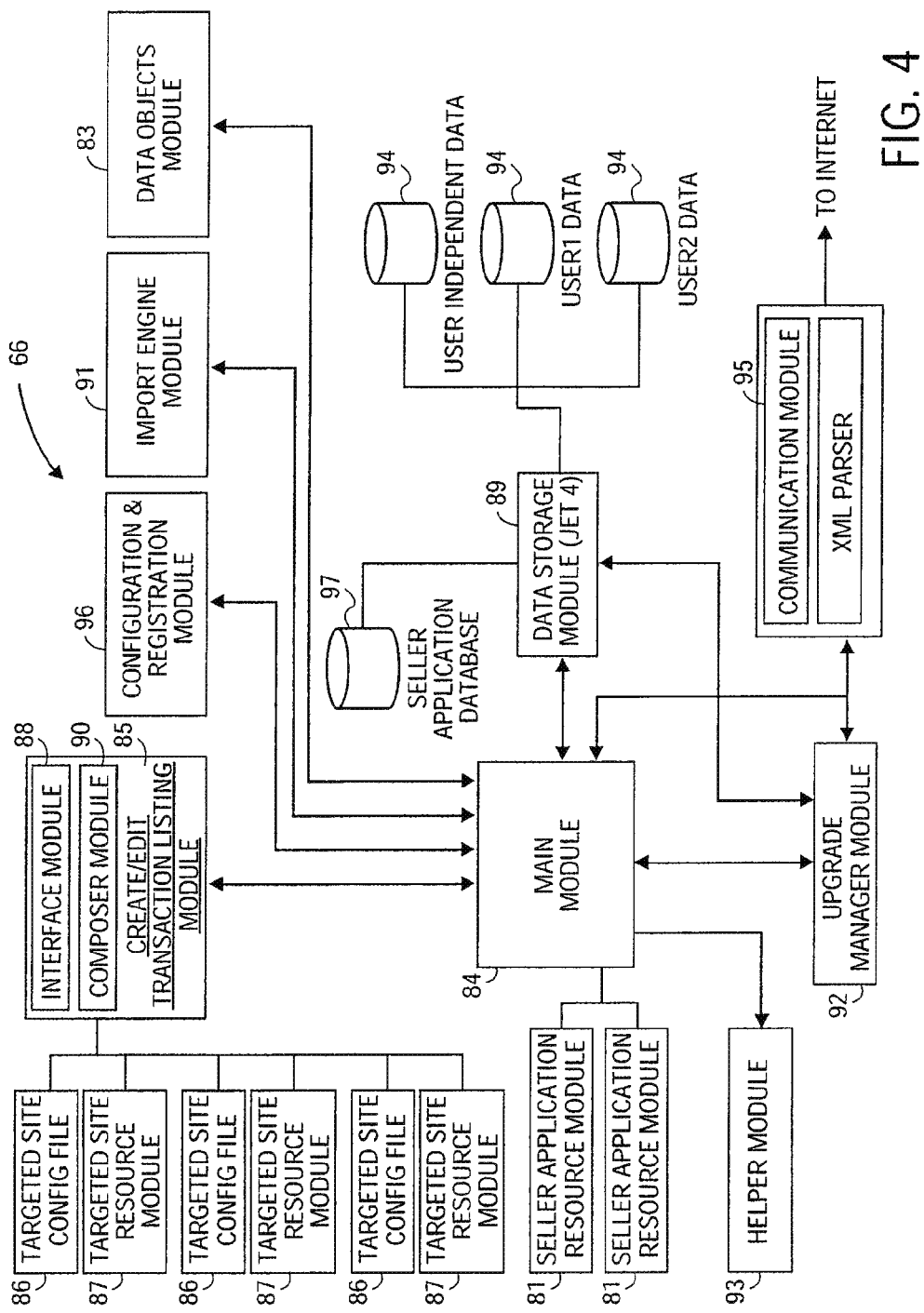
FIG. 4 is a block diagram illustrating the seller application, according to an exemplary embodiment of the present invention.

FIG. 4 is a diagram illustrating an exemplary seller application 66. In the exemplary embodiment, the seller application 66 facilitates propagating a plurality of transaction listings 70 to a network-based transaction facility 10.

Seller Application Components

In the exemplary embodiment, the seller application 66 includes a main module 84, resource modules 81, a data objects module 83, a create/edit transaction listing module 85, targeted site resource modules 87, targeted site configuration files 86, a communication module 95, a data storage module 89, an import engine module 91, an upgrade manager module 92, a helper module 93, user independent databases 94, the seller application database 97 and a configuration and registration module 96. The create/edit transaction listing module 85 includes an interface module 88 and a composer module 90.

Composition of the Seller Application

In the exemplary embodiment, the seller application 66 is built primarily using Microsoft standard libraries and components. The main executable and the GUI (graphical user interface) based components use MFC (Microsoft Foundation Classes), MFC is a large library of C++ classes developed by Microsoft. MFC is bundled with several C++ compilers and is also available as part of the Microsoft Developer's Network (MSDN).

In the exemplary embodiment, the communication and database layer uses OLEDB (OLE Data Base) and the Jet Engine, OLEDB is a programming interface for data access from Microsoft. Applications may use OLEDB to access data sources directly or they can use OLEDB to call ODBC to access ODBC databases. Jet (Joint Engine Technology) engine is the database engine used in Microsoft Access and it accompanies Visual Basic and C++. Jet is typically used for storing data in the client machine. Developers using Access and Visual Basic access Jet via the DAO/Jet interface, which is a COM object.

In the exemplary embodiment, Microsoft components are utilized since many are already installed on many client machines 28. For example, by requiring that a user of the seller application 66 have installed Internet Explorer 5.0 or later, there is reasonable certainty that the necessary version of the Jet Engine is available. In the exemplary embodiment, third party tools may be utilized for STL and XML parsing.

Multi-User and Security in the Seller Application

In the exemplary embodiment, a multi-user environment is supported by using a separate DB (database) for each user's preferences. When the user logs on, the database file for that user will be used. Password protection (e.g., Microsoft Access) is used to secure these user database files. The text fields of the user database may also be encrypted in a way that does not affect performance, but may prevent curious users from hacking the tables.

Some user-independent settings are kept in the seller application database 97 (e.g., site specific data). In the exemplary embodiment, there is only one seller application database 97. The seller application database 97 is always opened by the seller application 66 regardless of which user logs in. The seller application database 97 contains a mapping from the network-based transaction facility user ID to the user independent database filename for that user, so the user independent database filenames do not indicate the network-based transaction facility user ID. This schema allows users to change their network-based transaction facility ID and keep using their existing user independent database 94. That way, if a user does change their ID and/or password, they will not lose saved items.

Adaptability of the Seller Application

In the exemplary embodiment, the seller application 66 is adaptable for use with targeted (e.g., geographically or otherwise targeted) sites. Seller application strings are stored in resource modules 81. The resource modules 81 consist of DLLs (Dynamic Link Libraries). The seller application strings are the strings for the seller application 66 language (e.g., primary language), which are distinguished from strings that appear in the targeted site language.

The user may choose the primary language that they want to work with and optionally install other seller application 66 language versions. In the exemplary embodiment, switching primary languages requires a restart. The primary language may be different than the language of the targeted site with which the user is communicating.

In the exemplary embodiment, the primary language utilized by the seller application 66 is translated into the language of the targeted site with which the user intends to communicate. The translation may occur at the seller application 66 off-line or at the network-based transaction facility 10 while the seller application 66 is connected to the network-based transaction facility 10.

The targeted site language is the language and locale conventions used at a particular targeted site. The collections of strings for the targeted site language are also stored in the targeted site resource module 87. The targeted site resource modules 87 may consist of DLLs (Dynamic Link Libraries). In the exemplary embodiment, the targeted site data provided by the collection of strings associated with the targeted site language can be switched during execution to allow users to list items on multiple targeted sites without restarting the seller application 66. To accomplish the switching of a targeted site language, a targeted site resource module 87 should contain the correct collection of strings for the targeted site's language.

In addition to the targeted site-specific translations of strings, these targeted resource module 87 can also contain targeted site-specific dialog layout variations, which would make it possible for user interfaces utilized in the process of creating transaction listings 70 to differ in appearance for different targeted sites. This otters user and designer flexibility while minimizing the amount of site-specific code needed to facilitate the process of creating transaction listings 70.

In the exemplary embodiment, there is some targeted site-specific XML configuration data that contains updateable values (e.g., categories, attributes, valid formats, etc.). If this configuration data is modified for targeted sites configured to work with the seller application 66, then the seller application 66 should be updated to reflect such modification. In the exemplary embodiment, modifiable targeted site-specific data may be stored within targeted site resource module 87 or XML files. The most current XML data is kept in the seller application database 97.

Upgradability of the Seller Application

The seller application 66 is designed to allow upgrades of both data elements and application modules. The upgrade manager module 92 and helper module 93 are utilized to facilitate such upgrades. Data elements are expected to change frequently. Data elements are acquired via existing API calls to the network-based transaction facility 10. Upgrading data elements gives the seller application 66 the latest set of categories, attributes, and targeted site-specific constants (e.g., trading limits, publication durations, payment options, fee schedule, etc.). In the exemplary embodiment, the targeted site config file 86 is used to store targeted site data elements.

In the exemplary embodiment, the seller application 66 modules may be upgraded far less frequently than data elements. Upgrading the seller application 66 modules provides the latest set of the seller application 66 and targeted site language translations, computed rules (i.e., rules that relate user data to targeted site data), and targeted site-specific dialog layout.

In the exemplary embodiment, all of the seller application 66 modules are upgradeable, even the main module 84. Upgrading of the modules is accomplished using a helper module 93. After the download of new components, a helper script is generated that instructs the helper module 93 to replace the seller application 66 modules with the new versions of the seller application 66 modules. Whenever the seller application 66 is executed, this helper module 93 determines if there are possible file replacements to do before launching the main module 84.

In the exemplary embodiment, to support minimal upgrades, a versioning mechanism is used to compare available versions of data elements and the seller application 66 modules at the network-based transaction facility 10 against the versions of the installed elements and modules of the seller application 66. Upgrades only attempt to download the seller application 66 modules and/or data elements that have changed. The downloaded data may be compressed to shorten transfer times. Allowing both code and data to be updated is a feature that maximizes the upgradability of the seller application 66.

In one embodiment, the network-based transaction facility 10 recognizes that the seller application 66 has been enabled to support a targeted site for which support has not yet been downloaded and installed. Upon recognizing that such support has not been downloaded and installed, the network-based transaction facility 10 downloads the targeted site's required support (e.g., data elements, the seller application 66 module updates).

Main Module

In the exemplary embodiment, the seller application 66 main module 84 will provide a MFC shell for all UI elements, which are displayed using the current application language (e.g., menu, toolbar, folders, inventory and listings view). The main module 84 is a starting point for the seller application 66. All program flows and actions begin and end in the main module 84 regardless of whether they were initiated programmatically or by a user.

At startup, the main module 84 dynamically loads a resource module 81 based on the user's current application language setting. This setting is stored in the user independent database 94. To change the application language, the user is required to restart the seller application 66 in order for the change to be recognized. In an alternative embodiment, the application language may be changed without restarting the seller application 66.

In the exemplary embodiment, the main module 84 is also responsible for controlling the security of the seller application 66 by requiring the user to enter a password and connecting only to the user independent database 94 associated with that user. The seller application 66 allows only one user independent database 94 to be used at a time. To use a different user ID, the user must select another user ID, and enter the password for that user ID. Alternatively, one could exit and run the program again to log on as another user.

The user ID and password used to logon to the seller application 66 may be the same user ID and password configured for the user at the network-based transaction facility 10. If the user changes his ID and/or password on the network-based transaction facility 10 without updating the seller application 66, then future attempts to communicate with the network-based transaction facility 10 may fail. An error message indicating a login failure will be provided to the user.

In the exemplary embodiment, the main module 84 allows only one instance of the seller application 66 to execute on the user system at a time. If the user tries to execute a second copy, the first executing instance is activated (e.g., a window is restored and brought to the top of the desktop). In an alternative embodiment, multiple seller applications 66 may execute on a user's system at the same time.

When creating/editing new transaction listings 70, the main module 84 calls the create transaction listing module 85. In the exemplary embodiment, the main module 84 is a single threaded application and it dynamically loads the rest of the modules on demand.

The Seller Application Language Resource Module

In the exemplary embodiment, the resource module 81 provides the ability to change the seller application 66 language without any code change. In addition, the resource module 81 allow for the addition of new seller application 66 languages with minimum installation time and effort. Each resource module 81 contains a complete set of resources for one language. These resources include dialog templates, menus, icons and language strings.

As explained above, a resource module 81 is loaded by the main module 84 when the seller application 66 starts. The default seller application 66 language is set when the seller application 66 is installed and it matches the language of the network-based transaction facility 10 targeted site (e.g., geographic) from which the seller application 66 was obtained. Additional languages may be installed from the network-based transaction facility 10.

In the exemplary embodiment, each resource module 81 contains a full set of all resources for the main module including:
  String table
  Dialog resources
  Application icons, bitmaps, etc.

The resource module 81 may follow a naming convention so that the seller application 66 knows which resource module 81 contains which language (e.g., res001.DLL is US English, res002.DLL is German, res003 is . . . , etc.).

Data Objects Module

In the exemplary embodiment, the data objects module 83 provides a DB independent data model to the seller application 66 for Categories, Domains, Attributes, Items, and Sites. The data objects module 83 may consist of a DLL (Dynamic Link Library).

Data objects included in the data objects module 83 provide the seller application 66 with data-store independent access to data in the seller application database 97. Data objects can encapsulate XML parsing when the data involved contains XML strings, providing the clients with C++ accessor functions for data fields. If the client requires the underlying XML, the data object module 83 may provide it.

There may be data objects for category, domain, attributes, and site data. In the exemplary embodiment, data objects are created with a factory function that is exported by the DLL that contains the implementation code for the data objects. A factory function returns a pointer to an interface supported by the data object. The supported interfaces are defined in a header file that is included by any client code that requires it.

Create/Edit Transaction Listing Module

In the exemplary embodiment, the seller application 66 create/edit transaction listing module 85 displays all UI (user interface) elements in the targeted site's language. The create/edit transaction listing module 85 is configurable to show the right set of SYI fields/attributes/fees etc per targeted site. One feature provided by the create/edit transaction listing module 85 is encapsulating item-related knowledge and logic in a single module to minimize the size of the future updates. Another feature is providing site language independent implementation to allow creation of transaction listings 70 for the different targeted sites utilizing the seller application 66 language. The create/edit transaction listing module 85 includes an interface module 88 and a composer module 90. The interface module 88 presents an input interface to a user to receive a plurality of transaction listings 70, each of the plurality of transaction listings 70 including a respective associated start time. The composer module 90 may automatically compose a data file including the plurality of transaction listings 70 received by the interface module 88. The communication module 95 propagates the data file created by the composer module 90 from the client computer to the network-based transaction facility 10.

Targeted Site Resource Module

In the exemplary embodiment, targeted site resource modules 87 are provided. Similar to the resource module 81, the targeted site resource module 87 includes resources for just one language. Every time the user creates a new transaction listing 70 or edits an existing transaction listing 70, the create/edit transaction listing module 85 loads the appropriate targeted site resource module 87. The targeted site resource module 87 contains dialog templates, icons, and language strings.

The targeted site resource module 87 may also include targeted site dependent code. For example, code related to computations specific to the targeted sites currency. During installation of the seller application 66, one targeted site resource module 87 is provided to the seller application 66. This targeted site resource module 87 matches the default language of the installation. The default language is the language of the targeted site from which the seller application 66 was downloaded. Other targeted site resource modules 87 may be downloaded from the network-based transaction facility 10 if the user would like to list on multiple targeted sites.

A feature provided by the targeted site resource module 87 is providing language differences in targeted sites as opposed to burdening the create/edit transaction listing module 85 or main module 84 with that responsibility. Another feature provided by the targeted site resource module 87 is the ability to switch targeted sites easily without restarting the seller application 66. A further additional feature of the targeted site resource module 87 is the ability to configure the seller application 66 to work with additional targeted sites easily (i.e., without altering create transaction listing module 85).

In the exemplary embodiment, each targeted site resource module 87 contains a complete set of dialog resources utilized by the create/edit transaction listing module 85 for that targeted site. Most of the information in the targeted site resource module 87 change infrequently. Therefore, data elements that are expected to change often are downloaded via a different mechanism (XML files) and the targeted site resource module 87 is only downloaded when required due to a changed dialog layout, or changed translation.

Communication Module

In the exemplary embodiment, the communication module 95 provides connectivity to the network-based transaction facility 10. Its services are used during several phases of the seller application 66 operation including checking versions of site data, checking software module versions, download of software modules, download of site data, and the propagating of transaction listings 70 to the network-based transaction facility 10.

The communication module 95 encapsulates formatting of standard elements in API requests. The communication module 95 also provides a generic request/response function to be used for common tasks such as for example getting version information, downloading software modules, downloading data elements, downloading all other miscellaneous data related to a targeted site, and creating new transaction listings 70.

Data Storage Module

The data storage module 89 manages access to and from the user independent databases 94. The data to be accessed includes user item listings, user settings, and application wide data.

The data storage module 89 manages database access to the local on-disk storage for both user files and applications wide data. This data may be stored in two types of files: one application database file (e.g., the seller application database 97) and one user database file user independent database 94) for each user that is created.

The seller application database 97 contains tables for the seller application 66 settings, available categories for listings, and categories attributes. In the case of categories and attributes tables, fields are created only for important fields and fields that need to be indexed. Otherwise data is stored in XML blobs.

The user independent database 94 contains tables for user settings and for items. Again, fields are created only for important fields and fields that need to be indexed. Otherwise data is stored in XML blobs.

Import Engine Module

The import engine module 91 provides for the ability to import transaction listings 70 from applications other than the seller application 66.

Upgrade Manager Module

The upgrade manager module 92 is used to keep the seller application 66 up-to-date, which involves managing several types of data and components:
    Application components
    EXEs, DLLs, etc.
    Site configuration data
    Categories Attributes
options, restrictions, etc.
User configuration data
Store info
Trading limits
Payment address
etc.

In the exemplary embodiment, the most current data and components may be found at the network-based transaction facility 10 and it is the seller application's 66 responsibility to perform any required updates before propagating transaction listings 70 to the network-based transaction facility 10.

The network-based transaction facility 10 may have updated versions of data but the update might not be required. In this situation, the user is made aware of the optional update and is given the option to not to receive the update.

Also, the network-based transaction facility 10 may have updated versions of more than one type of data for the seller application 66. Some of the updates may be required and some may not. In the exemplary embodiment if any available updates are required, all available updates are downloaded. Also, in the exemplary embodiment, if the user chooses to perform an optional upgrade, all available updated data and modules are downloaded and applied. Furthermore, in the exemplary embodiment, compression may be utilized to expedite the transfer of updates from the network-based transaction facility 10 to the seller application 66.

Each upgradeable file has an associated version. The version includes the file name, major version, minor version, and timestamp. The seller application 66 may be summarized by an array of version objects. In one embodiment, the following is a summary of the versionable files:

seller application component files
seller_application.exe
Helper.exe
CreateTransactionListing.dll
Res001.dll
seller_application data files
Site001.xml (contains categories, domains, fees, options, etc.)
User003.xml A "version string" is an XML element with fields for the version components major, minor, timestamp, filename, and upgrade requirements. These elements can be concatenated together to describe the entire system version. The following is an example of an exemplary version string:

```
<SELLERAPP_FILE_VERSION>
    <FILENAME>RES001.DLL</FILENAME>
    <MAJOR>1</MAJOR>
    <MINOR>8</MINOR>
    <TIMESTAMP >030802:22:01:01</TIMESTAMP >
    <MINIMUM_VERSION_REQUIRED>
        <MAJOR>1</MAJOR>
        <MINOR>7</MINOR>
    </MINIMUM_VERSION_REQUIRED>
    // optional
    <FILE_URL>http://www.ebay.com/files/sellerapp/res001.dll.gzip
    </FILE_URL>
    <INSTALLED/>
</SELLERAPP_FILE_VERSION>
```

In the exemplary embodiment, a version comparison of files at the seller application 66 and the network-based transaction facility 10 is utilized in determining if updates to the seller application 66 modules or the data elements are required. The MINIMUM_VERSION_REQUIRED fields are used to version files at the network-based transaction facility 10. If a user's seller application 66 version is lower than (or older than) the minimum version required, then the update is required. If the user's seller application 66 version is equal or greater than (or newer than) the minimum version required, then the upgrade of this file is optional.

In the exemplary embodiment, the user may reject either optional or required updates. However, if updates are required and the user refuses to accept them, the user may be limited in future communications with the network-based transaction facility 10. For example, if a user refuses to accept required updates for a targeted site config file 86 (e.g., category updates), then that user may not be allowed to propagate transaction listings 70 to the network-based transaction facility 10 for the targeted site.

Figure 5:
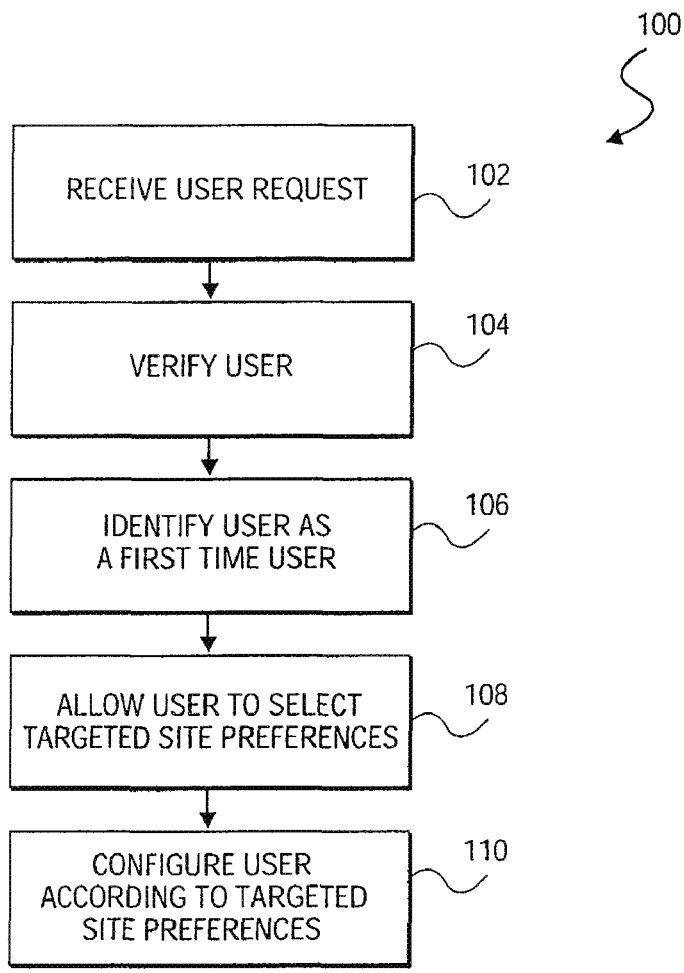
FIG. 5 is a flow chart illustrating a method, according to an exemplary embodiment of the present invention, of customizing the seller application, where the seller application facilitates propagating transaction listings to a network-based transaction facility.

FIG. 5 is a flow chart illustrating a method 100, according to an exemplary embodiment of the present invention, of adapting (i.e., customizing) the seller application 66 for use with a targeted site. The exemplary seller application 66 facilitates communication of listings to a network-based transaction facility 10. In one exemplary embodiment, a network-based transaction facility 10 supports multiple targeted sites (e.g., web sites). In an alternative exemplary embodiment a network-based transaction facility 10 supports one targeted site.

Figure 7:
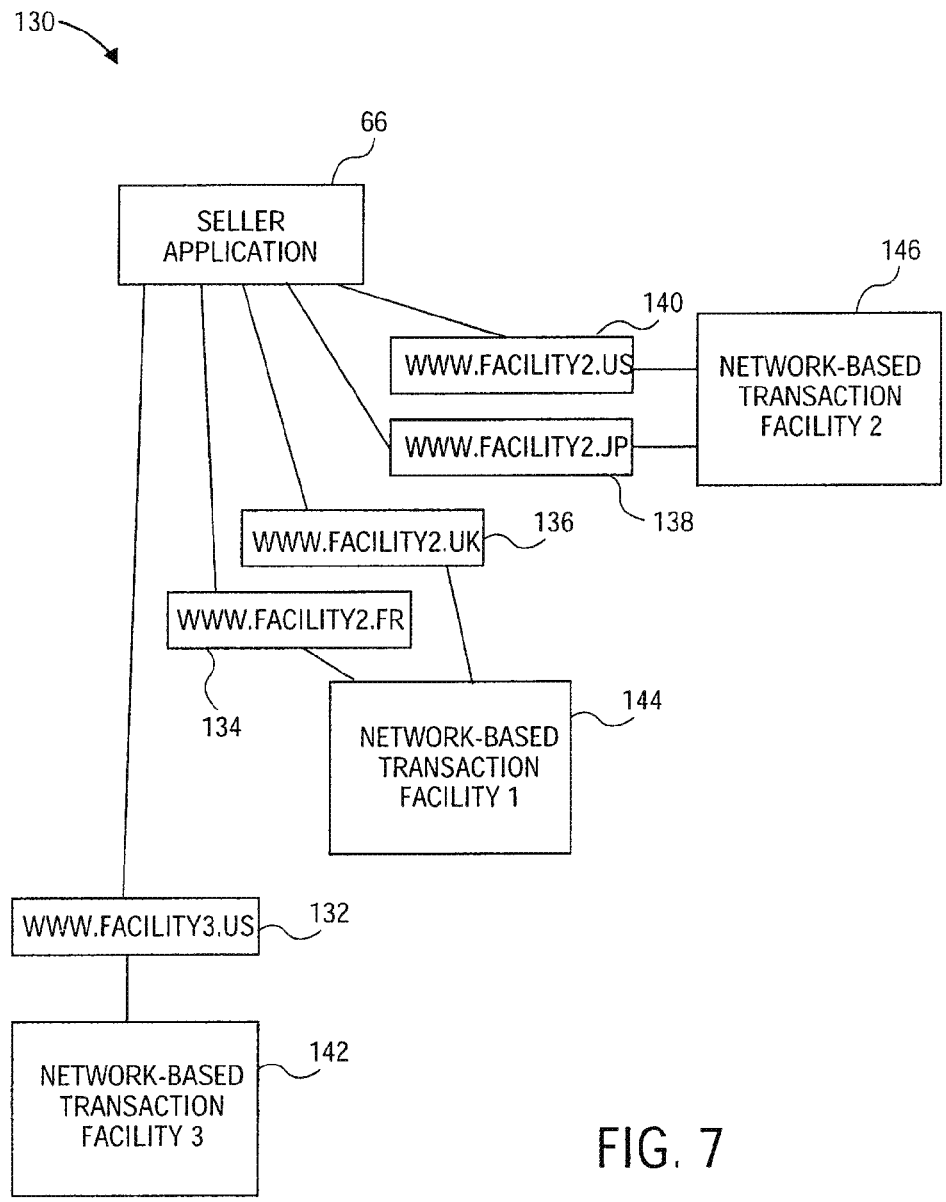
FIG. 7 is a block diagram illustrating the relationship between the seller application and multiple network-based transaction facilities, according to an exemplary embodiment of the present invention.

Referring to FIG. 7, a diagram 130 of an exemplary seller application 66 communicating with multiple web sites is provide. The seller application 66 may work with one web site (e.g., 132) or multiple web sites (e.g., 132, 134, 136, 138, and 140). Furthermore, the seller application 66 may work with web sites belonging to one network-based transaction facility 10 (e.g., 142) or the seller application 66 may work with multiple web sites (e.g., 132, 134, 140) all belonging to separate network-based transaction facilities 10 (142, 144, and 146). For example, the seller application 66 may work with both the www.facility3.us 142 web site and the www.facility2.jp web site 138. In the exemplary embodiment the seller application 66 may work with a broad range of web sites (e.g., commercial, educational, charitable, political, entertainment oriented, etc . . . ). In one embodiment, the seller application 66 may be configured to work only with web sites, which belong to a specific network-based transaction facility 10.

Returning to FIG. 5, in the exemplary method 100, the seller application 66 is utilized by a user at a client machine 38 for propagating transaction listings 70 to a network-based transaction facility 10. The method 100 commences at block 102 at a user request to access the network-based transaction facility 10. At block 104 the user's identity is verified. In order to access the network-based transaction facility 10 via the seller application 66, the user must have previously obtained login information (e.g., UserID and Password). At block 106 the user is identified as a first time user.

The user identified as a first time user is requested to enter information including but not limited to a billing address, a personal address, a payment address, and the regional or demographic-specific sites at which the user wishes to list items (e.g., to propagate transaction listings 70). At block 108 the user selects the targeted sites at which to list items from a plurality of targeted sites presented to the user. In one embodiment, a targeted site may represent multiple countries. The user may select the targeted site preferences offline. Such offline selections become effective when the user connects to the network-based transaction facility 10 and the selections are recognized.

At block 110, the user's seller application 66 is configured (e.g., set up) so that it may communicate with the targeted sites selected. In the exemplary embodiment, such configuration comprises enabling the seller application 66 to utilize each targeted site's currency when working with currency related fields for each of the targeted sites. That is, where relevant, operations involving currency are in the currency type of the targeted sites selected. Such operations include inputting currency values, displaying currency value, and calculating currency values. Configuration further may include preventing the propagation of certain transaction listings 70 (e.g., alcohol or tobacco at commercial web site serving teenagers). In the exemplary embodiment, configuration may further include providing the seller application 66 with category and attribute options available at, or specific to, the targeted site selected. Moreover, the exemplary embodiment configures the seller application 66 to work in the designated corresponding language of the targeted site selected. Configuration of the seller application 66 may further include but is not limited to providing the available format types (e.g. Auction, Store Items (fixed-price), etc.), reserve price options, payment options, shipping options, checkout options, picture service options, and options related to fees for each transaction listing 70.

Figure 6:
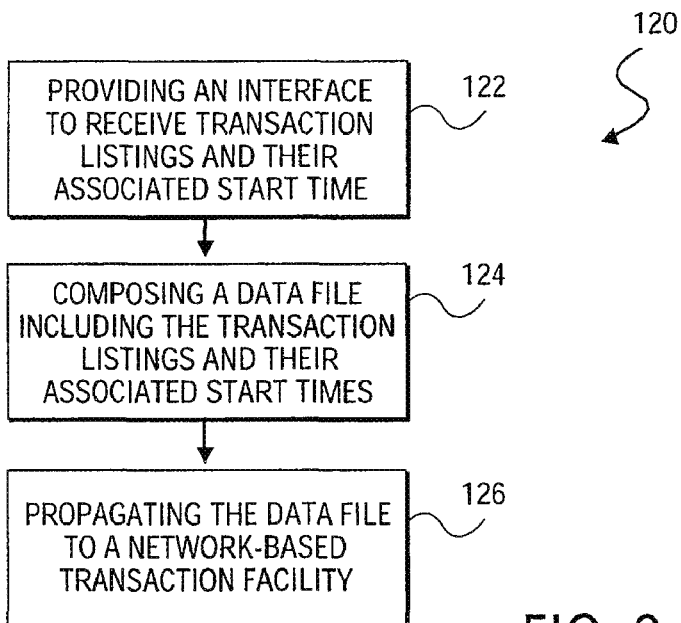
FIG. 6 is a flow chart illustrating a method, according to an exemplary embodiment of the present invention, of scheduling listings, via the seller application, at the network-based transaction facility.

FIG. 6 is a flow chart illustrating a method 120, according to an exemplary embodiment of the present invention, of scheduling listings, via the seller application 66, at the network-based transaction facility 10. In the exemplary method 120, the seller application 66 is utilized by a user at a client machine for propagating transaction listings 70 and their respective listing times to a network-based transaction facility 10. The respective listing time is the date and time at which a transaction listing 70 is published by a network-based transaction facility 10 on a website. This may include but is not limited to transaction listings 70 to be sold, auctioned, bartered, given away, or displayed. At block 122 a user interface for receiving a plurality of transaction listings 70 and their respective associated start times at the seller application 66 is presented to the user. At block 124 batch text 68 (e.g., data file) is composed at the seller application 66 to include the plurality of transaction listings 70 and their respective start times. At block 126, the batch text created in block 124 is propagated to the network-based transaction facility 10. In the exemplary embodiment, the user may include multiple transaction listings 70 in the batch text 68, each including their respective start times. In the exemplary embodiment the user creates the batch text 68 while working offline. However, in alternative embodiments, the user may be connected to the network-based transaction facility 10 and enter each transaction listing 70 directly into the network-based transaction facility 10, via the seller application 66.

Figure 8:
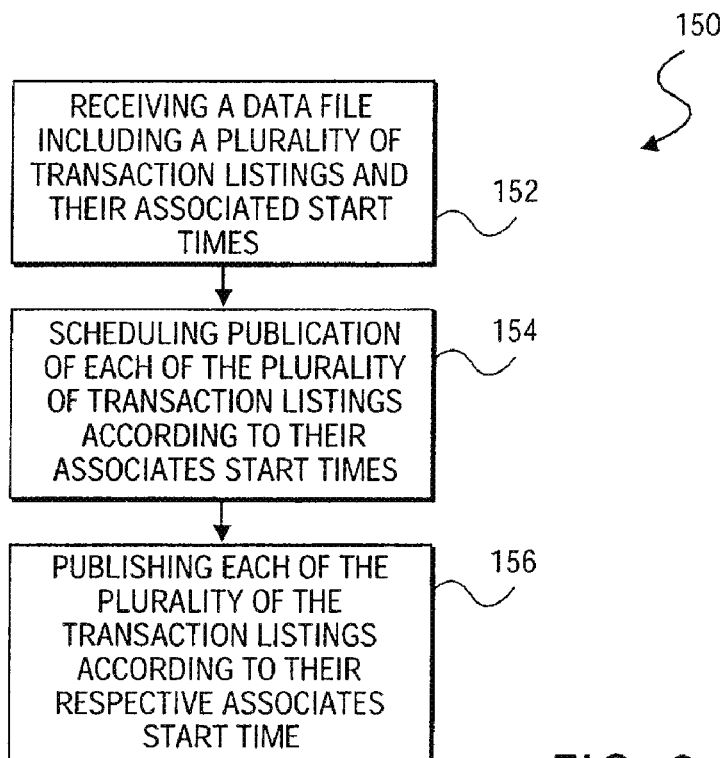
FIG. 8 is a flow chart illustrating a method, according to an exemplary embodiment of the present invention, of scheduling the listing of transaction listings at a network-based transaction facility.

FIG. 8 is a flow chart illustrating a method 150, according to an exemplary embodiment of the present invention, of scheduling the listing of transaction listings 70 at a network-based transaction facility 10. In the exemplary method 150, transaction listing(s) 70 are provided to the network-based transaction facility 10 from a user, via the seller application 66. The user may provide the transaction listing(s) 70 within a data file communicated via the seller application 66 to the network-based transaction facility 10. At block 152, the transaction listings 70 and their respective start times are received by the network-based transaction facility 10. At block 154, the network-based transaction facility 10 schedules the publication of each transaction listing 70 according to each of the transaction listings respective associated start time. At block 156, the transaction listings 70 are published according to the schedule devised in block 154.

Figure 9:
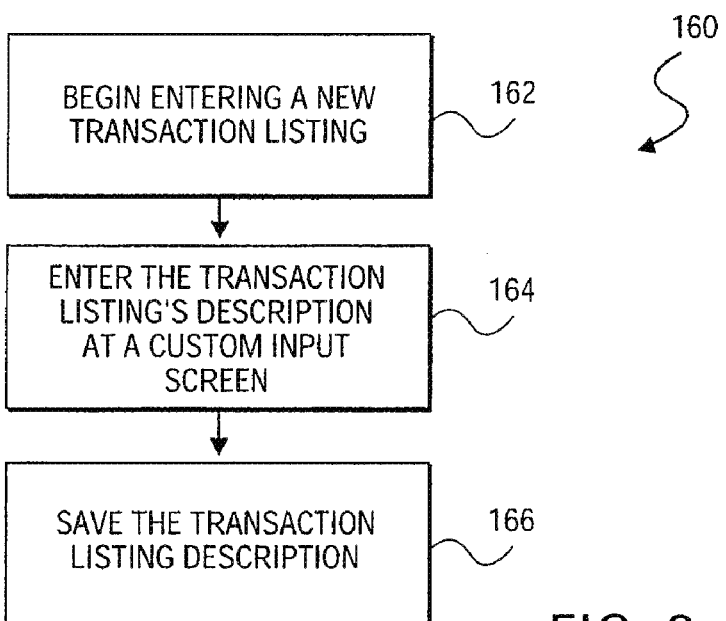
FIG. 9 is a flow chart illustrating a method, according to an exemplary embodiment of the present invention, of providing a "what you see is what you get" (WYSIWYG) interface for entering transaction listing descriptions in the seller application.

FIG. 9 is a flow chart illustrating a method 160, according to an exemplary embodiment of the present invention, of entering a transaction listing 70 description via a transaction listing 70 description interface. In the exemplary method 160, the seller application 66 is utilized by a user at a client machine for propagating transaction listings 70 and their respective listing times to a network-based transaction facility 10. At block 162 the user indicates a desire to enter a new transaction listing 70. At block 164 the user is prompted to enter the transaction listing's 70 description via a transaction listing description interface (i.e., "WYSIWYG interface"). The transaction listing description interface may also be known as a custom input screen. In the exemplary embodiment, the WYSIWYG interface includes a first compose user interface via which text can be input and graphics selected to be included in a transaction listing 70. Also, in the exemplary embodiment, the WYSIWYG interface includes a second preview user interface to present a preview of the transaction listing 70 as it will be presented at the network-based transaction facility 10. In one embodiment, the WYSIWYG interface includes a third compose user interface to present the transaction listing 70 in a descriptor language (e.g., HTML) which the user may modify. At block 166 the user completes and saves the transaction listing 70.

Figure 10:
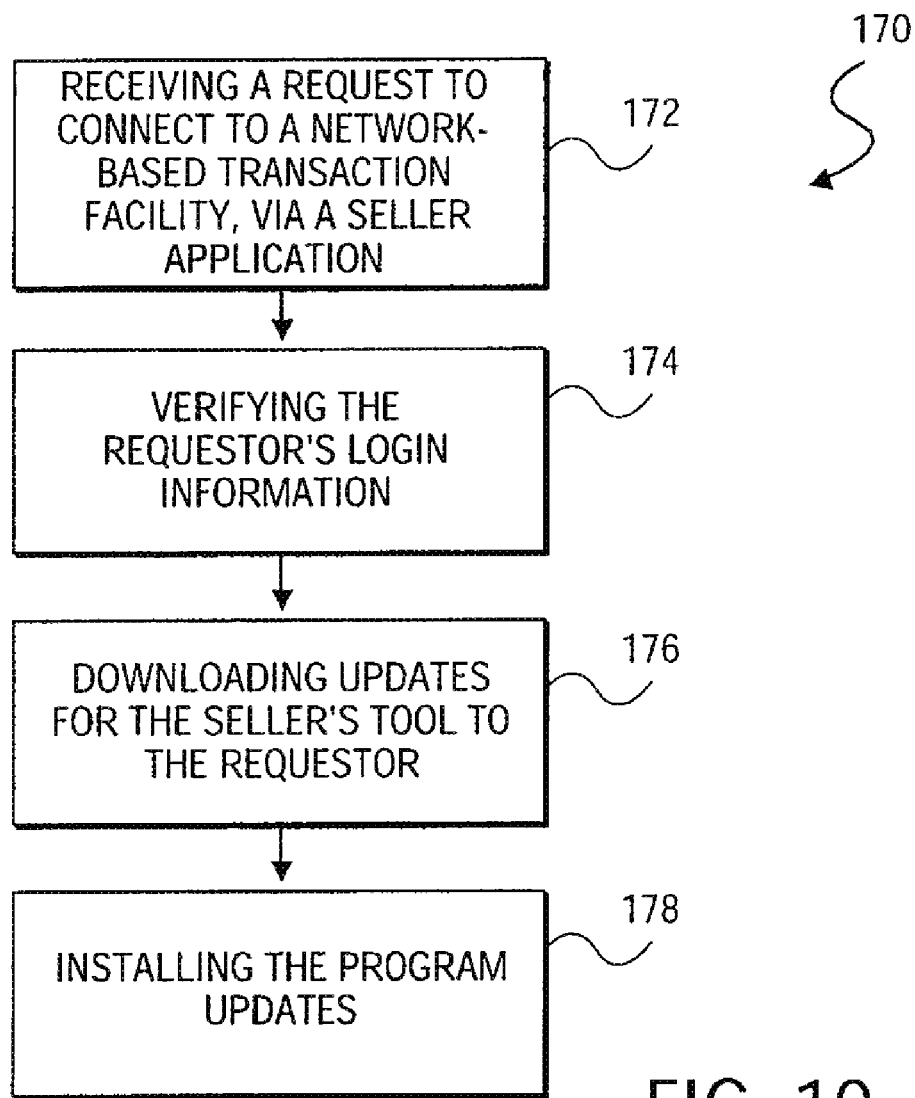
FIG. 10 is a flow chart illustrating a method, according to an exemplary embodiment of the present invention, of receiving software modules and configuration data updates/upgrades for the seller application.

FIG. 10 is a flow chart illustrating a method 170, according to an exemplary embodiment of the present invention, of facilitating the updating/upgrading of the seller application 66. In the exemplary method 170, at block 172, the network-based transaction facility 10 receives a user request to connect. The request is entered via the seller application 66. At block 174, the requestor login information is received and verified. In one embodiment verification includes verifying the UserID and Login. In an alternative embodiment verification further includes verifying user status. For example, if the user is suspended from listing transaction listings 70 at the network-based transaction facility 10 access may be denied. At block 176, upon verification, the network-based transaction facility 10 downloads updates/upgrades to the seller application 66. Before the network-based transaction facility 10 downloads updates/upgrades to the seller application 66, a determination as to whether updates/upgrades exist for the seller application 66, if so, then such existing updates/upgrades are downloaded to the seller application 66. In the exemplary embodiment, updates/upgrades include, for example, category updates, attributes updates, program information updates and version upgrades. Also, in the exemplary embodiment, updates/upgrades may only be downloaded to the seller application 66 if automatic updating is enabled at the seller application 66. At block 178, the seller application 66 updates/upgrades automatically install at the client machine upon being received.

Figure 11:
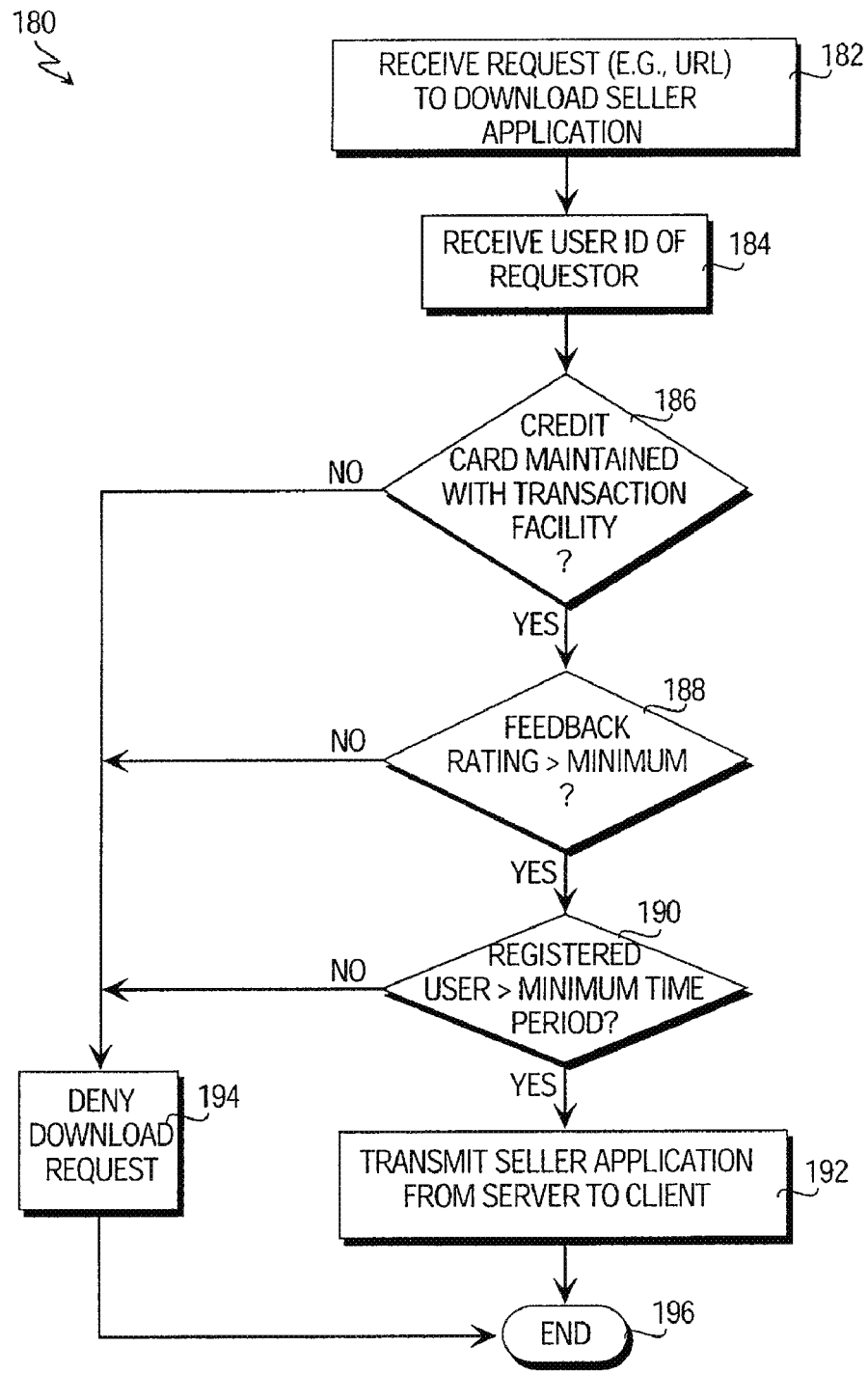
FIG. 11 is a flow chart illustrating a method, according to an exemplary embodiment of the present invention, of downloading the seller application from the network-based transaction facility to a client machine.

FIG. 11 is a flow chart illustrating a method 180, according to an exemplary embodiment of the present invention, of downloading the seller application 66 from the network-based transaction facility 10 to a client machine 38.

At block 182, the network-based transaction facility 10 receives a request to download the seller application 66. In one embodiment, this request may be received by user-selection of a hypertext link, or other location identifier, presented to the user within the context of a markup language document displayed by the browser application 36.

At block 184, the network-based transaction facility 10 further receives the requesting user's identifier. The user identifier is provided by the user via an interface, for example, presented to the user in the form of a markup language document displayed by the browser application 36.

At decision block 186, a determination is made by the network-based transaction facility 10 as to whether the requesting user maintains credit card details with the network-based transaction facility 10. Specifically, should the requesting user be a registered user of the network-based transaction facility 10, the network-based transaction facility 10 may during a registration process request the relevant user to provide details of a valid credit card.

At decision block 188, a determination is made by the network-based transaction facility 10 as to whether a negative feedback rating for the requesting user exceeds a predetermined minimum. Specifically, in one embodiment, the network-based transaction facility 10 provides a feedback mechanism by which users may provide feedback regarding other users with which they have transacted. Such a feedback mechanism is useful for establishing trust between users of the network-based transaction facility 10, and also provides an indication of the trustworthiness and reliability of the user.

At decision block 190, a determination is made as to whether the requested user has been a registered user of the network-based transaction facility 10 for a predetermined time period. For example, should the requesting user have only been a registered user for a number of hours, or less than a week, insufficient time may have passed to establish the credibility, trustworthiness and reliability of the requesting user. Further, a user seeking to perpetrate a fraud utilizing the network-based transaction facility 10 may register under an alias for the specific purposes of perpetrating such a fraud. The check performed at block 190 seeks to reduce access to the seller application 66 by a user who has not been registered for a sufficient period of time so as to increase the probability of the detection of a fraudulent registration.

Following a negative determination at any one of decision blocks 186, 188 or 190, the method 180 denies the download request at block 194. On the other hand, following positive determinations at each of decision blocks 186, 188 and 190, the network-based transaction facility 10, at block 192, proceeds to download the seller application 66 to the client machine 38 via the interact 34. The method 180 then terminates at block 196.

Figure 12A:
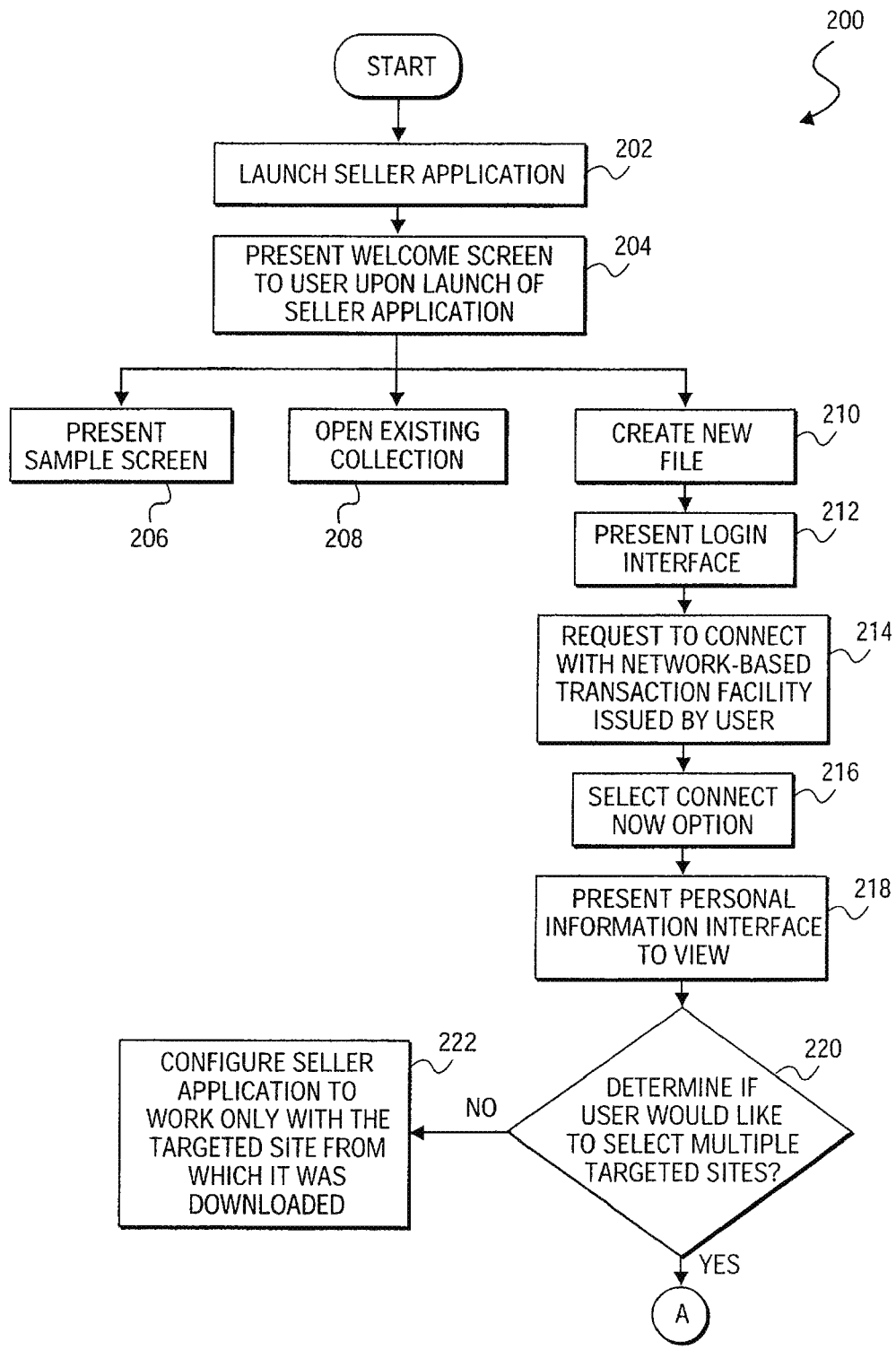
FIG. 12A-12B is a flow chart illustrating a method, according to an exemplary embodiment of the present invention, of customizing the seller application utilized to propagate transaction listings and their respective start times to a network-based transaction facility.
Figure 12B:
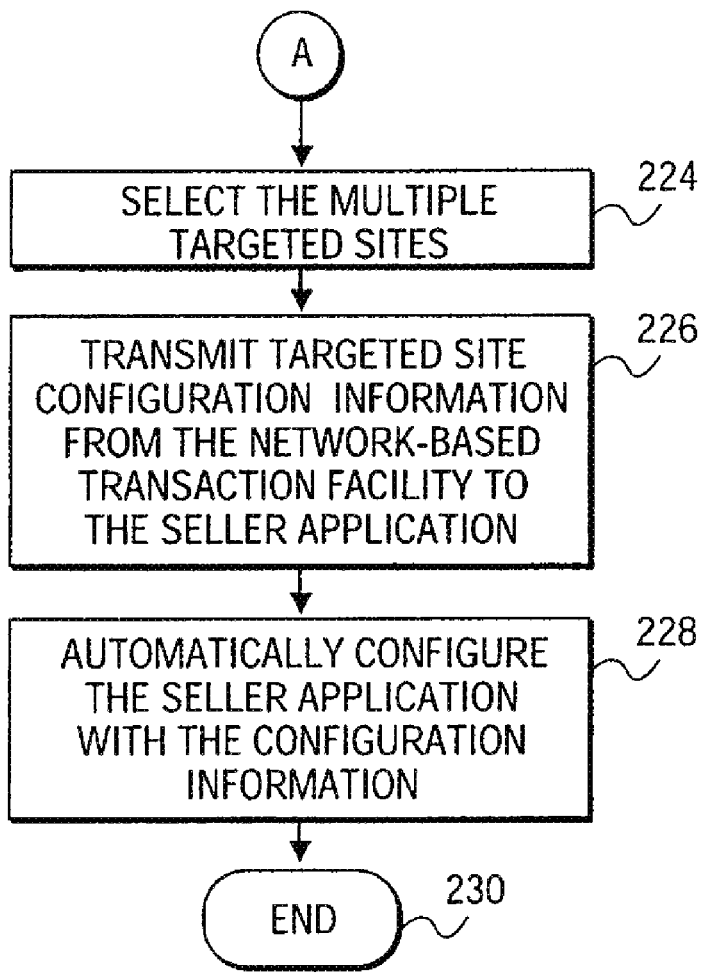

FIG. 12 is a detailed flow chart illustrating detailed method 200, according to an exemplary embodiment of the present invention, of customizing (or configuring) the seller application 66 utilized to propagate transaction listings 70 and their respective start times to a network-based transaction facility 10.

Through customizing the seller application 66, a user may utilize the seller application 66 to list transaction listings 70 at multiple targeted sites (e.g., geographically targeted sites for each of the US, Germany, UK, etc . . . ). The default display language of the seller application 66 may match the local language of the targeted site from which it was downloaded. The user interfaces provided to create and edit transaction listings 70 for a specific targeted site displays in a customized manner (e.g., in the targeted site's local language). For example, if a user downloads the seller application 66 from the network-based transaction facility's 10 Germany site, the user interface may be presented in German. In a further example, if a user chose to create an item to be listed at the Taiwan targeted site, the Create transaction listing 70 flow (i.e., series of user interfaces presented) would display in Chinese. If the user wanted to edit that item later, the Edit Item panel text would display in Chinese.

If the seller application 66 needs to display text in a language that the user does not have a font pack installed for, the user is prompted to download or install that font pack from the network-based transaction facility 10. In the exemplary embodiment, the font pack is automatically downloaded and installed when the user notifies the network-based transaction facility 10, via the seller application 66, that it would like to list at a targeted site for which a unique font pack is required. The seller application 66 allows the addition of additional targeted site(s). The ability to utilize additional targeted sites requires the user selecting the additional targeted sites, the network-based transaction facility 10 downloading any required software module and data elements to the user's seller application, installing the software and data elements, and configuring the seller application 66 to utilize the newly installed software and data elements. The user may select additional targeted sites from the seller application 66 while working offline or while connected to the network-based transaction facility 10.

The content is displayed for the user in a customized manner, for example, in the current language configured for the seller application 66. The content displayed online (e.g., at the targeted site) is in the local language of the current targeted site. In the exemplary embodiment, dates displayed at the seller application 66 appear in the format that corresponds with the current targeted site selected. In an alternative embodiment, the dates displayed at the seller application 66 appear in the language selected by the user at the seller application 66.

The seller application 66 may support site-specific transaction parameters, such as trading limits. For example, targeted sites may have trading limits implemented. Trading limits are a preset amount, varying by site, of fees a seller may accrue without having a credit card on file. If a seller has placed his/her credit card information on file for automatic monthly billing, the network-based transaction facility 10 allows the seller unlimited listing, assuming the credit card information is valid. Otherwise, when the trading limit is reached the seller may be unable to list any new items until a payment is made to bring the balance of the account below the trading limit or a credit card number is placed on the account.

The network-based transaction facility 10 performs a trading limit check when a user attempts to send transaction listing(s) 70 in batch text 68 via seller application 66. If the fees corresponding to a transaction listing 70 to be published at the network-based transaction facility 10 would cause the user to exceed their trading limit, the network-based transaction facility 10 may not allow the transaction listing(s) 70 to be propagated. In the exemplary embodiment, if the trading limit is exceeded before all transaction listings 70 in batch text 68 are read, the network-based transaction facility 10 accepts all transaction listings 70 read before the trading limit was exceeded.

The trading limit check applies to the targeted site of registration for a user. For example, if a targeted site (e.g., German transaction site) has trading limits, the trading limit check for is performed every time a user registered with the German transaction site attempts to send items to the network-based transaction facility 10, regardless of the targeted site to which they are submitting their listings.

When a particular targeted site is chosen, the country's corresponding currency is utilized by the seller application 66. For example, when the U.S. targeted site is selected, all fees display in US$. In an alternative embodiment, the seller application 66 utilizes currencies from multiple countries. For example, in the alternative embodiment, when the U.S. targeted site is selected, all fees display in U.S. currency and Canadian currency. In the exemplary embodiment, the seller application 66 recognizes and applies formatting unique to the particular targeted site with which the user has selected. As an example, for Germany and Taiwan, currency fields may only allow whole numbers. Also, US, AU, CA, UK include a decimal separator (for cents). In addition, France, Spain, Netherlands, Italy, Germany, Belgium (France), and Belgium (Netherlands) have a comma separator (for cents). Moreover, Netherlands and Belgium (Netherlands) have a comma separator for "Buy It Now" (BIN) and Reserve Price, but only allow whole numbers for minimum Bid.

Figure 13A:
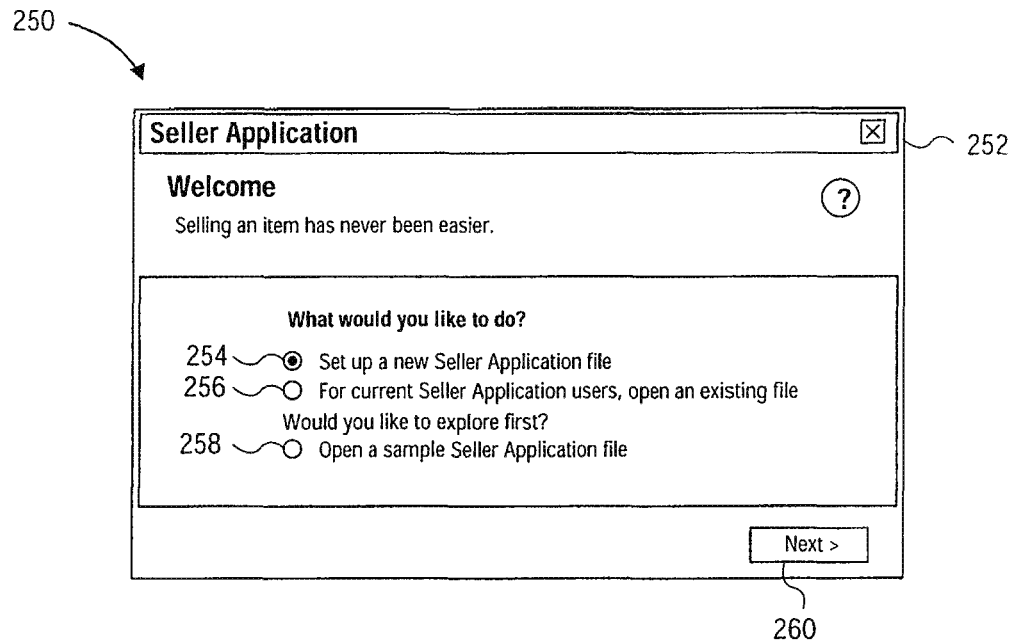
FIGS. 13A-13E illustrates interfaces that may be presented to a user by a network-based transaction facility so as to facilitate customization of the seller application.

Referring back to FIG. 12, the method 200 commences at block 202 where a user starts the seller application 66. The method 200 progresses to block 204, where the seller application 66 present a welcome screen 250, an exemplary embodiment of which is shown in FIG. 13A. The welcome screen 250 provides the option to exit 252, open a sample file 254, create a new file 256, or open a sample file 258. In the exemplary embodiment, upon selecting one of options 252-258, the "next" button 260 is selected to initiate the option selection. In an alternative embodiment, options 252-258 are initiated automatically upon their selection.

If open a sample file 254 is chosen, the method 200 progresses to block 206, where the user is presented with a sample screen of transaction listings 70. However, if create a new file 256 is chosen, the method 200 progresses to block 210, where the process of entering transaction listings 70 into a collection (e.g., batch text 68) is initiated.

On the other hand, if open an existing file 258 is chosen, the method 200 progresses to block 208, where the process of opening an existing collection (e.g., batch text 68) is initiated.

Figure 13B:
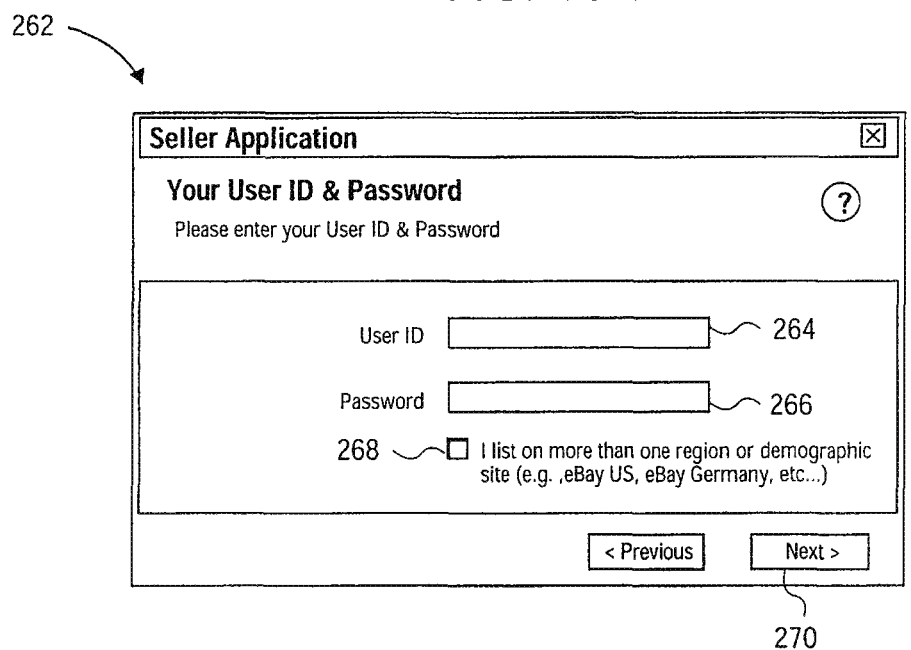

In the exemplary embodiment, if create a new file 256 is chosen at block 210, then the method 200 progresses to block 212, where the seller application 66 presents a login interface 262, an exemplary embodiment of which is shown in FIG. 13B. A userid 264 and password 266 are requested at login interface 262. The login interface 262 includes a checkbox 268 to notify the network-based transaction facility 10 of a desire to use the seller application 66 with multiple targeted or customized sites. In the exemplary embodiment, the userid and password must be obtained in advance of the user creating a new file. In an alternative embodiment, the user may obtain a userid and password upon connecting to the network-based transaction facility 10.

Figure 13C:
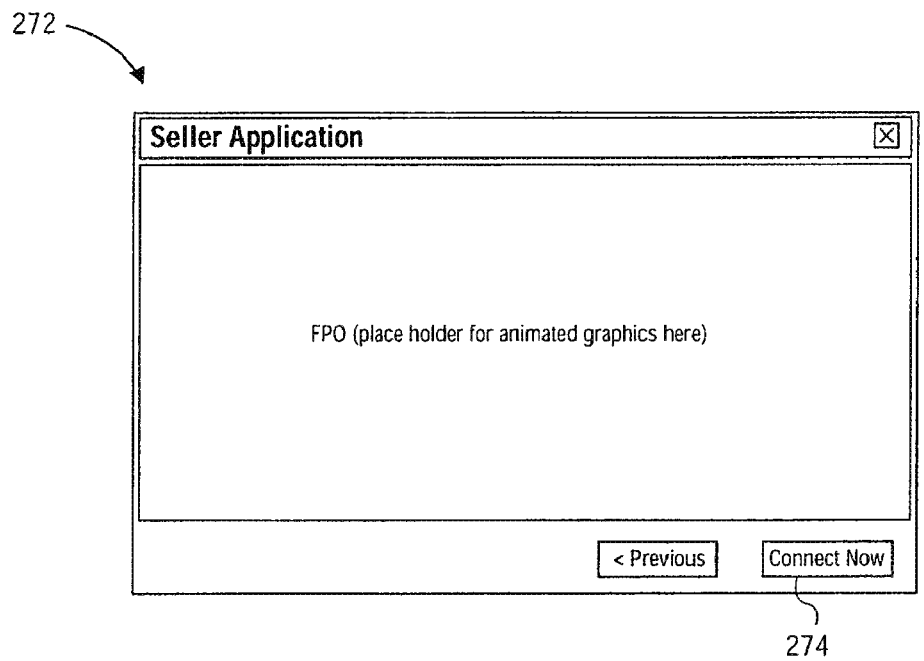

At block 214, the user issues a request to connect with the network-based transaction facility 10. In the exemplary embodiment, to connect with the network-based transaction facility 10 the next button 270 from login interface 262 is selected after entering a userid and password. The method 200 then progresses to block 216, where the seller application 66 presents a connection interface 272, an exemplary embodiment of which is shown in FIG. 13C.

At block 216, the userid and password are verified upon selection of the "connect now" 274 button in connection interface 272. If the network-based transaction facility 10 is unable to verify the userid and password, the user is requested to reenter the userid and password at login interface 262.

Figure 13D:
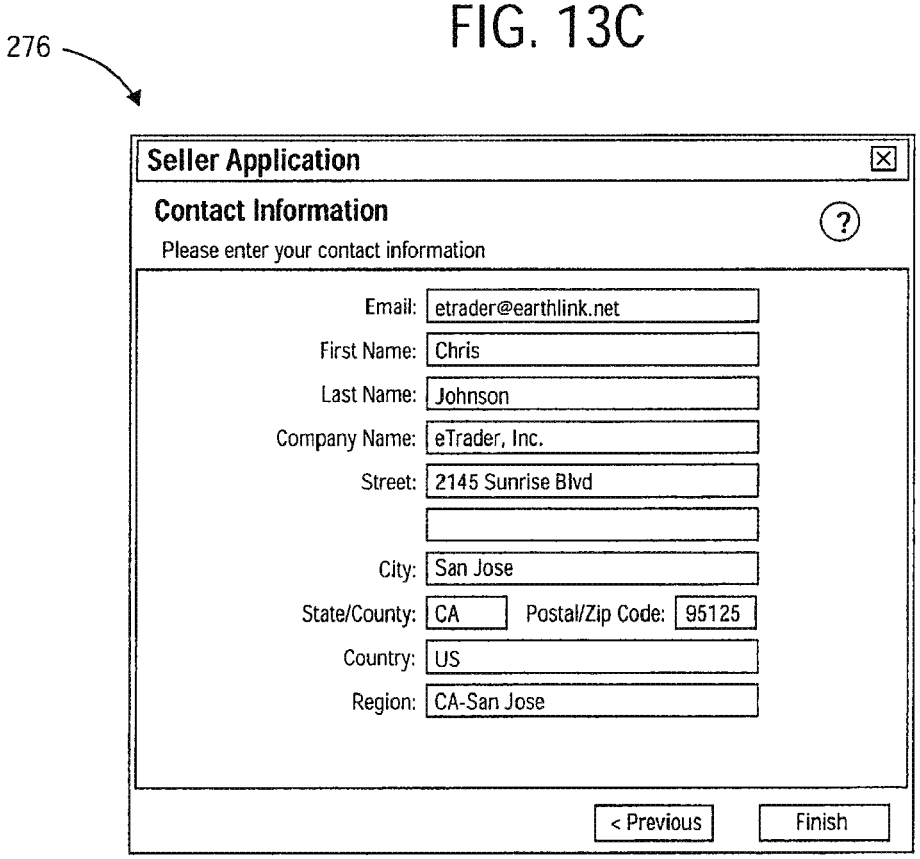

After verification at block 216, the method 200 progresses to block 218, where the seller application 66 presents personal information interface 276, an exemplary embodiment of which is shown in FIG. 13D. Such personal information is utilized to identify the user, ensure security, and facilitate the transaction process between users accessing the network-based transaction facility 10. The user information may be used to populate user preference fields (e.g., payment address and transaction listing's location) and to determine the user default targeted site. In the exemplary embodiment, the seller application 66 includes a default targeted site. In the embodiment, the default targeted site is the site from which the user downloaded the seller application 66. However, the user may edit the default targeted site.

Figure 13E:
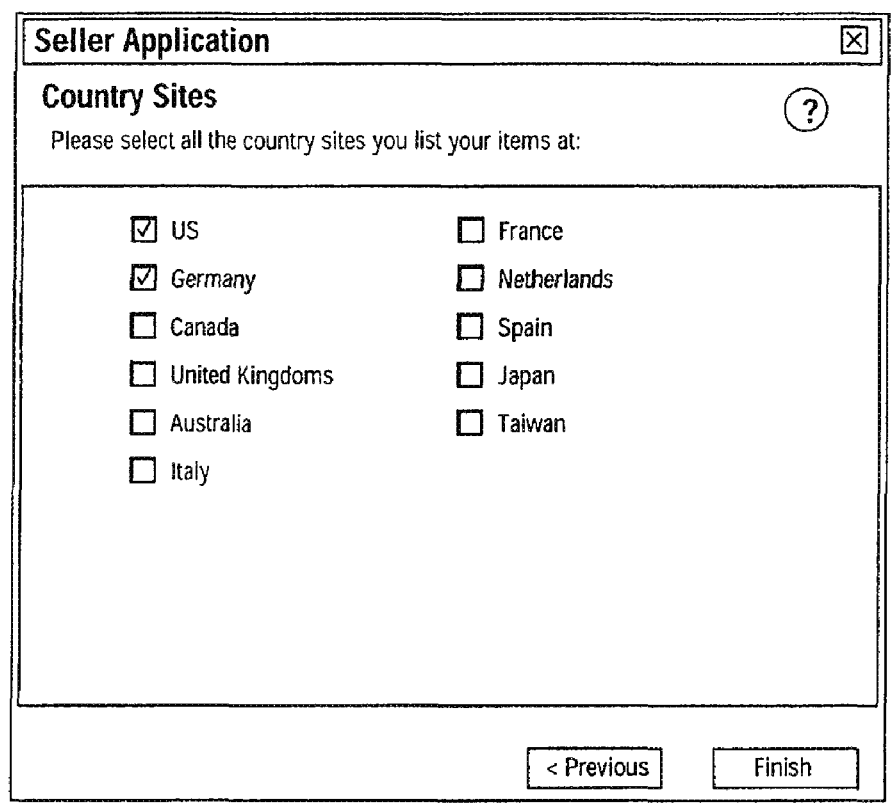

At block 220, a determination as to whether the user would like to use the seller application 66 at multiple targeted sites. Following a negative determination at block 220, the seller application 66 is configured at block 222 to work only with the targeted site (e.g., U.S.) from which it was downloaded. In one embodiment, to configure the seller application 66 includes configuring the seller application 66 to communicate with the network-based transaction facility 10 according to conventions associated with the targeted site selected. Also, in one embodiment, to configure the seller application 66 includes configuring the seller application 66 to present information to the user in a manner consistent with the conventions associated with the targeted site selected. On the other hand, following a positive determination at block 220, the method 200 progresses to block 224, where the seller application 66 presents targeted site interface 280, an exemplary embodiment of which is shown in FIG. 13E.

At block 224, multiple targeted sites to be utilized by the seller application 66 may be selected. In the exemplary embodiment, targeted site interface 280 presents the available targeted sites. It will be appreciated that other targeted sites may define more or less than a targeted site or any other attribute by which a targeted site is distinguished. For example, with regards to targeted sites distinguished by country name, a targeted site may define more than one country (continent), less than a country (e.g., region of a country, state, territory, province, etc . . . ). The user may select a targeted site by selecting a checkbox next to the desired targeted site. Multiple targeted sites may be selected. In an alternative embodiment, the user may select targeted sites by scrolling down a list and highlighting desired targeted sites.

At block 226, configuration information corresponding to the targeted sites selected at block 224 is transmitted from the network-based transaction facility 10 to the seller application 66. At block 228, the seller application 66 is automatically configured with the information downloaded at block 226. In the exemplary embodiment, configuration of the seller application may include providing software module updates, category updates, attribute updates, targeted site language updates, primary language updates, miscellaneous software miscellaneous data elements, etc . . . . Upon completion of the configuration at block 228, the seller application 66 is available to propagate transaction listings 70 and their respective start times to each of the targeted sites selected at block 224. The method 200 concludes at block 230.

Figure 14A:
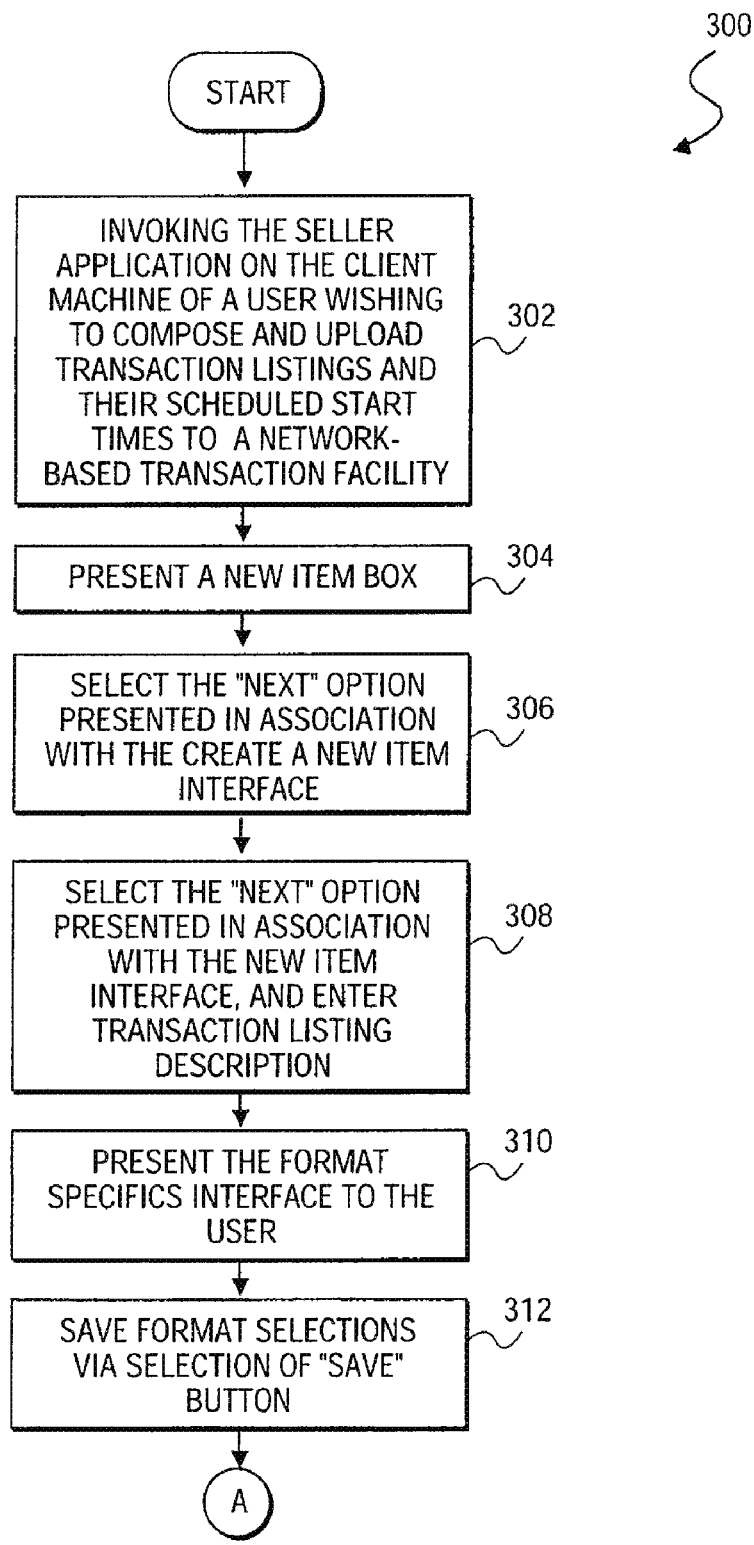
FIG. 14A-14B is a flow chart illustrating a method, according to an exemplary embodiment of the present invention, of defining batch text that embodies a collection of transaction listings, such as for example, listings to be published at an online store.
Figure 14B:
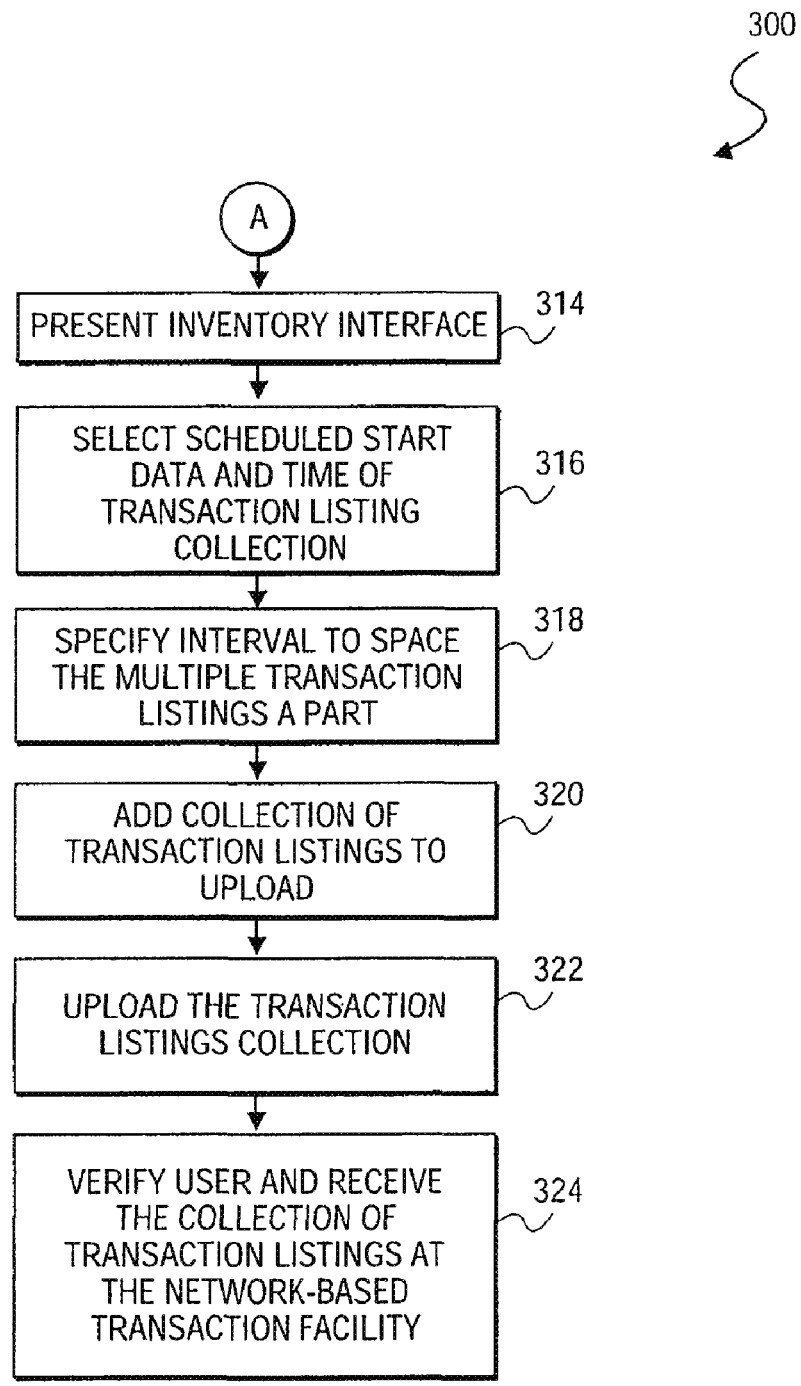

FIGS. 14A and 14B show a detailed flow chart illustrating a method 300, according to an exemplary embodiment of the present invention, of scheduling transaction listings 70, via the seller application 66, at the network-based transaction facility 10. In one embodiment, the method 300 is performed at the client-side 35 by the stand-alone, executable the seller application 66. In alternative embodiments, the method 300 may be executed by a client-side 35 executable, such as a Java applet or an ActiveX control, that executes when the context of a browser application. Intelligence resides and executes on the client-side 35 to facilitate the convenient entry of multiple transaction listings 70 by, for example, providing templates that allow for a user to define repetitive content across multiple transaction listings 70. This avoids requiring repetitive entry for each transaction listing 70. Further, the method 300 introduces client-side 35 functionality to perform a verification operation on inputted data to check for allowable contents, and the legality of contents. Also, the method 300 proposes presenting lists for allowable contents, for example as drop-down menus, from which a user may select valid contents for a particular field of a transaction listing 70. Moreover, the method 300 provides the option to schedule the transaction listings 70.

The method 300 commences at block 302 with the invoking of the seller application 66 on the client machine 38 of a user wishing to compose and propagate multiple transaction listings 70 and their scheduled start times to a network-based transaction facility 10. For example, a high volume user of a network-based transaction facility 10 may wish to propagate multiple transaction listings 70, and thus invokes the seller application 66. In one embodiment, the user may be charged a fee by the network-based transaction facility 10 for each transaction listing 70 propagated by the seller application 66 to the network-based transaction facility 10. In the exemplary embodiment, the fee is based on the user level of service (e.g., high volume user discount).

Figure 15A:
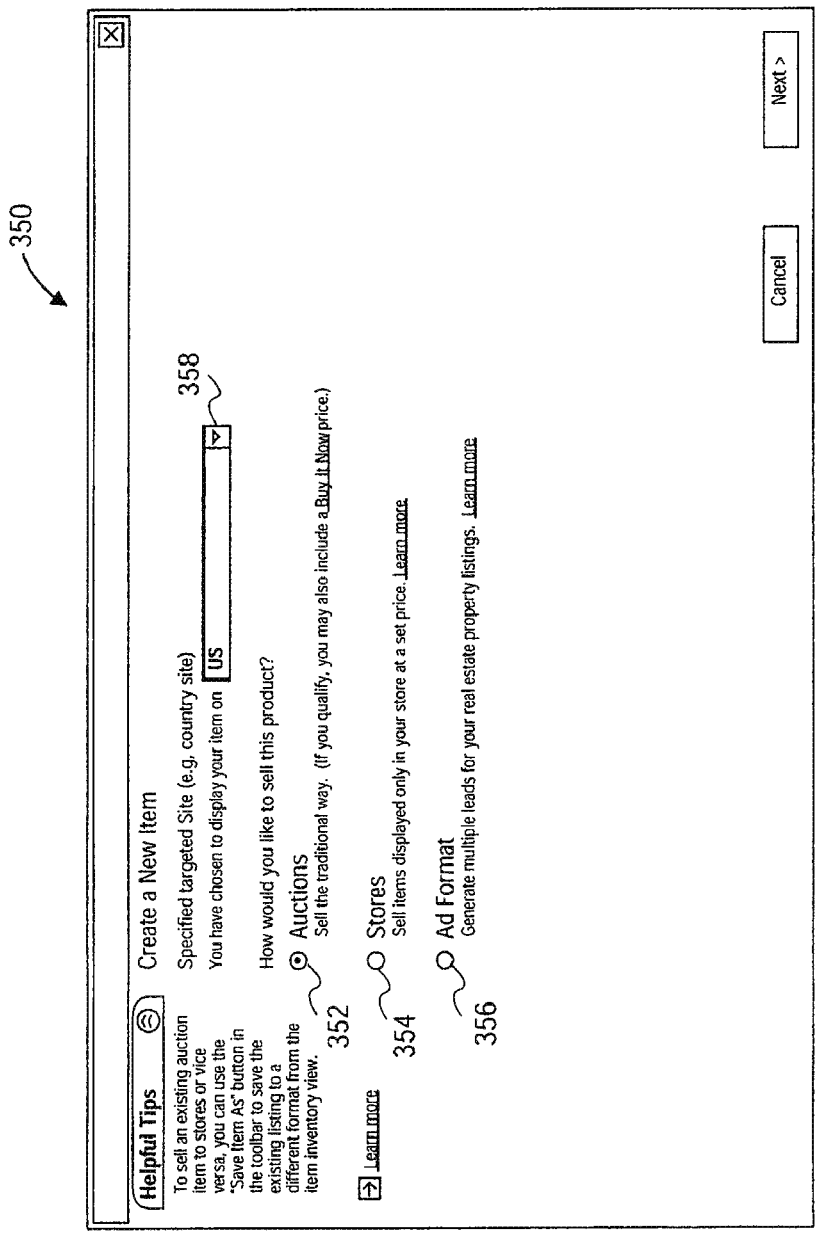

At block 304, the seller application 66 executes to present a new item box. The new item box presented at block 304 comprises a Create a New Item interface 350, an exemplary embodiment of which is shown in FIG. 15A. The new item box prompts the user to select a type of transaction corresponding to the transaction listing 70. In the exemplary embodiment, the type of transactions available at Create a New Item interface 350 include but are not limited to Auctions 352, Stores 364, and Ad Format 380. Moreover, Create a New Item interface 350 provides a drop down site list 358, from which a targeted (e.g., country) site to which the transaction listing 70 for batch text 68 including multiple transaction listings 70) is to be propagated. In the exemplary embodiment, if no selection is made at drop down list 358, the targeted site from which the seller application 66 was downloaded is chosen.

Figure 15B:

At block 306, the user selects the next option presented in association with the Create a New Item interface 350, responsive to which the seller application 66 prompts the user for information (e.g., title, category, etc.) associated with the transaction listing 70. In one exemplary embodiment, the prompting at block 306 is performed via a new item interface 362, an example of which is shown in FIG. 15B that includes a number of fields that may be populated by the user to compose the transaction listing 70. Separate dialog boxes are presented in the event that a user selects either the stores format 354 or ad format 356 in Create a New Item interface 350.

In the exemplary embodiment, the new item interface 362 is shown to include multiple input fields for receiving the item title 364, the first item category 366, the second item category 368, and the store category 370. Each of the three category input fields include a drop down list to facilitate user selection of a category. The new item interface 362 further includes attributes 376. Attributes are category-specific information items that the seller can specify to help buyers find items, and may not exist for all categories. An example would be the category of Real Estate—Residential. For example, when listing an item in this category, a user may be prompted to specify Number of bedrooms, Number of bathrooms, Square footage, Air Conditioning, Pool (drop-down with: No, Inground, Out-of-Ground), etc . . . . The attributes allow a buyer to specify that they want to find an item in the Real Estate—Residential category according to the available attributes (e.g., Number of bedrooms, Number of bathrooms), etc . . . . Examples of some of the other categories with attributes include Computers (e.g., processor speed, hard drive size), Clothing (e.g., type, brand, color), and Tickets (e.g., event type, city, state, face value). Virtually any category may be further described using attributes 376. To facilitate convenient navigation between the multiple screens utilized in creating the transaction listing 70, "previous" and "next" buttons 372 and 374 are also displayed, user-selection of which allows a user sequentially to progress through multiple screens.

At block 308, the user selects the next option presented in association with the new item interface 362, responsive to which the seller application 66 prompts the user for more detailed descriptive information (e.g., transaction listing description) associated with the transaction listing 70. In one exemplary embodiment, the prompting at block 308 is performed via a transaction listing description interface 450, such as that shown in FIG. 16A. The transaction listing description interface 450 is further described below with reference to FIG. 17.

Figure 15C:

After the transaction listing description has been entered at block 308, the method 300 progresses to block 310, where the seller application 66 presents a format specifics interface 378, an exemplary embodiment of which is shown in FIG. 15C. Various data items may be included in the format specific interface 378. Exemplary data items are shown to include the listings duration time, pricing, quantity, payment and shipping data items. An "optional features" area with multiple checkboxes is also presented so as to allow a user to specify that a particular transaction be visually or otherwise differentiated or highlighted when displayed by the network-based transaction facility 10. For example, a transaction listing 70 may be bolded, displayed with a particular background color, or have a graphic image or icon associated therewith.

At block 312, the user selects a save option 380 presented in association with the format specific interface 378, responsive to which the seller application 66 performs a verification check to determine whether the user has inputted sufficient data items to constitute a valid transaction listing 70, or whether further information is required. For example, the user may inadvertently have forgotten to input a starting price.

Figure 15D:
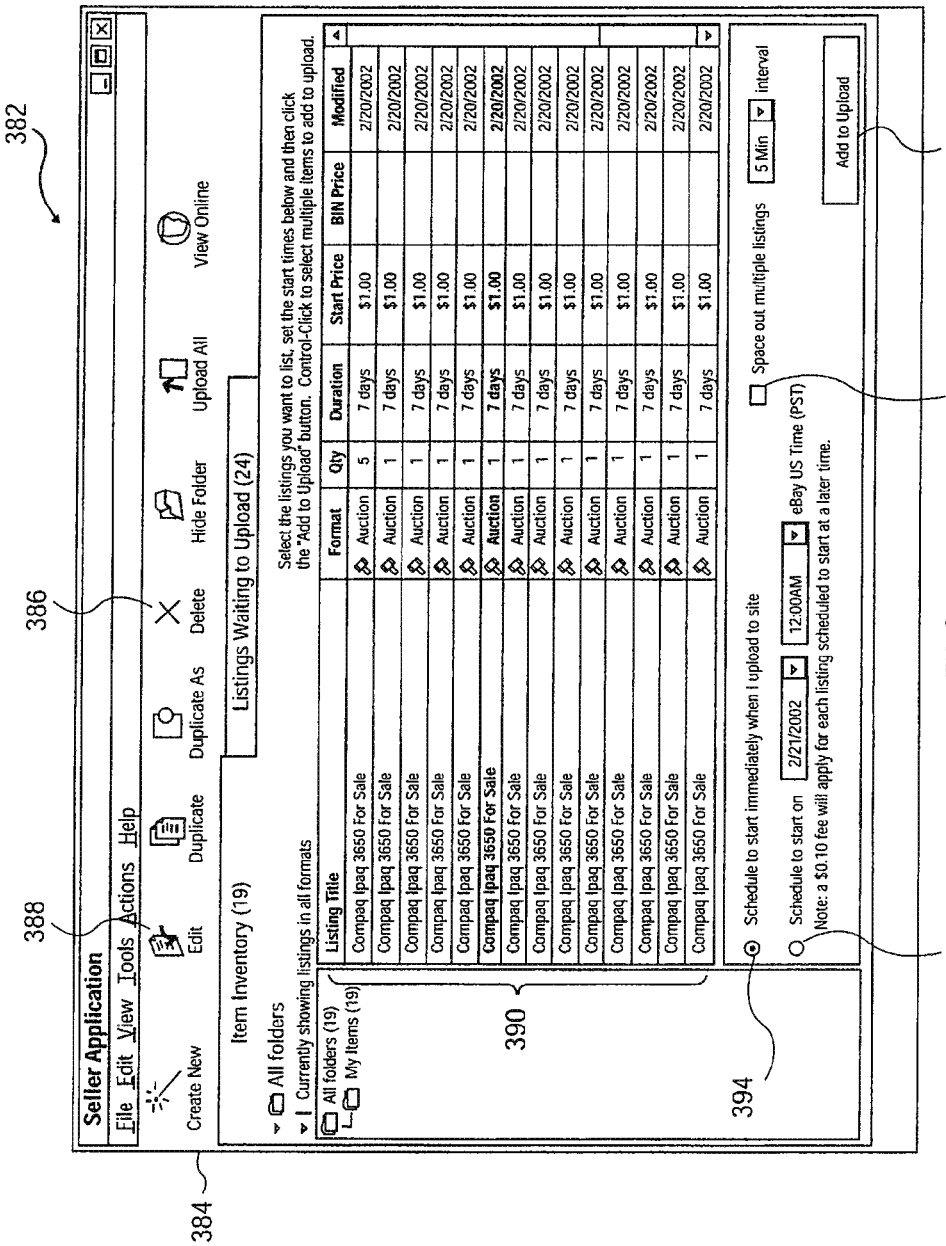

Following a positive verification, the method 300 progresses to block 314, shown in FIG. 14B, where the seller application 66 presents an inventory interface 382, an exemplary embodiment of which is shown in FIG. 15D. The item inventory interface 382 presents a selectable list of transaction listings 70 in a collection 306 associated with the targeted site selected at block 304. The user may proceed to enter another item to be included in the collection 306 by selecting the create new 384 button. In the exemplary embodiment, the user may also delete 386 or edit 388 transaction listings 70 via the item inventory interface 382.

In the exemplary embodiment, the inventory interface 382 presents a listing summary of all transaction listings 70 that constitute the batch text 68. Specifically, the main window 390 may include columns that display title, quantity, minimum price, reserve price and premium listing price information in a tabular form to the user. A user may double-click on any of the rows of transaction listings 70 presented in the main window to facilitate editing or deleting transaction listings 70.

In the exemplary embodiment, a scheduled start date and start time 392 at which the relevant batch text collection 68 of transaction listings 70 should be posted by the network-based transaction facility 10 may he selected. If the user does not wish to provide a scheduled start date and time, the scheduled start time default is to start immediately 394 upon propagation to the network-based transaction facility 10. In an alternate embodiment, a start date and time may be specified for each listing 70 within the collection 306.

At block 316, the user elects to provide a scheduled start date and start time 392 at which the collection 306 of transaction listings 70 is to be published at the network-based transaction facility 10.

At block 318, the user may optionally specify an interval 396 to stagger the multiple transaction listings 70 in the collection 306 apart by when they are published at the network-based transaction facility 10. For example, the user may specify the collection 306 of transaction listings 70 to start Jul. 4, 2002 at 9:00 PM and further specify that an interval of five minutes be included between each of the transaction listings 70 in the collection 306. Therefore, if there were three transaction listings 70 in the collection 306, the first one would start at 9:00 PM, the second at 9:05 PM, and the third at 9:10 PM. The word "start" may also be recognized as published at the targeted site selected.

At block 320, the user selects the add to propagate option 398 presented in association with the item inventory interface 382, responsive to which the seller application 66 provides the listings waiting to propagate interface 400, an exemplary embodiment of which is provided in FIG. 15E.

At block 322, the user selects the propagate all option 402 presented in association with the waiting to propagate interface 400, responsive to which the seller application 66 prompts the user for a network-based transaction facility password.

At block 324, upon user verification, the collection 306 of transaction listings 70 is propagated to the network-based transaction facility 10.

In one embodiment, batch text 68 is, as described above, propagated from the client machine 38 to the network-based transaction facility 10 via the network-based transaction facility API. In alternative embodiments, batch text 68 may be transferred via an e-mail message.

Figure 16A:
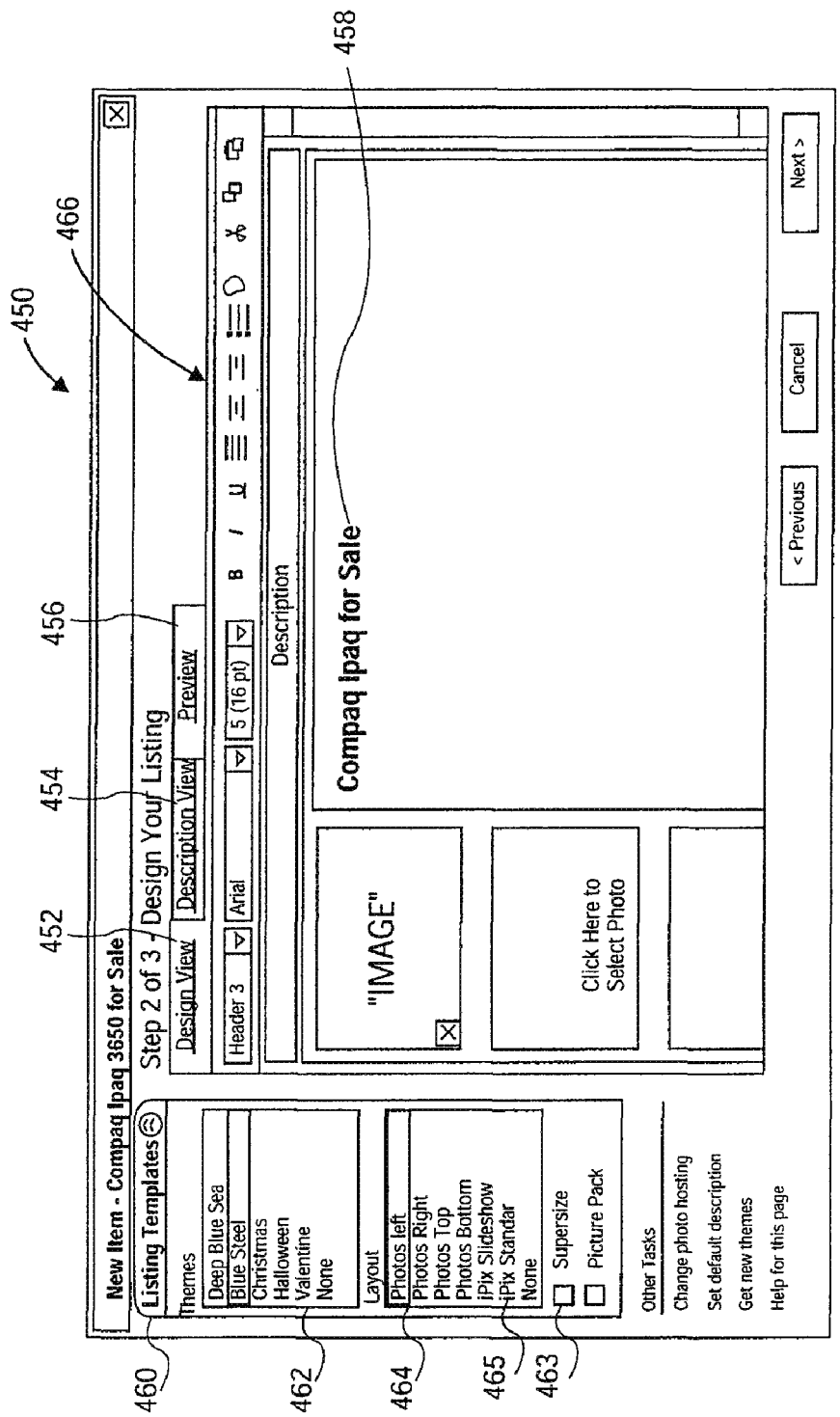
FIGS. 16A-16C illustrate interfaces that may be presented to a user by a network-based transaction facility so as to facilitate the entry of a transaction listing description.
Figure 16B:
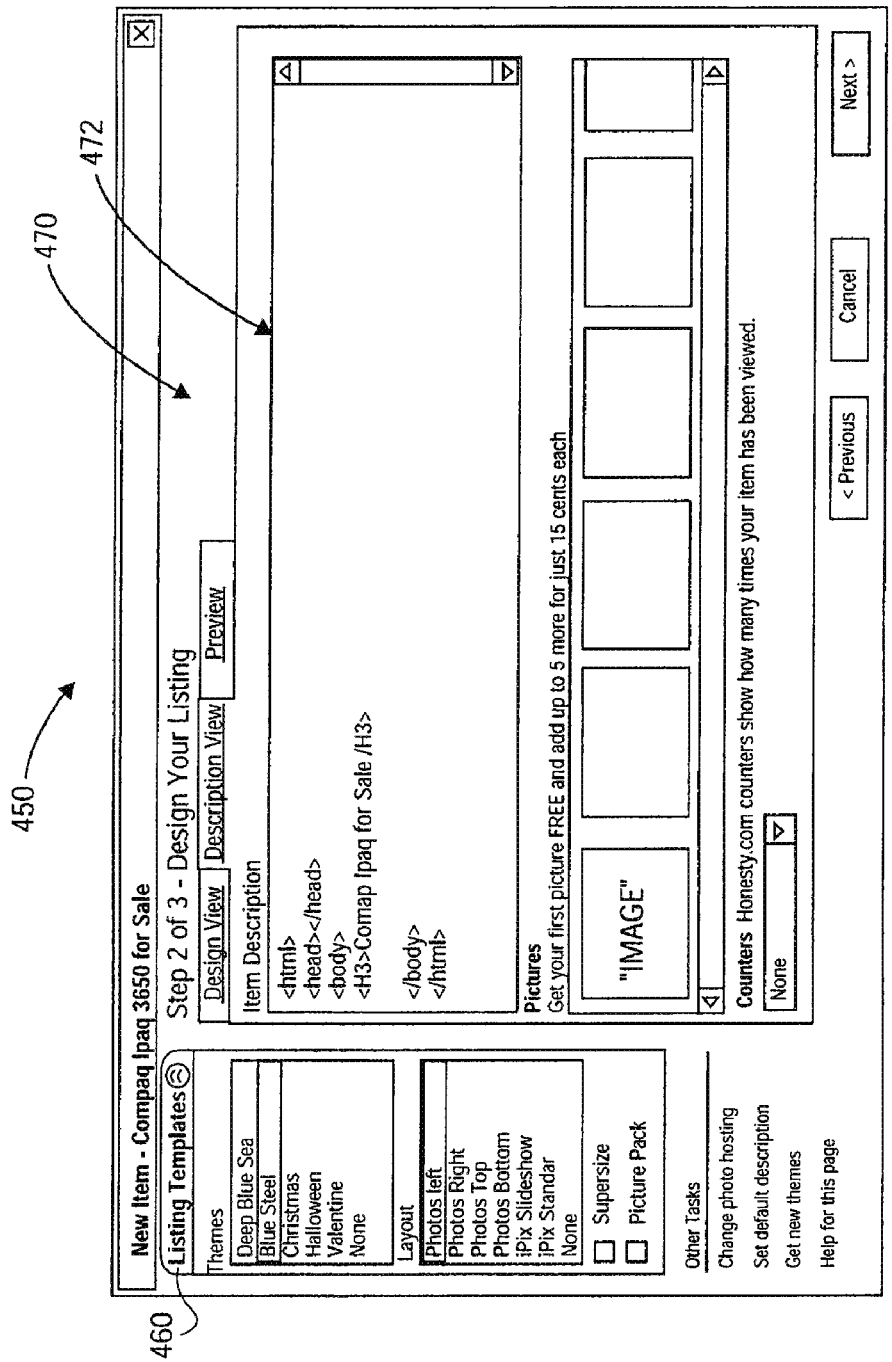
Figure 16C:
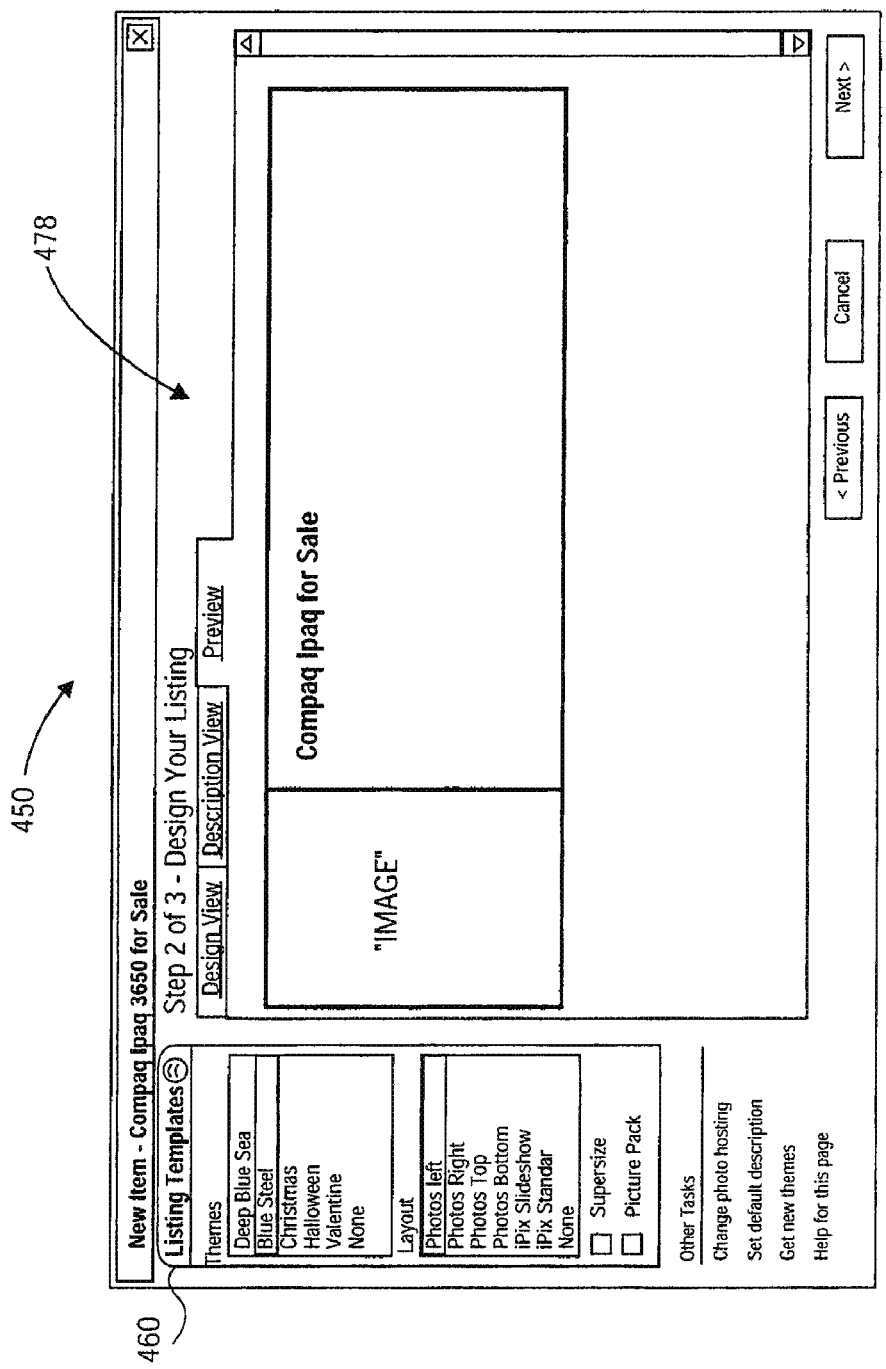

Each transaction listing 70 may include a transaction listing description. In the exemplary embodiment, the transaction listing description may be entered via a transaction listing description interface 450, an exemplary embodiment of which is shown in FIG. 16A. The transaction listing 70 includes but is not limited to text, a photograph or photographs, and formatting (e.g. layout, color, font, etc . . . ). In the exemplary embodiment, the transaction listing description interface 450 provides three selectable dialog boxes to facilitate entering the transaction listing description. The three dialog box options include a design view option 452, an HTML view option 454, and a preview view option 456. The design view option 452, if selected, allows a user to enter descriptive text 458 in a WYSIWYG setting. The HTML view option 454 allows a user to enter HTML code for their transaction listing description. The preview view option 456 allows a user to preview the transaction listing description according to the HTML that has been defined by the WYSIWYG editor or HTML code input by the user. An exemplary embodiment of a Preview view dialog box 478 is shown in FIG. 16C.

Using a design view dialog box 466, the user may input descriptive text 458 and format it using editing tools. If the user has multi-site support enabled, a tip is displayed indicating that it is preferred that transaction listings 70 be in the local language of each targeted site. A design view toolbar includes toolbar items the user may use to format their description. Each toolbar button may have a tooltip.

In the exemplary embodiment, double-byte character languages the available fonts and text controls are displayed appropriately. For example, Chinese fonts are a different set than Western, and are not compatible with Bold, Italic, or Underline. If the user is writing in Chinese, Chinese fonts are available and only applicable text controls should display.

Descriptive text 458 entered in the design view dialog box 466 is interpreted as text, including descriptor text (e.g., HTML code). However, a user may enter descriptor text in a descriptor text view dialog box 470, an exemplary embodiment of which is shown in FIG. 16B. The descriptor text (e.g., HTML code) is entered in a descriptor language code window 472. The descriptor language code window 472 automatically populates with descriptor text (e.g., HTML code) according to any text entered previously in the design view dialog box 466.

In an exemplary embodiment, the transaction listing description interface 450 further provides templates 460 to enhance the transaction listing 70. The templates may each include a theme (e.g., includes color scheme) 462 and layout 464 as shown in FIG. 16A. The themes 462 and layouts 464 may be selected independently. In addition, a user may add photos to a transaction listing 70 via the transaction listing description interface 450. The photos may be added via photo service available through the network-based transaction facility 10 or another network facility, through a user's self-hosted picture service, or from a collection of pictures stored on a user's computer. The photos may be added into image wells included within the transaction listing description interface 450.

Themes 462 may define the table border colors, any border images, background colors (description area only), etc. Layouts 464 may provide the display location of the description text and photos. The layouts 464 displayed to the user may be particular to their photo hosting preference. The seller application 66 may also provide an "Auto-resize" option. This option, if enabled, resizes the user's image to the optimal template image size.

A set of default color schemes and layouts may also be provided by the seller application 66. Between 5 and 10 of each (e.g., color schemes and layouts) may be provided. The network-based transaction facility 10 may update and add templates via updates/upgrades to the seller application 66. In an alternative embodiment, users may design their own layouts and themes. In a further alternate embodiment, layouts and themes may be imported.

Additional special features including supersize 463 and slideshow 465 may be used to enhance and/or alter the display of photos. In one exemplary embodiment, the supersize option 463 is included in the left navbar of the transaction listing description interface 450. In the exemplary embodiment, supersize 463 may be applied to all IPIX photos that qualify. Also in the exemplary embodiment, the supersize 463 option is only available for users who are utilizing the network-based transaction facility 10 picture service. The supersize 463 option allows the user to enlarge the size of an image to be included in their transaction listing 70.

The slideshow 465 feature may be selected via a special, slideshow-only layout. The dialog displayed from this template allows the addition of up to 6 photos at once as opposed to merely one photo. Therefore, the slideshow 465 feature allows a user to add up to six photos in one image well as opposed to only one photo. Photos added via the slideshow 465 feature are displayed with the transaction listing 70 at the network-based transaction facility 10. A slideshow includes the presentation of a series of photos displayed one at a time. The photos are displayed at the same position on a display. For example, a user viewing a transaction listing 70 including a slide show is provided with each photo (e.g., photos 1-6) for a period of time defined by the network-based transaction facility 10 (e.g., 5 seconds). The series of photos in the slide show are continually rotated through until one is selected, or the user closes or exits the window including the transaction listing 70.

Figure 17:
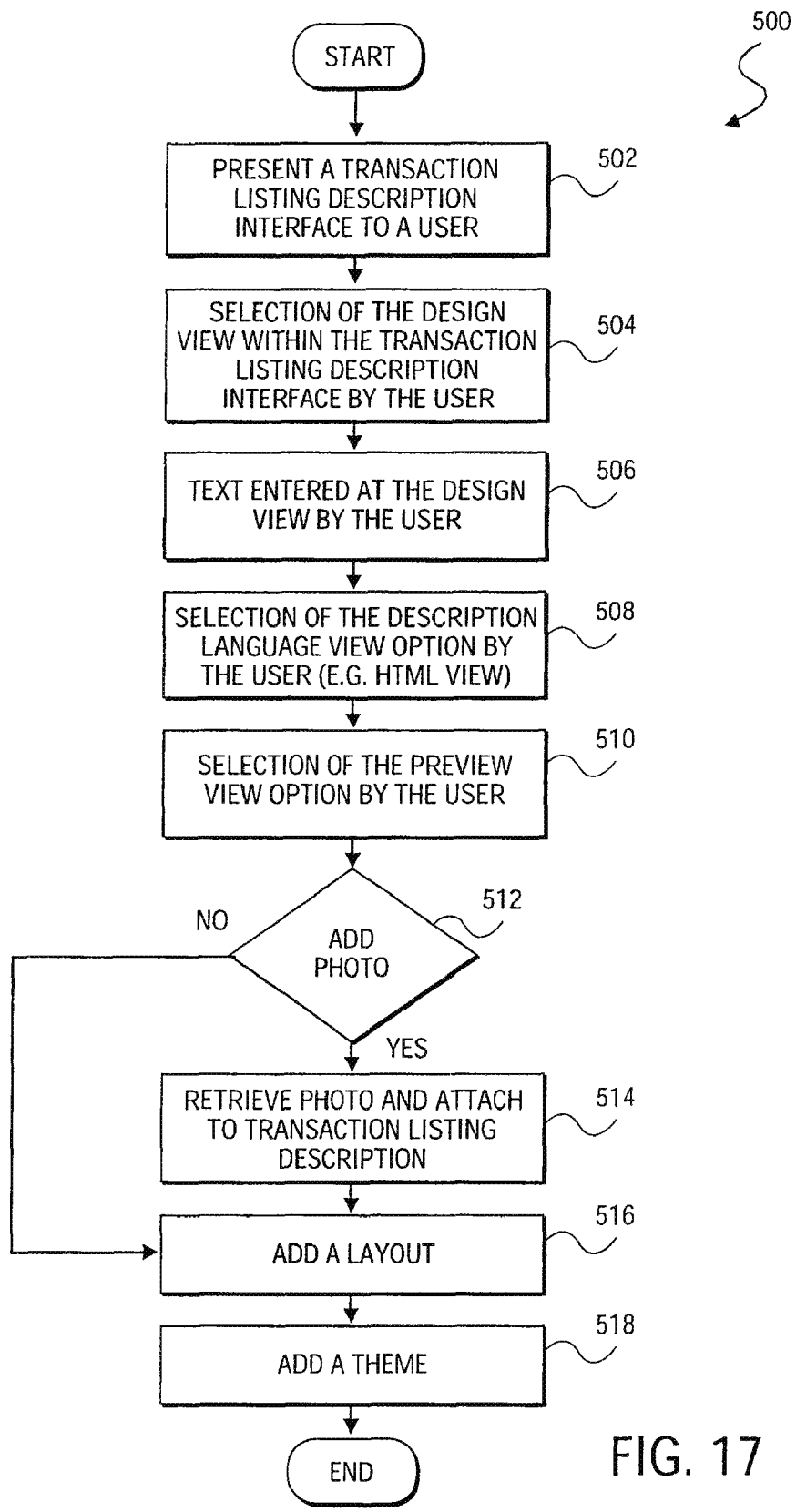
FIG. 17 is a flow chart illustrating a method, according to an exemplary embodiment of the present invention, of entering a transaction listing description via a transaction listing description interface.

FIG. 17 is a detailed flow chart illustrating a method 500, according to an exemplary embodiment of the present invention, of entering a transaction listing description via a transaction listing description interface 450. The method 500 commences at block 502, where the seller application 66 presents a transaction listing description interface 450. As described above, the transaction listing description interface 450 includes design view option 452, HTML view option 454, and preview view option 456.

At block 504, the user selects the design view option 452, responsive to which the seller application 66 presents the user with the design view dialog box 466. In the exemplary embodiment, design view dialog box 466 is the default dialog box and is presented to the user in the transaction listing description interface 450 at block 502. At block 506, the user enters descriptive text 458 at the design view dialog box 466. The user may select the preview view option 456 or the HTML view option 454 while in the design view dialog box 466.

At block 508, the user selects the HTML view option 454, responsive to which the seller application 66 presents the user with the descriptor language dialog box 470, an exemplary embodiment of which is shown in FIG. 19B. The descriptor language dialog box 470 descriptor language code portion 472 automatically populates with descriptor language code (e.g., HTML code) according to the descriptive text 458 previously entered at block 506. The user may modify (e.g., add, delete, edit) the descriptor language code in the descriptor language code portion.

At block 510, the user selects preview view option 456, responsive to which the seller application 66 presents the user with preview view dialog box 478, an exemplary embodiment of which is shown in FIG. 16C. The preview view dialog box 478 displays the transaction listing's description as it appears when published at the network-based transaction facility 10. Content may not be edited in the preview view dialog box 478.

At decision block 512, a determination is made as to whether the user wants to enter a photo corresponding to the transaction listing 70.

At block 514, if a photo is to be entered, the photo is retrieved and attached to the transaction listing 70. The user initiates the photo selection process by selecting the "select photo" button from the design view dialog box 466. In exemplary embodiments, the network-based transaction facility 10 photo hosting service may be utilized, a user specified hosting service may be utilized or the photos may be selected from a collection stored on the user's computer.

At block 516, a layout 464 to be utilized in the display of the transaction listing 70 is chosen. The layout 464 is a selectable option available at the WYSIWYG interface. A default layout is utilized if none is chosen.

At block 518, a theme 462 to be utilized in the display of the transaction listing 70 is chosen. The theme 462 is a selectable option at the WYSIWYG interface. A default theme is utilized if none is chosen. The method 500 concludes at block 1210.

Figure 18:
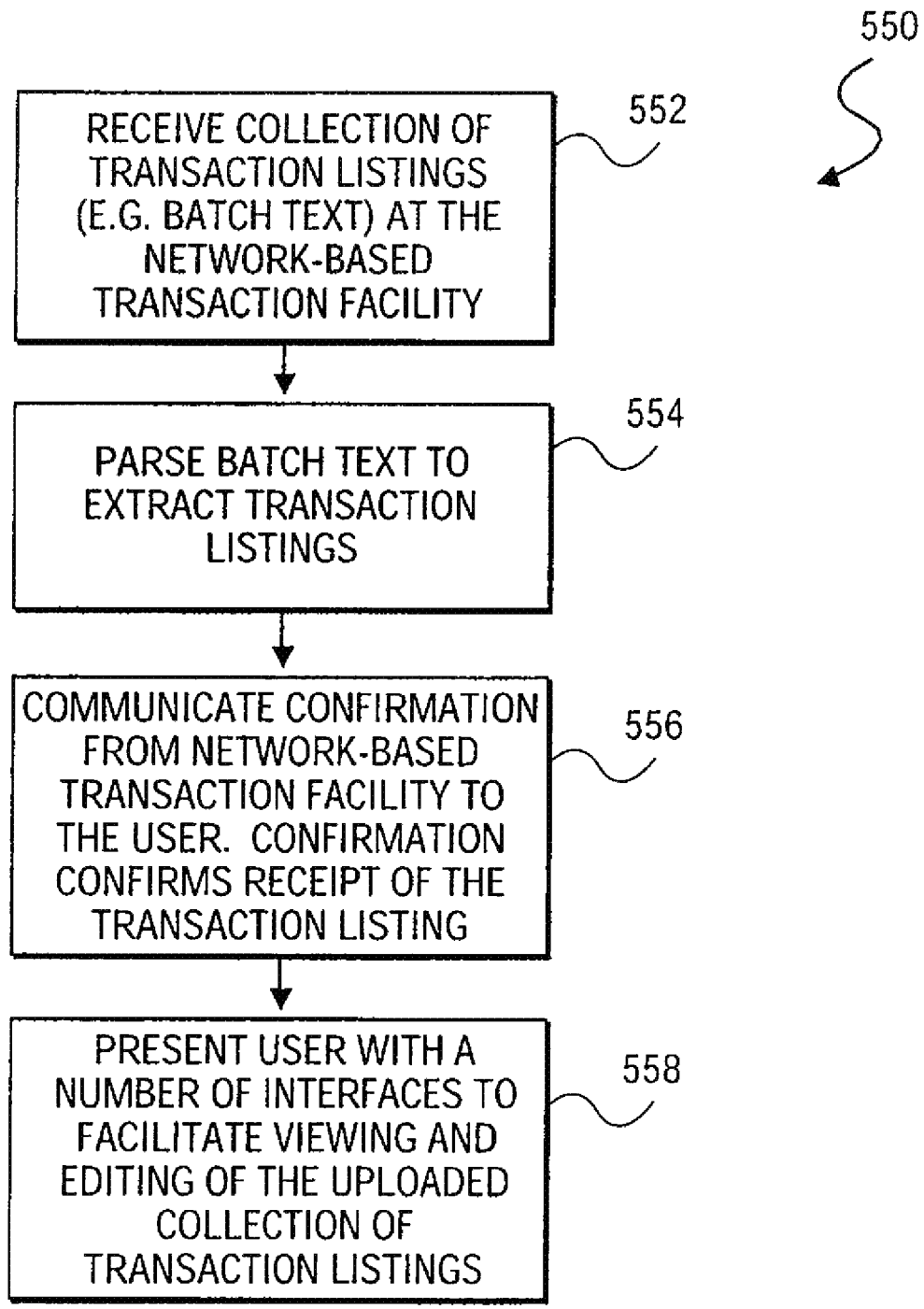
FIG. 18 is a flow chart illustrating a method, according to an exemplary embodiment of the present invention, of scheduling listings, via the seller application, at a network-based transaction facility.

FIG. 18 is a detailed flow chart illustrating a method 550, according to an exemplary embodiment of the present invention, of scheduling listings, entered via the seller application 66, after they are received at a network-based transaction facility 10. In an exemplary embodiment the transaction listings 70 define the parameters and content of an on-line commercial process (e.g., on-line store, on-line auction). Nonetheless, it will be appreciated that a transaction listing 70 may provide any transaction parameters (e.g., a product or service that is being offered for sale by any methodology, or a product service requirement description). Specifically, in an alternative embodiment, the transaction listings 70 may describe a product or service being offered for a fixed price by way of a classified advertisement or that has been offered or is required within the context of a B2B exchange or electronic marketplace.

The method 550 commences at block 552, the batch text 68 is received at the network-based transaction facility 10.

At block 554, the parser module 76 of the transaction application 311 parses the batch text 68 to extract the various transaction listings 70 embodied therein, and performs various verification operations with respect to each of the each of the extracted transaction listings 70.

At block 556, the transaction application 311 communicates a confirmation message to the client machine 38 to confirm successful receipt and extraction of the various transaction listings 70, including their scheduled start times. In one embodiment, the confirmation message may comprise an e-mail message communicated from the e-mail servers 22 of the network-based transaction facility 10. In an alternative embodiment, the page server 12 may, responsive to a user request, generate a markup language document (e.g., HTML document) that communicates the confirmation message to the user. The confirmation message communicated to the client machine 38 at block 556 may further include a location identifier (e.g., a Uniform Resource Locator (URL)) that provides a link to a listing of the collection of transaction listings 70 extracted by the parser module 76 at block 656 from batch text collection 68. In an alternative embodiment, the confirmation message itself may present such a list of transaction listings 70. For example, the confirmation message that is communicated via e-mail to the client machine 38 may comprise an HTML document that provides a list of transaction listings 70 included within batch text 68 including the collection 306.

At block 558, the user is presented with a number of interfaces that facilitate viewing and editing of the propagated collection (e.g., in the form of batch text 68) of transaction listings 70. Consequently, the user may update the transaction listings 70 after they have been propagated via the data file (e.g., batch text 68) to the network-based transaction facility 10. The user may either update the transaction listings 70 online while connected to the network-based transaction facility 10 or make updates at the seller application 66 and propagate them to the network-based transaction facility 10. In one embodiment, the various interfaces that facilitate viewing and editing of the transaction listings 70 may be markup language documents that are generated by the page server 12 and communicated to the client machine 38 via the Internet 34 for viewing within the context of the browser application 36. For example, such interfaces in the form of markup language documents may be invoked by user-selection, on the client-side 35, of a URL included within the confirmation message communicated at block 556. In an alternative embodiment, the interfaces presented at block 558 may be generated by the seller application 66 utilizing, for example, text and data communicated from the transaction application 311. FIGS. 19A and 19B illustrate exemplary interfaces 600 and 602 that may be presented to a user by a network-based transaction facility 10 so as to allow the viewing, editing, previewing and confirmation of collections of transaction listings 70 and of individual transaction listings 70.

The seller application 66 includes the ability to automatically update/upgrade itself with certain pieces of information provided by the network-based transaction facility 10.

Figure 20:
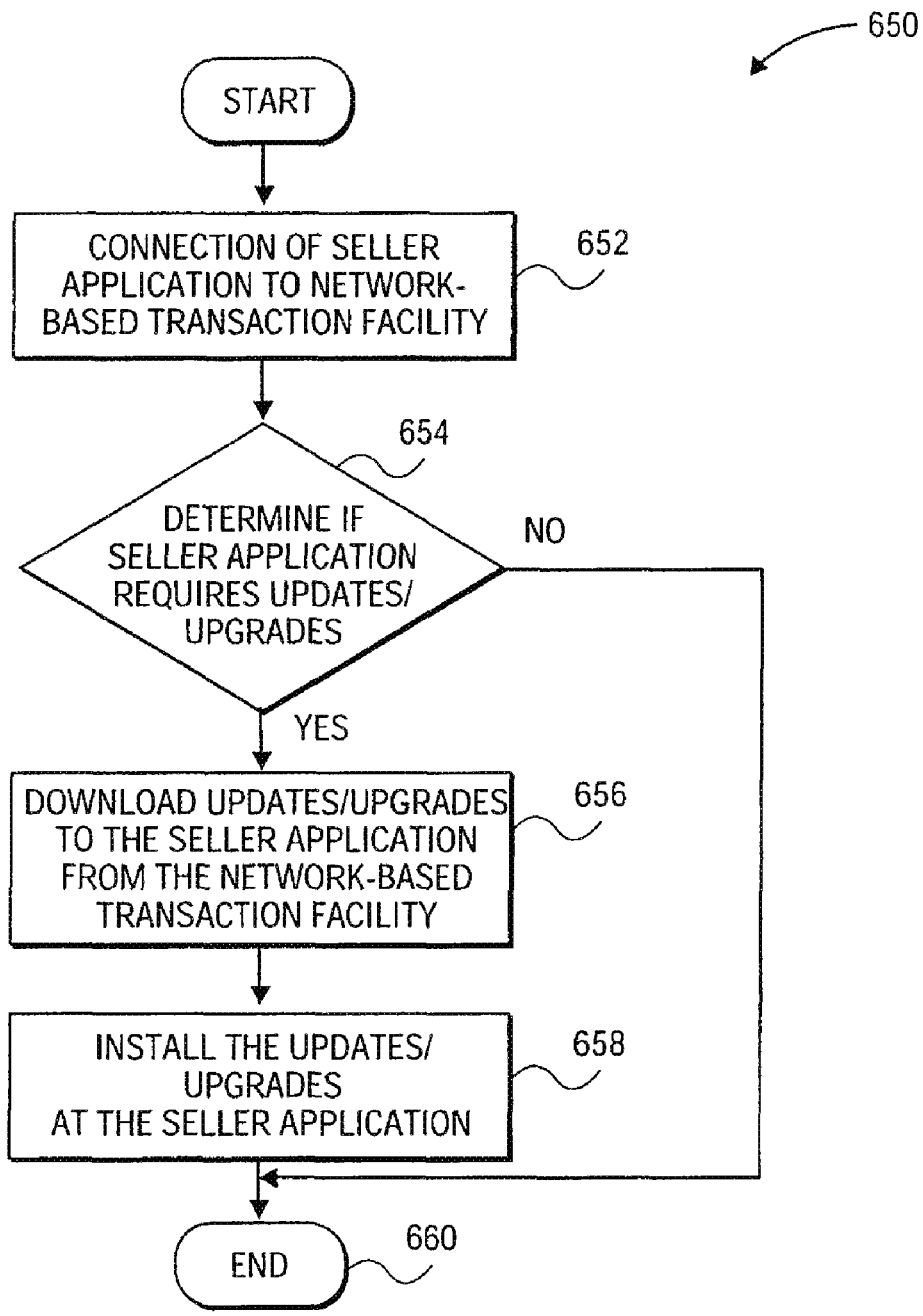
FIG. 20 is a flow chart illustrating a method, according to an exemplary embodiment of the invention, of facilitating the updating/upgrading of the seller application.

FIG. 20 is a detailed flow chart illustrating a method 650, according to an exemplary embodiment of the invention, of facilitating the updating/upgrading of the seller application 66. The method 650 commences at 652 at connection to the network-based transaction facility 10 by the seller application 66.

At block 654, the network-based transaction facility 10 determines if there are updates/upgrades, which the seller application 66 has not received. To support minimal updates/upgrades, versioning mechanism is used to compare available versions of data elements (e.g., targeted site config files 86) modules (e.g., main module 84, communication module 95, resource module 81, etc.) for the seller application 66 at the network-based transaction facility 10 against the versions of the installed data elements and modules at the seller application 66. Updates/upgrades are downloaded for software modules and data elements that have changed. The downloaded data may be compressed to shorten transfer times. As explained earlier, in the exemplary embodiment, updates/upgrades include but are not limited to categories updates, attributes updates, program information updates and version upgrades. With regards to categories, the seller application 66 determines if there are new/different category structures for any of the seller application 66 enabled targeted sites. Providing automatic category upgrades to the seller application 66 upon connection the network-based transaction facility 10 is advantageous in that categories may change frequently (e.g., once a month).

With regards to attributes, the seller application 66 determines if there are new/different attributes structures for any of the seller application 66 enabled targeted sites. As previously explained, attributes are category-specific information items that the seller can specify to help buyers find items, and may not exist for all categories. An example would be the Real Estate—Residential category. For example, when listing an item in this category, a user may be prompted to specify Number of bedrooms, Number of bathrooms, Square footage, Air Conditioning, Pool (drop-down with: No, Inground, Out-of-Ground), etc . . . .

The buyers are then presented with a selector tool to use while searching that allows specification of certain attribute requirements (e.g., in the Real Estate—Residential category, with "New York" in the item title, 4 bedrooms, and 2 bathrooms). Without attributes, the sellers may specify such information but it is not standardized so a reliable search mechanism cannot be provided. With attributes, a user is assured that the right information is being searched and retrieved.

Some other example categories with attributes include a computers category (processor speed, hard drive size, etc . . . ), a clothing (or apparel) category (type, brand, color, etc . . . ), and a ticket category (event type, city, state, face value, etc . . . ).

In the exemplary embodiment, version upgrades include modifications made to the seller application 66 (e.g., software changes). Such modifications may also be known as program updates. Also in the exemplary embodiment, the seller application 66 updates/upgrades may be deferred. However, the network-based transaction facility 10 may force an upgrade critical changes to the program) or update (e.g., critical changes to categories). The user does not have the ability to opt out of a forced update or upgrade.

At block 656, if the network-based transaction facility 10 determines that there are updates/upgrades to the seller application 66, the updates/upgrades are downloaded to the seller application 66. In one embodiment, updates/upgrades are only downloaded if automatic updating of the seller application 66 is enabled. Following a positive determination at decision block 656, the method 650 progresses to block 658, where the updates/upgrades are automatically installed. In the exemplary embodiment, the seller application 66 includes routines to automatically install the updates/upgrades. In an alternative embodiment, install routines are downloaded with each series of updates/upgrades. The install routines are configured to automatically launch upon completion of the download and to install the program updates/upgrades. In one embodiment, the install routines are configured to automatically launch only if automatic updating of the seller application 66 is enabled. The method 650 concludes at block 660.

Figure 21A:
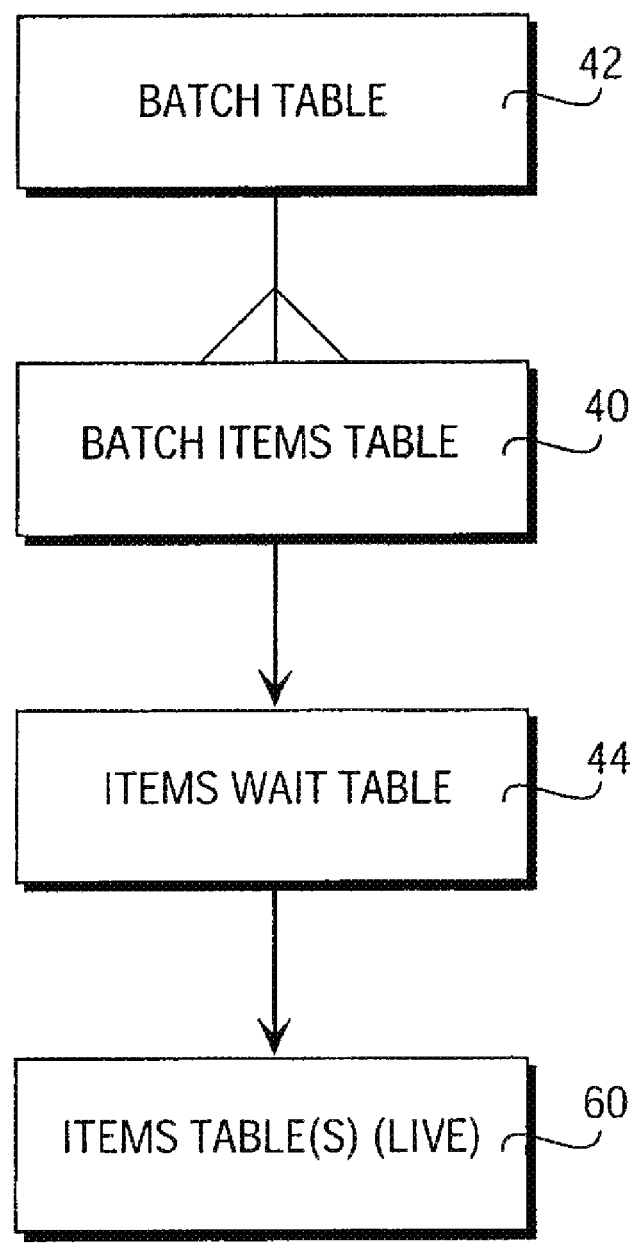
FIGS. 21A-21C provide a diagrammatic representation of a database structure, as may be maintained by the database engine server of a network-based transaction facility, according to an exemplary embodiment of the present invention.
Figure 21B:
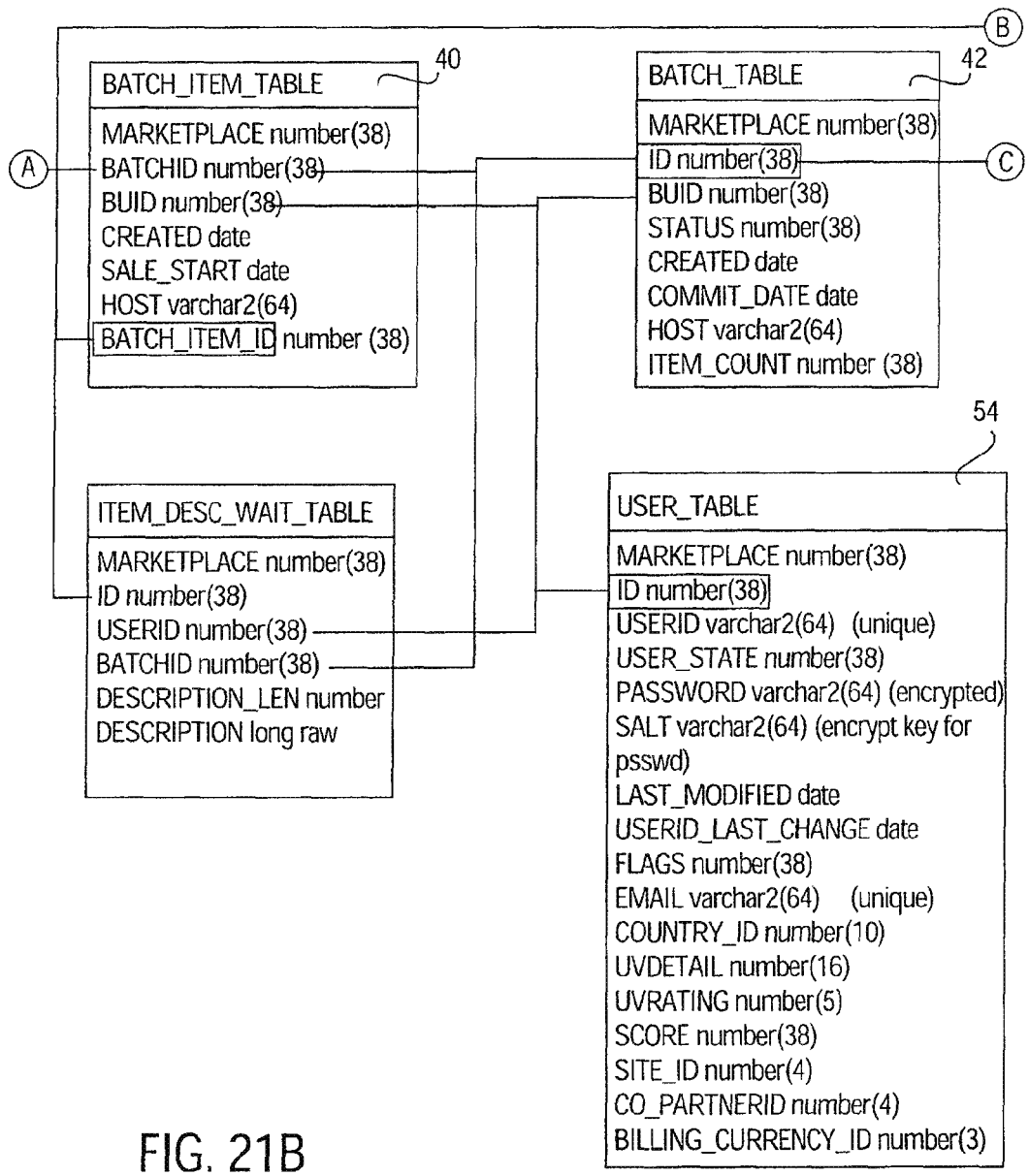
Figure 21C:
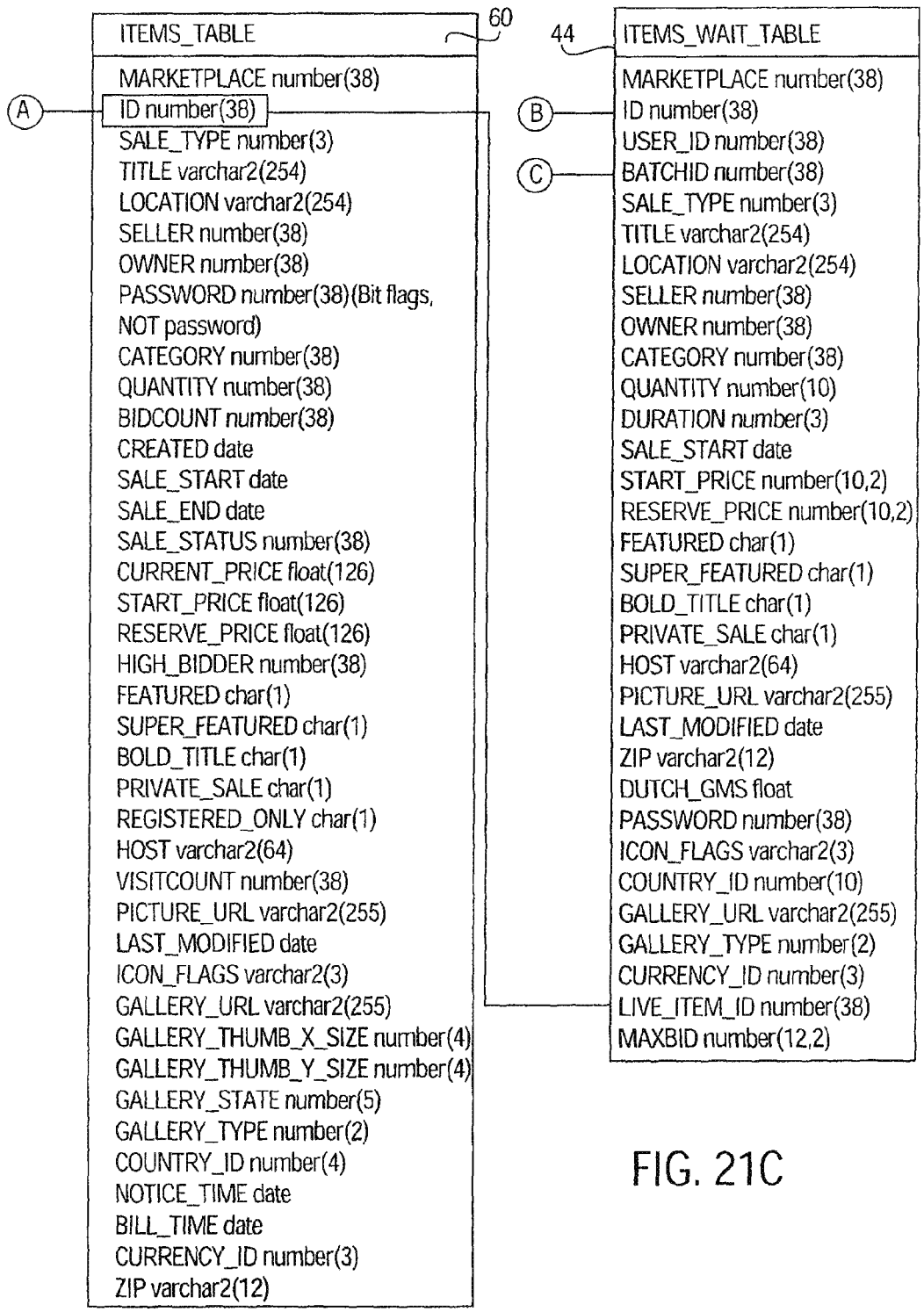

FIGS. 21A-21C provide further details regarding the database structure, maintained by the database engine server 26, to support the above-described methodologies.

At FIG. 21A, the batch table 42 includes a record for each collection of transaction listings 70 as originally described, for example, within batch text 68 received at the network-based transaction facility 10.

A one-to-many relationship exists between the batch table 42 and the batch items table 40, which contains transaction listings 70 extracted by the parser module 76 from the batch text 68 into the database 30, but which have not as yet gone live.

The items wait table 44 stores loaded transaction listings 70 that are waiting to go live as described above. The items tables 60 stores records of the actual transaction listings 70 that have gone live by the initiation of the transaction process (e.g., an auction process or an offer for sales prices) by the network-based transaction facility 10.

FIGS. 21B and 21C illustrate an entity relationship diagram providing further details regarding exemplary fields that my be supported by the batch, batch items, items wait, items, user and related tables.

Figure 22:
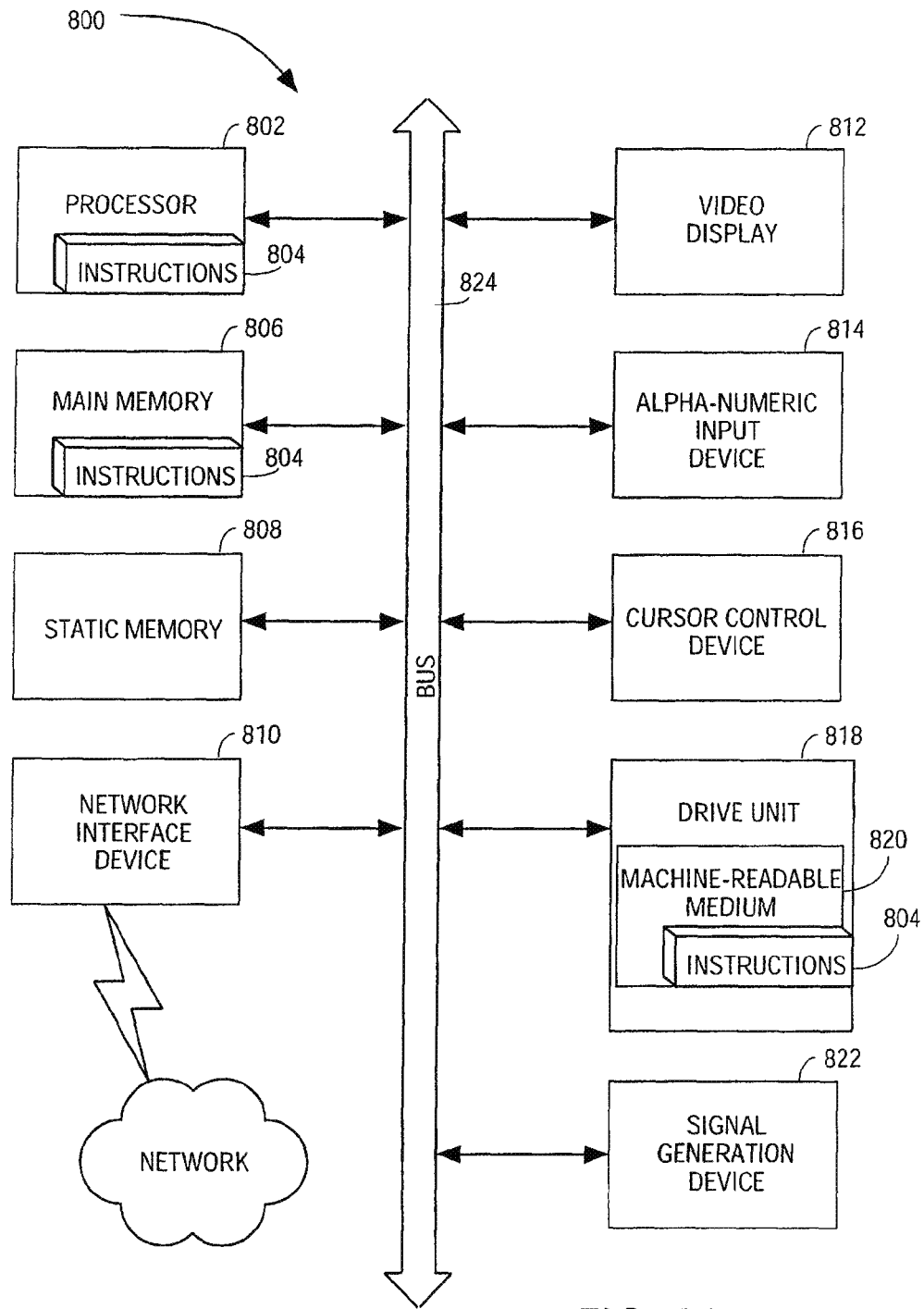
FIG. 22 shows a diagrammatic representation of machine in the exemplary form of a computer system within which a set of instructions, for causing the machine to perform any one of the methodologies discussed above, may be executed.

FIG. 22 shows a diagrammatic representation of machine in the exemplary form of a computer system 800 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance, set-top box (STB) or any machine capable of executing a sequence of instructions that specify actions to be taken by that machine.

The computer system 800 includes a processor 802, a main memory 806 and a static memory 808, which communicate with each other via a bus 824. The computer system 800 may further include a video display unit 812 (e.g., a liquid crystal display (LCD) or a cathode ray tube (CRT)). The computer system 800 also includes an alphanumeric input device 814 (e.g., a keyboard), a cursor control device 816 (e.g., a mouse), a disk drive unit 818, a signal generation device 822 (e.g., a speaker) and a network interface device 810.

The disk drive unit 818 includes a machine-readable medium 820 on which is stored a set of instructions (i.e., software) 804 embodying any one, or all, of the methodologies described above. The software 804 is also shown to reside, completely or at least partially, within the main memory 806 and/or within the processor 802. The software 804 may further be transmitted or received via the network interface device 810. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks. Further, while the software is shown in FIG. 22 to reside within a single device, it will be appreciated that the software 804 could be distributed across multiple machines or storage media, which may include the machine-readable medium.

Thus, a method and system to schedule transaction listings at a network-based transaction facility, via the seller application, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

In the foregoing detailed description, the method and system of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the blocks of FIGS. 11a and 11b represent portions of a method, which, in some embodiments, may be reordered or may be organized in parallel rather than in a linear or step-wise fashion. The present specification and figures are accordingly to be regarded as illustrative rather than restrictive.

What is claimed is:

1. A method comprising:
transmitting configuration information to a user application in response to reception of a selection that corresponds to a targeted site,
the user application being configured according to the configuration information in response to transmission of the configuration information,
the configuration information, after transmission, configuring the user application to propagate a plurality of user submissions to the targeted site,
the transmitting of the configuration information being performed by a processor of a machine;
receiving a data file at a network-based facility from the configured user application,
the data file including the plurality of user submissions,
the plurality of user submissions being propagated to the targeted site by the configured user application; and
publishing the plurality of user submissions at the network-based facility.

2. The method of claim 1, wherein:
a user submission among the plurality of user submissions includes an associated start time; and
the publishing of the plurality of user submissions includes publishing the user submission according to the associated start time of the user submission.

3. The method of claim 2 further comprising:
scheduling, at the network-based facility, publication of the user submission according to the associated start time of the user submission.

4. The method of claim 2 further comprising:
updating the user submission.

5. The method of claim 4, wherein:
the updating of the user submission is performed after the receiving of the data file and before the associated start time of the user submission.

6. The method of claim 4 further comprising:
receiving a rescheduled start time for the user submission; and wherein
the updating of the user submission is in response to the receiving of the rescheduled start time.

7. The method of claim 6, wherein:
the publishing of the plurality of user submissions includes publishing the user submission according to the rescheduled start time for the user submission.

8. The method of claim 6 further comprising:
scheduling, at the network-based facility, publication of the user submission according to the rescheduled start time for the user submission.

9. The method of claim 1, wherein:
the configuration information identifies the targeted site and includes at least one of:
a software module update of the user application,
a category update of the user application,
an attribute update of the user application, or
a language update of the user application.

10. The method of claim 1, wherein:
the configuration information identifies the geographical region of the targeted site,
the geographical region of the targeted site being distinct from a geographical region of the network-based facility.

11. The method of claim 10, wherein:
the configuration information identifies the geographical region of the targeted site based on at least one of:
a country of the targeted site,
a state of the targeted site,
a territory of the targeted site, or
a province of the targeted site.

12. The method of claim 1, wherein:
the configuration information identifies a currency of the targeted site,
a currency of the targeted site being distinct from a currency of the network-based facility.

13. The method of claim 1, wherein:
the configuration information identifies a format of the targeted site with which to represent a currency of the targeted site,
the format of the targeted site being distinct from a format of the network-based facility with which to represent a currency of the network-based facility.

14. The method of claim 13, wherein:
the format identified by the configuration information specifies that a whole number be used to in a representation of an amount of the currency of the targeted site.

15. The method of claim 13, wherein:
the format identified by the configuration information specifies that a particular punctuation mark be used within a representation of an amount of the currency of the targeted site.

16. The method of claim 1, wherein:
the configuration information identifies subject matter of the targeted site,
the subject matter of the targeted site being distinct from subject matter of the network-based facility.

17. The method of claim 1, wherein:
the configuration information identifies a purpose of the targeted site,
the purpose of the targeted site being distinct from a purpose of the network-based facility.

18. The method of claim 1, wherein:
the configuration information identifies a language of the targeted site,
the language of the targeted site being distinct from a language of the network-based transaction facility.

19. The method of claim 1, wherein:

the configuration information identifies a restricted type of user submission; and the user application is configured according to the configuration information to prevent propagation of a particular submission of the restricted type to the targeted site.

20. The method of claim 19, wherein:

the data file received at the network-based facility includes the plurality of user submissions and the particular submission of the restricted type; and the method further comprises publishing the particular submission of the restricted type at the network-based facility.

21. A non-transitory machine-readable storage medium comprising instructions that, when executed by one or more processors of a machine, cause the machine to perform operations comprising:

transmitting configuration information to a user application in response to reception of a selection that corresponds to a targeted site, the user application being configured according to the configuration information in response to transmission of the configuration information, the configuration information, after transmission, configuring the user application to propagate a plurality of user submissions to the targeted site;

receiving a data file at a network-based facility from the configured user application, the data file including the plurality of user submissions, the plurality of user submissions being propagated to the targeted site by the configured user application; and publishing the plurality of user submissions at the network-based facility.

22. A system comprising:

a processor configured by a communicator module, the communicator module being configured to:

transmit configuration information to a user application in response to reception of a selection that corresponds to a targeted site, the user application being configured according to the configuration information in response to transmission of the configuration information, the configuration information, after transmission, configuring the user application to propagate a plurality of use submissions to the targeted site; and receive a data file at a network-based facility from the configured user application, the data file including the plurality of user submissions, the plurality of user submissions being propagated to the targeted site by the configured user application; and means for publishing the plurality of user submissions at the network-based facility.

* * * * *

UNITED STATES PATENT AND TRADEMARK OFFICE
CERTIFICATE OF CORRECTION

PATENT NO. : 8,255,286 B2
APPLICATION NO. : 13/080426
DATED : August 28, 2012
INVENTOR(S) : Veres et al.

It is certified that error appears in the above-identified patent and that said Letters Patent is hereby corrected as shown below:

On The Title Page, Item (56)

On page 6, column 1, under "Other Publications", line 11, delete "Mailed" and insert --mailed--, therefor On page 6, column 1, under "Other Publications", line 13, delete "Mailed" and insert --mailed--, therefor On page 6, column 1, under "Other Publications", line 20, delete "Filed" and insert --filed--, therefor On page 6, column 1, under "Other Publications", line 31, delete "Europmedia" and insert --Europemedia--, therefor On page 6, column 1, under "Other Publications", line 55, delete "Filed" and insert --filed--, therefor On page 6, column 1, under "Other Publications", line 57, delete "market;Adds" and insert --market; Adds--, therefor On page 6, column 1, under "Other Publications", line 58, delete "wining" and insert --winning--, therefor On page 6, column 1, under "Other Publications", line 63, delete "Computerworld" and insert --Computer world--, therefor On page 6, column 1, under "Other Publications", line 67, delete "R," and insert --R.,--, therefor On page 6, column 2, under "Other Publications", line 17, delete "09/905.525" and insert --09/905,525--, therefor Signed and Sealed this
Sixth Day of January, 2015

Michelle K. Lee
*Deputy Director of the United States Patent and Trademark Office*

CERTIFICATE OF CORRECTION (continued)
U.S. Pat. No. 8,255,286 B2

On page 6, column 2, under "Other Publications", line 43, delete "Finai" and insert --Final--, therefor On page 7, column 1, under "Other Publications", line 34, after "PCT/US00/17136", insert --,--, therefor On page 7, column 1, under "Other Publications", line 44, after "PCT/US01/12398", insert --,--, therefor On page 7, column 2, under "Other Publications", line 18, delete "p. 04" and insert --p.04--, therefor On page 7, column 2, under "Other Publications", line 20, delete "'Mister" and insert --'Mister--, therefor On page 7, column 2, under "Other Publications", line 56, before "Auction", insert --"--, therefor On page 7, column 2, under "Other Publications", line 56, after "com's", insert --"--, therefor On page 7, column 2, under "Other Publications", line 64, delete "G. W," and insert --G.W.,--, therefor On page 7, column 7, under "Other Publications", line 65, after "Bulletin", delete ",", therefor On page 8, column 1, under "Other Publications", line 12, delete "Clemons; E," and insert --Clemons, E.,--, therefor On page 8, column 1, under "Other Publications", line 20, delete "I," and insert --I.,--, therefor On page 8, column 1, under "Other Publications", line 24, delete "C M." and insert --C. M.,--, therefor On page 8, column 1, under "Other Publications", line 29, delete "H. G," and insert --H.G.,--, therefor On page 8, column 1, under "Other Publications", line 47, delete "Gains";" and insert --Gains",--, therefor On page 8, column 1, under "Other Publications", line 47, delete "Week,Proquest", insert --Week, Proquest--, therefor On page 8, column 1, under "Other Publications", line 48, delete "41808971,.," insert --41808971,--, therefor On page 8, column 1, under "Other Publications", line 52, delete "B S," and insert --B.S.,--, therefor On page 8, column 2, under "Other Publications", line 1, delete "D L," and insert --D.L.,--, therefor On page 8, column 2, under "Other Publications", line 23, delete "T E," and insert --T.E.,--, therefor

CERTIFICATE OF CORRECTION (continued)
U.S. Pat. No. 8,255,286 B2

On page 8, column 2, under "Other Publications", line 26, delete "B F," and insert --B.F.,--, therefor On page 8, column 2, under "Other Publications", line 28, delete "M," and insert --M.,--, therefor On page 8, column 2, under "Other Publications", line 42, delete "A," and insert --A.,--, therefor On page 8, column 2, under "Other Publications", line 45, delete "InternetWeek" and insert --Internet Week--, therefor On page 8, column 2, under "Other Publications", line 51, delete "Filed" and insert --filed--, therefor On page 8, column 2, under "Other Publications", line 52, after "Action", delete "-", therefor In the Specification In column 1, line 6, delete "No," and insert --No.--, therefor In column 3, line 65, delete "ofWorld" and insert --of World--, therefor In column 4, line 6, after "pages", insert --).--, therefor In column 4, line 8, delete "company's" and insert --companies--, therefor In column 5, line 19, delete "fir" and insert --for--, therefor In column 5, line 31, after "$30_b$", insert --,--, therefor In column 6, line 63, delete "functionality" and insert --functionalities--, therefor In column 7, line 33, delete "he" and insert --be--, therefor In column 8, line 61, delete "18" and insert --78--, therefor In column 9, line 3, after "viewing", insert --,--, therefor In column 9, line 49, delete "Classes)," and insert --Classes).--, therefor In column 9, line 55, delete "Engine," and insert --Engine.--, therefor In column 9, line 66, delete "28" and insert --38--, therefor In column 10, line 67, delete "otters" and insert --offers--, therefor In column 13, line 26, after "etc", insert --.--, therefor CERTIFICATE OF CORRECTION (continued)
U.S. Pat. No. 8,255,286 B2

In column 13, line 56, delete "sites" and insert --site's--, therefor

In column 14, line 44, after "file", insert --(e.g.,--, therefor

In column 16, line 28, after "provide", insert --provided--, therefor

In column 19, line 34, delete "interact" and insert --internet--, therefor

In column 20, line 33, after "reached", insert --,--, therefor

In column 21, line 10, delete "open a sample" and insert --set up a new seller application--, therefor In column 21, line 11, delete "create a new" and insert --open an existing--, therefor In column 21, line 16, delete "254" and insert --258--, therefor In column 21, line 19, delete "256" and insert --254--, therefor In column 21, line 22, delete "258" and insert --256--, therefor In column 21, line 25, delete "256" and insert --254--, therefor In column 21, line 29, delete "userid" and insert --user id--, therefor In column 21, line 33, delete "userid" and insert --user id--, therefor In column 21, line 34, after "advance", insert --,--, therefor In column 21, line 36, delete "userid" and insert --user id--, therefor In column 21, line 42, delete "userid" and insert --user id--, therefor In column 21, line 46, delete "userid" and insert --user id--, therefor In column 21, line 49, delete "userid" and insert --user id--, therefor In column 21, line 50, delete "userid" and insert --user id--, therefor In column 22, line 22, after "country", insert --(e.g.,--, therefor In column 22, line 48, before "the", insert --at--, therefor In column 23, line 21, delete "364" and insert --354--, therefor In column 23, line 21, delete "380" and insert --356--, therefor

CERTIFICATE OF CORRECTION (continued)
U.S. Pat. No. 8,255,286 B2

In column 23, line 24, delete "for" and insert --(or--, therefor

In column 24, line 55, delete "he" and insert --be--, therefor

In column 25, line 15, delete "propagate" and insert --update--, therefor

In column 25, line 57, before "the", insert --,--, therefor

In column 27, line 20, after "470", insert --and--, therefor

In column 27, line 54, delete "1210" and insert --518--, therefor

In column 28, line 20, before "HTML", insert --a--, therefor

In column 29, line 6, before "versioning", insert --a--, therefor

In column 29, line 23, after "connection", insert --,--, therefor

In column 29, line 27, delete "attributes" and insert --attribute--, therefor

In column 29, line 56, before "critical", insert --(e.g.,--, therefor

In column 30, line 30, delete "my" and insert --may--, therefor

In column 30, line 52, after "stored", insert --,--, therefor

In column 30, line 30, delete "included" and insert --include--, therefor